H. A. SCHWARTZ.
AUTOMATIC CHUCKING MACHINE.
APPLICATION FILED JUNE 17, 1920.
1,404,658.
Patented Jan. 24, 1922.
29 SHEETS—SHEET 7.
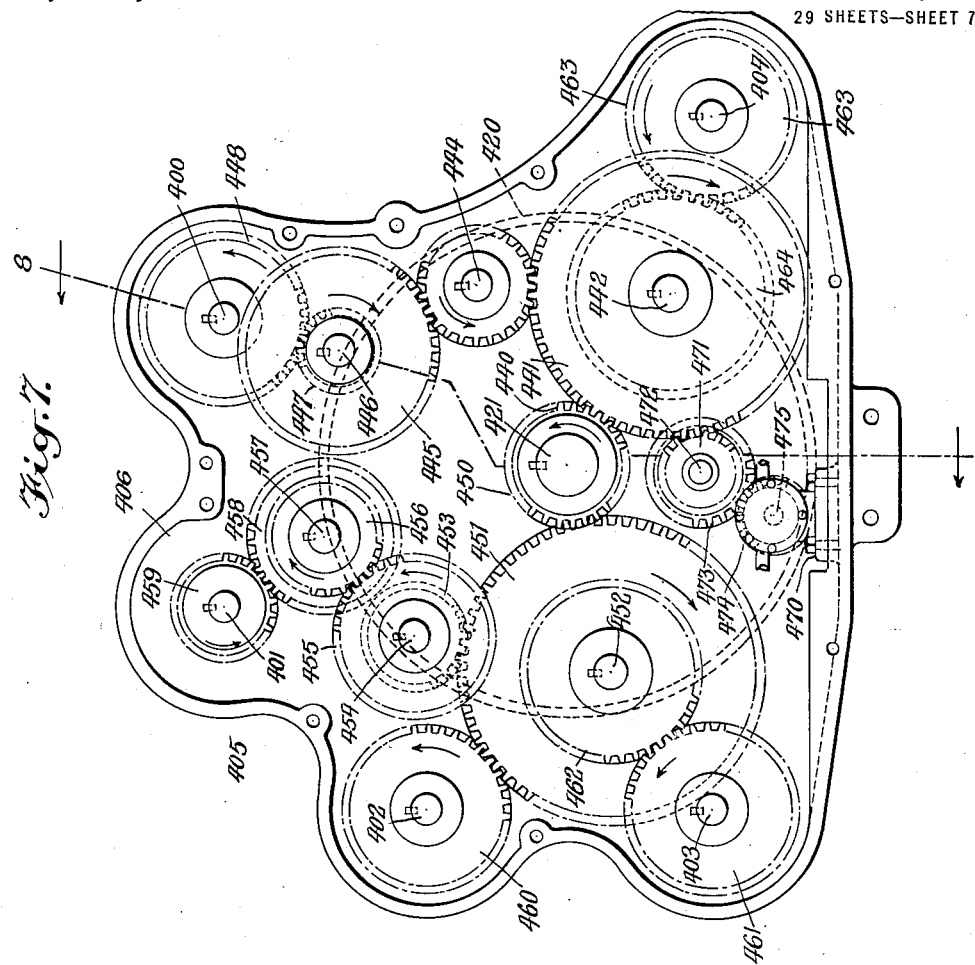
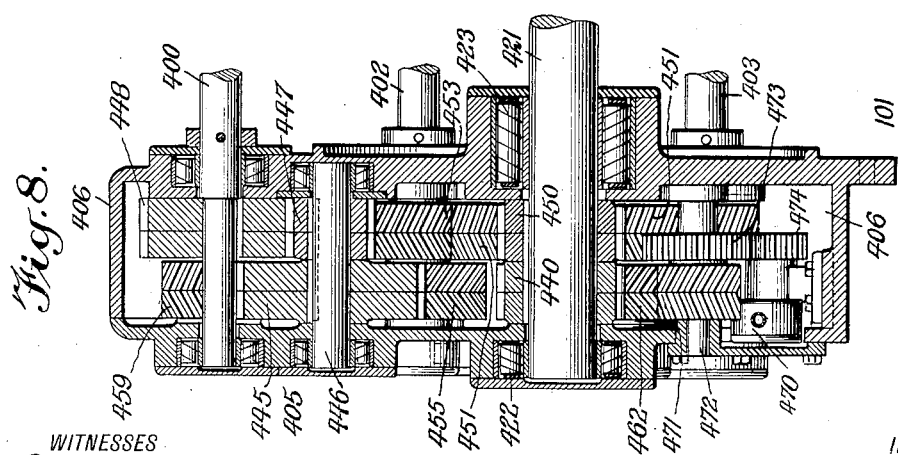
WITNESSES
INVENTOR
HARRY A. SCHWARTZ
BY
ATTORNEYS H. A. SCHWARTZ.
AUTOMATIC CHUCKING MACHINE.
APPLICATION FILED JUNE 17, 1920.
1,404,658.
Patented Jan. 24, 1922.
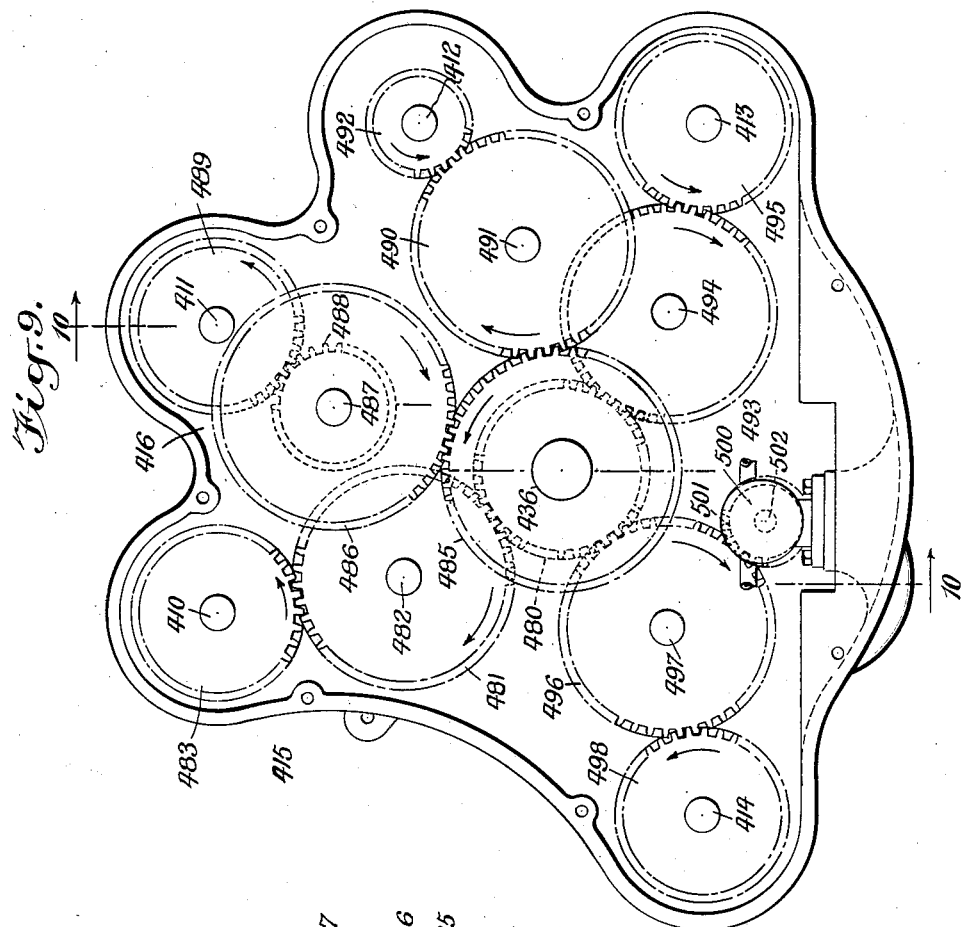
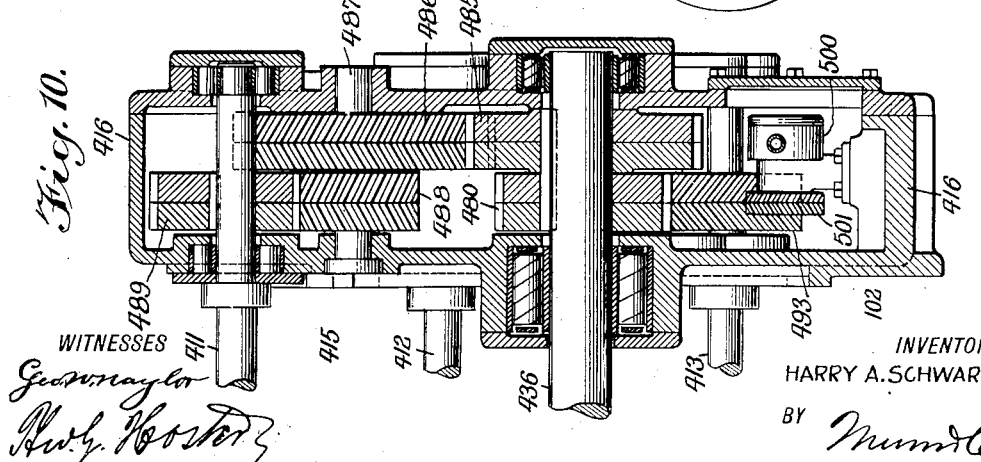
WITNESSES
INVENTOR
HARRY A. SCHWARTZ
BY
ATTORNEYS

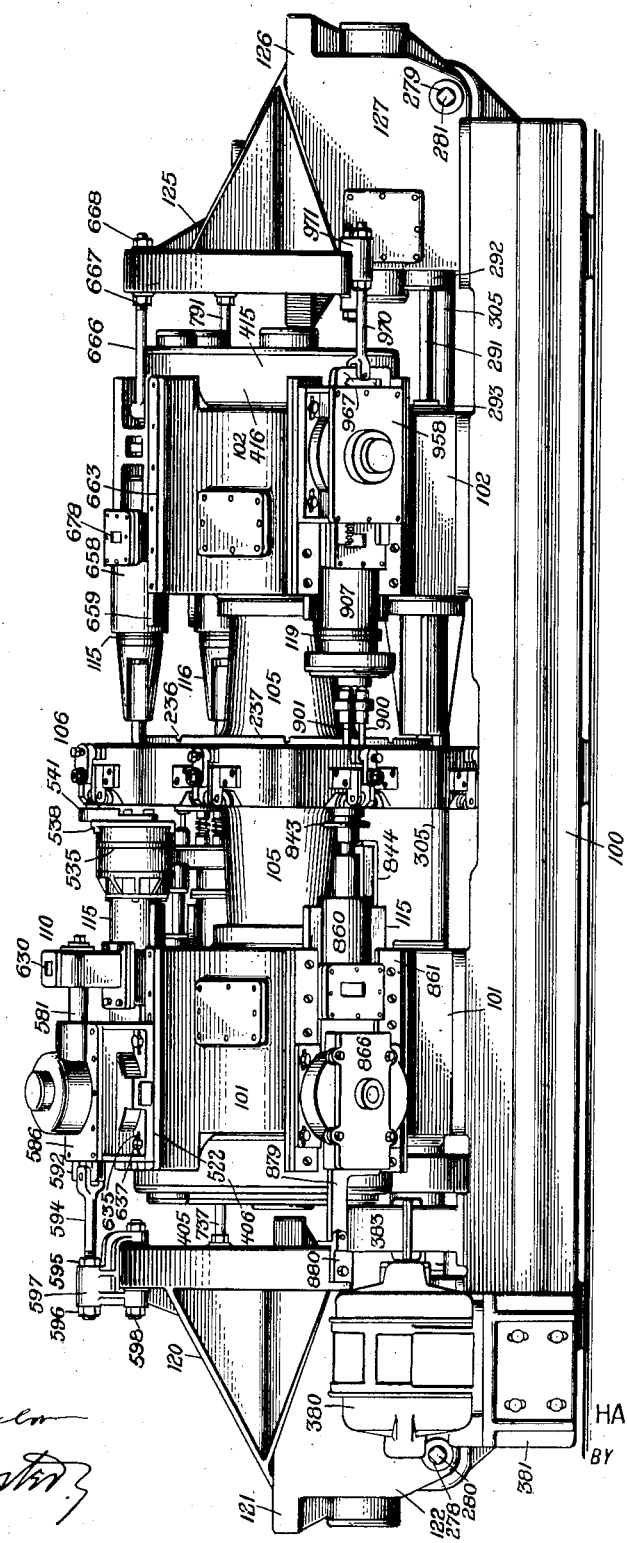

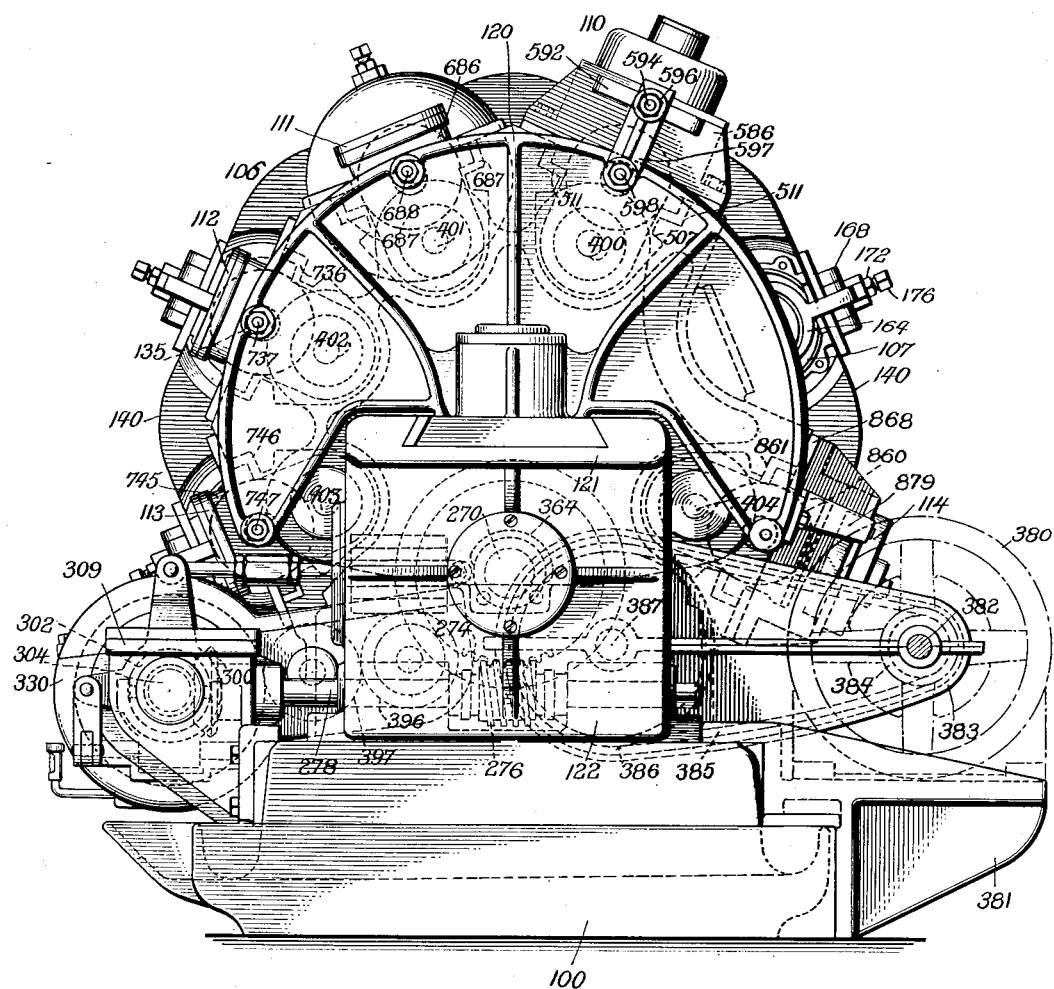

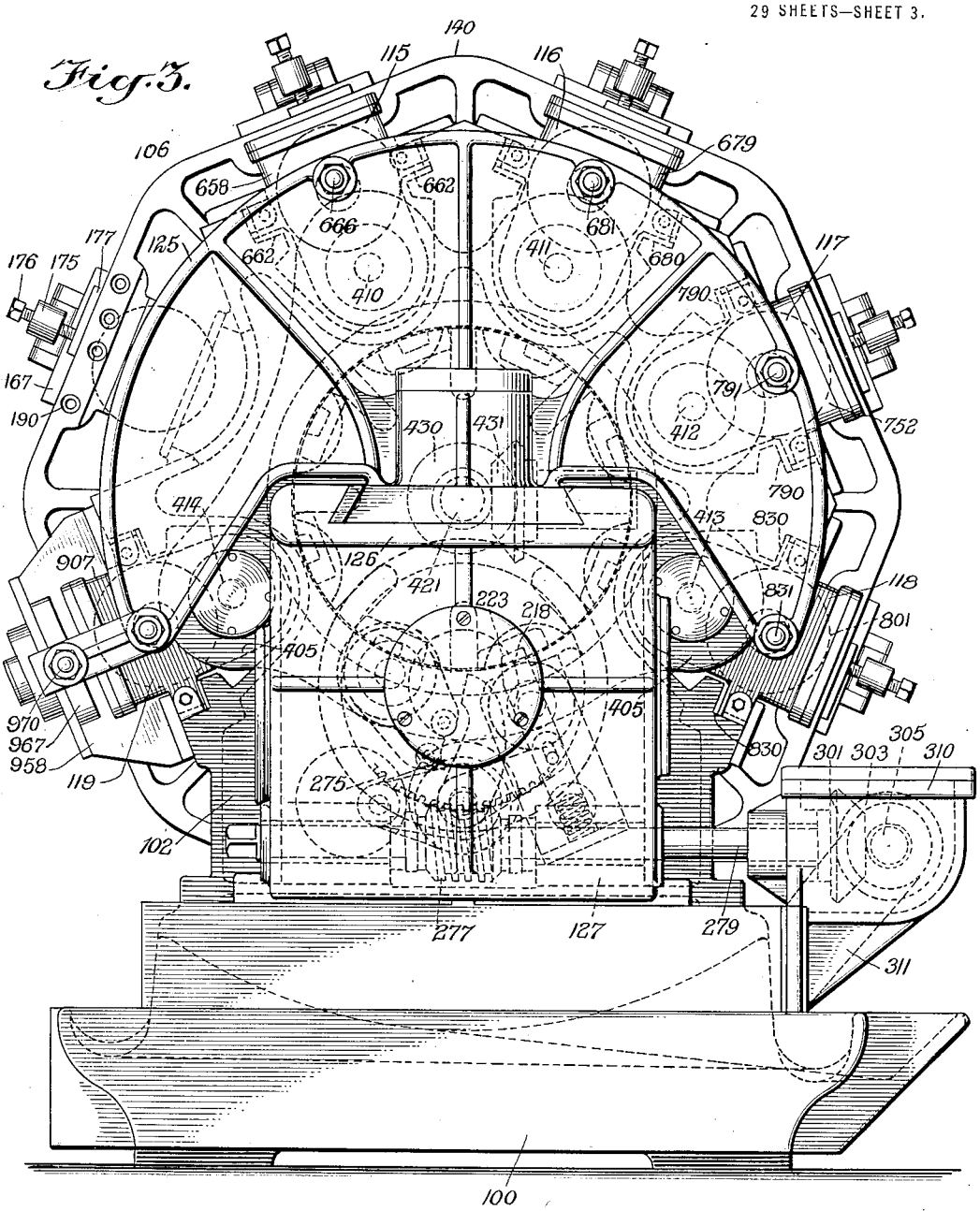

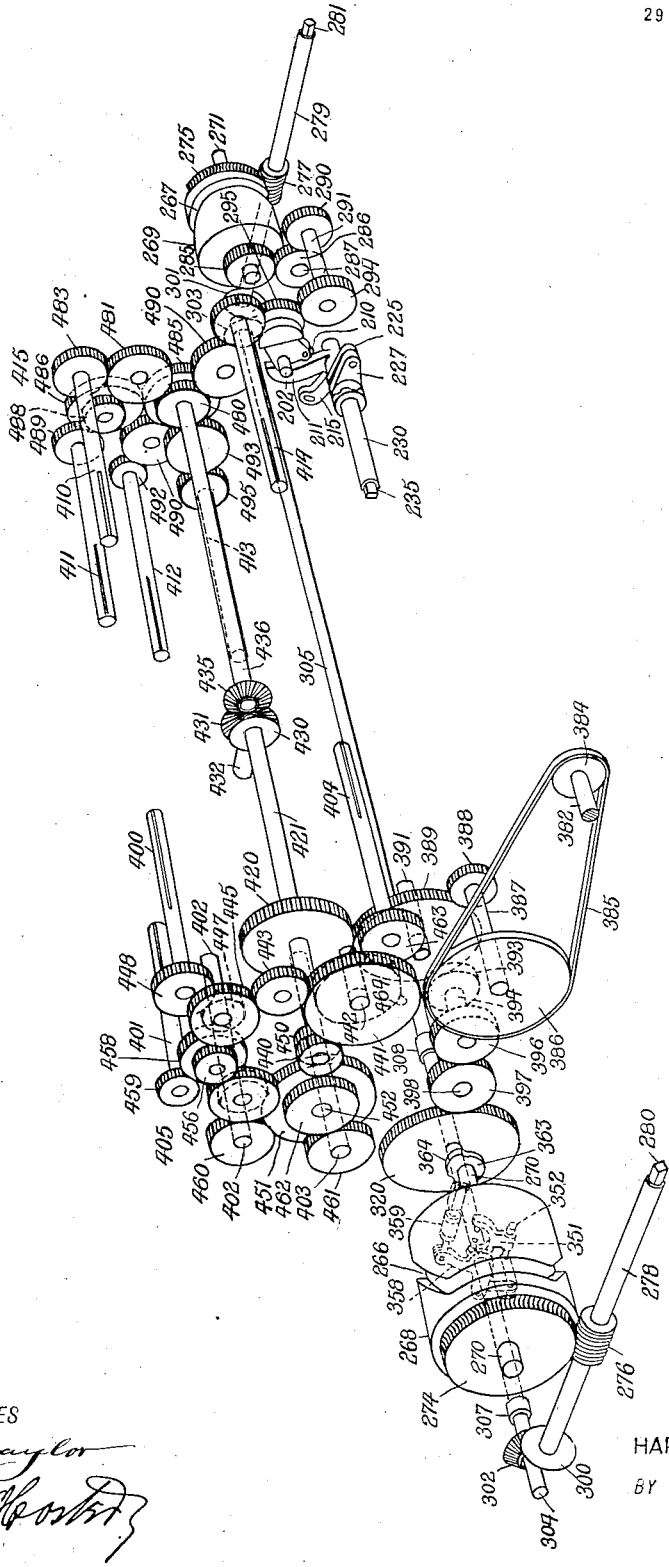

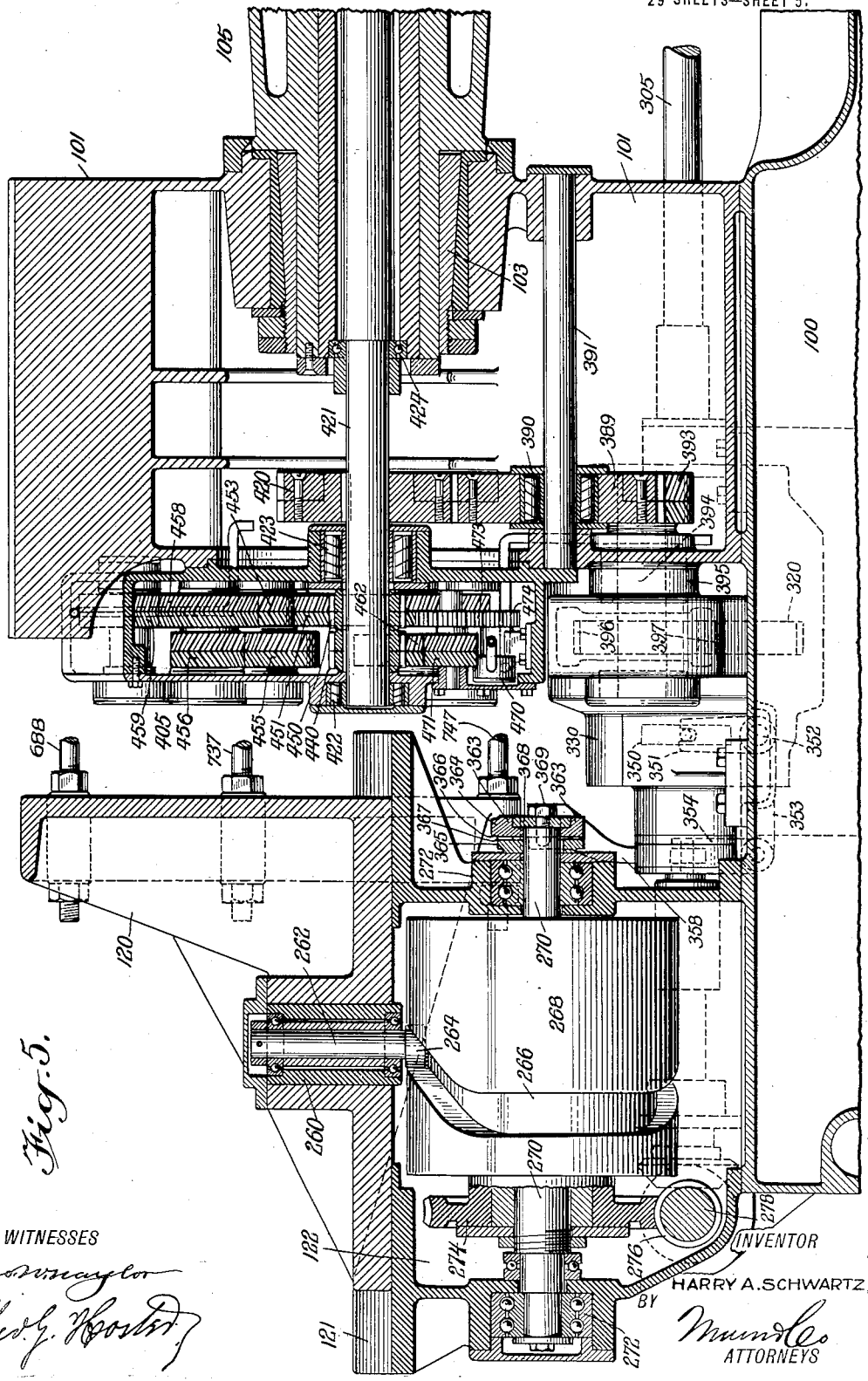

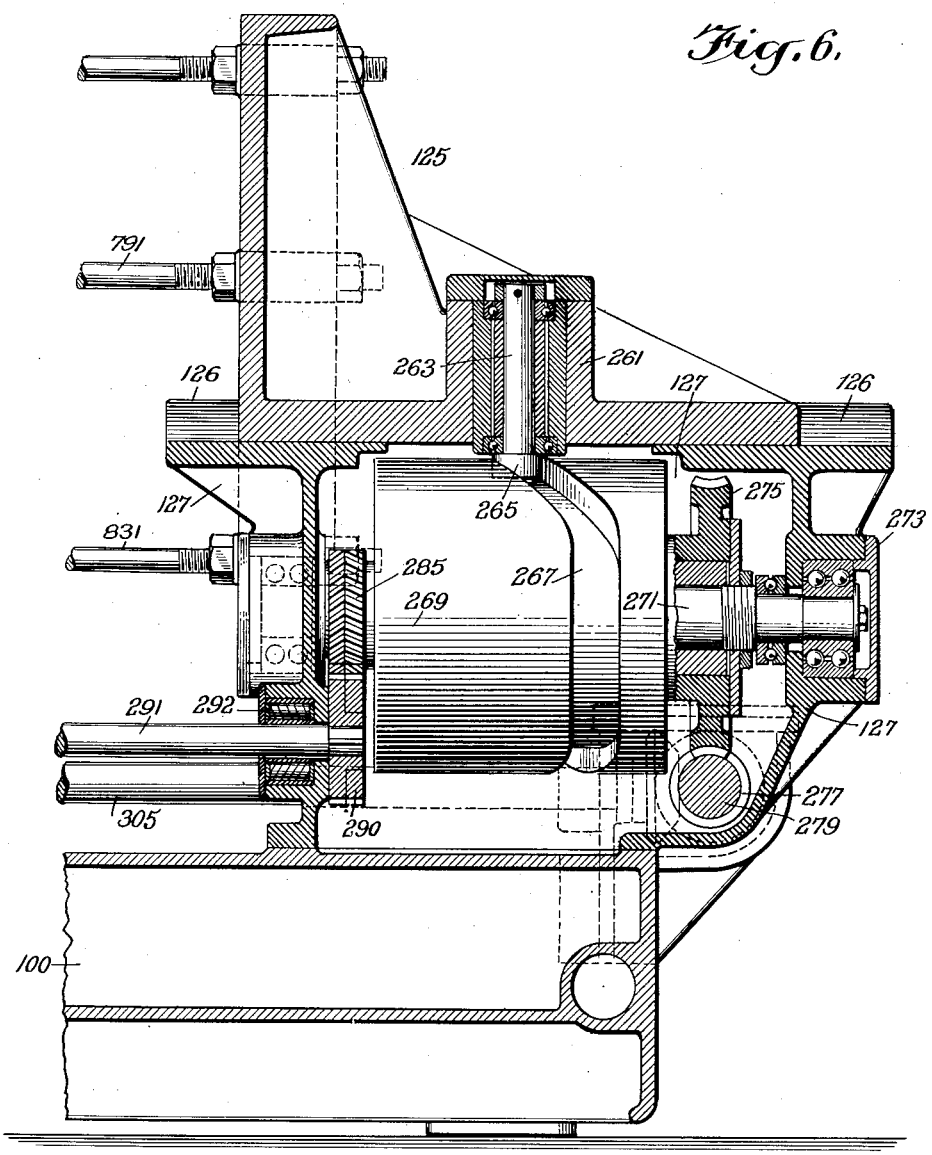

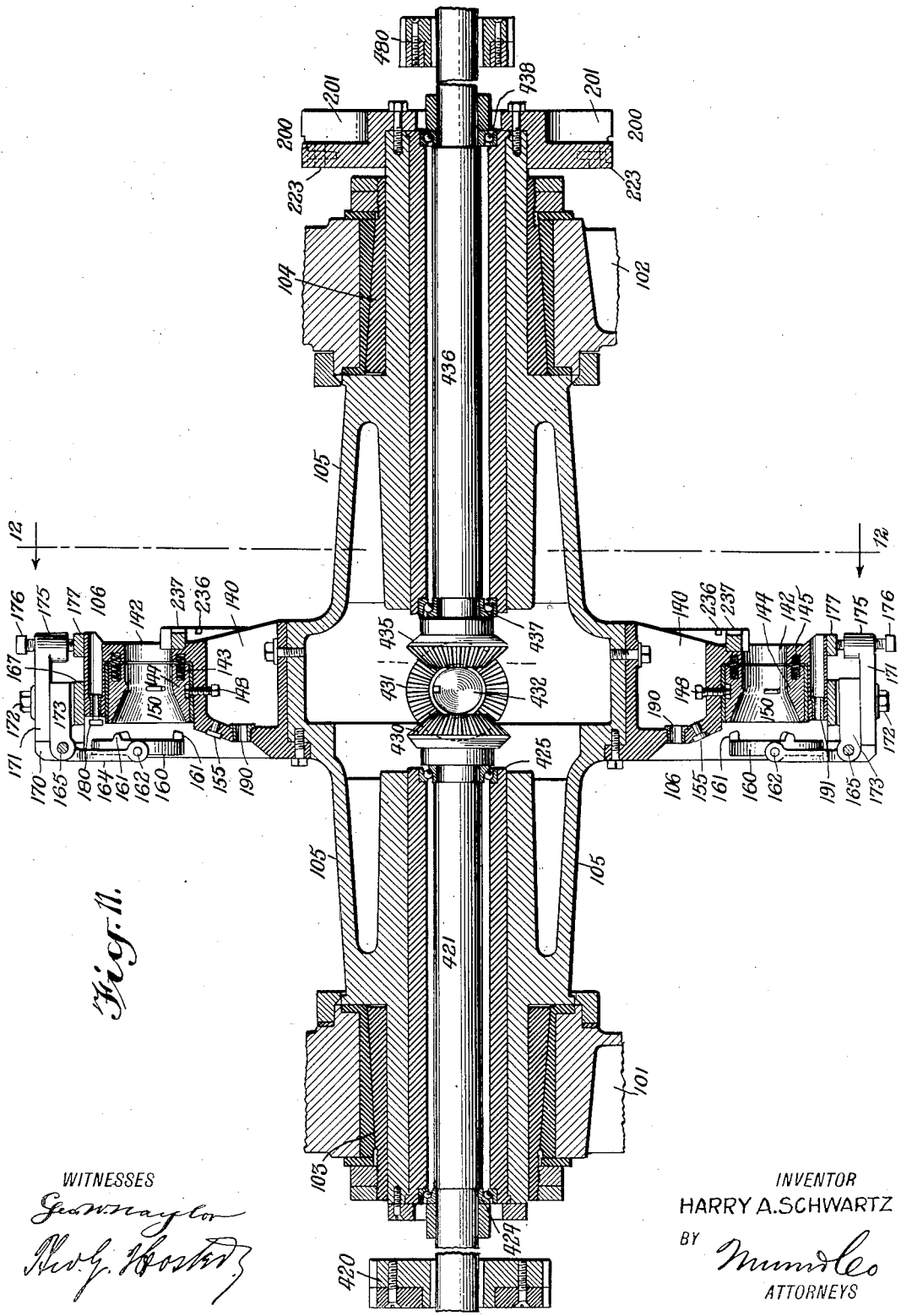

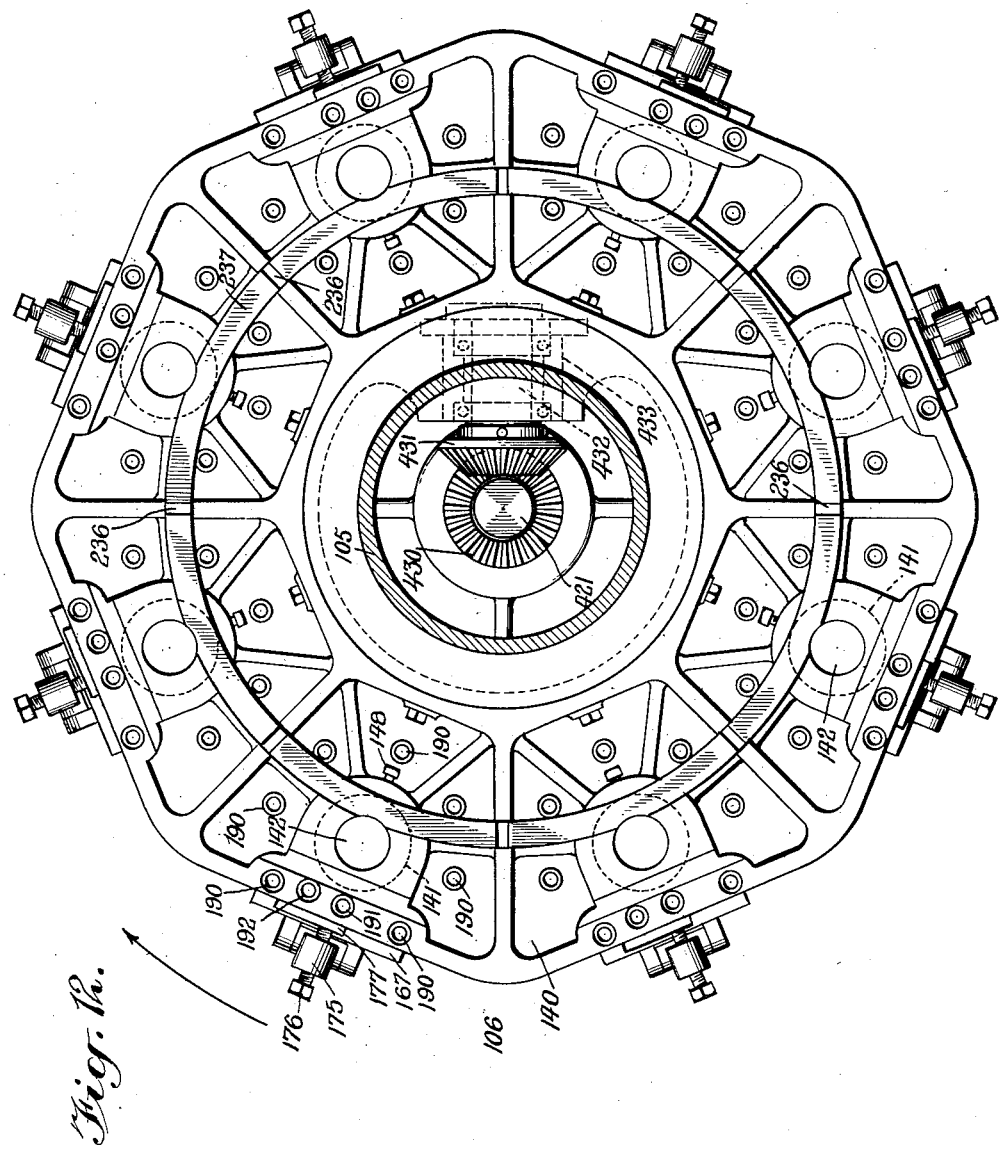

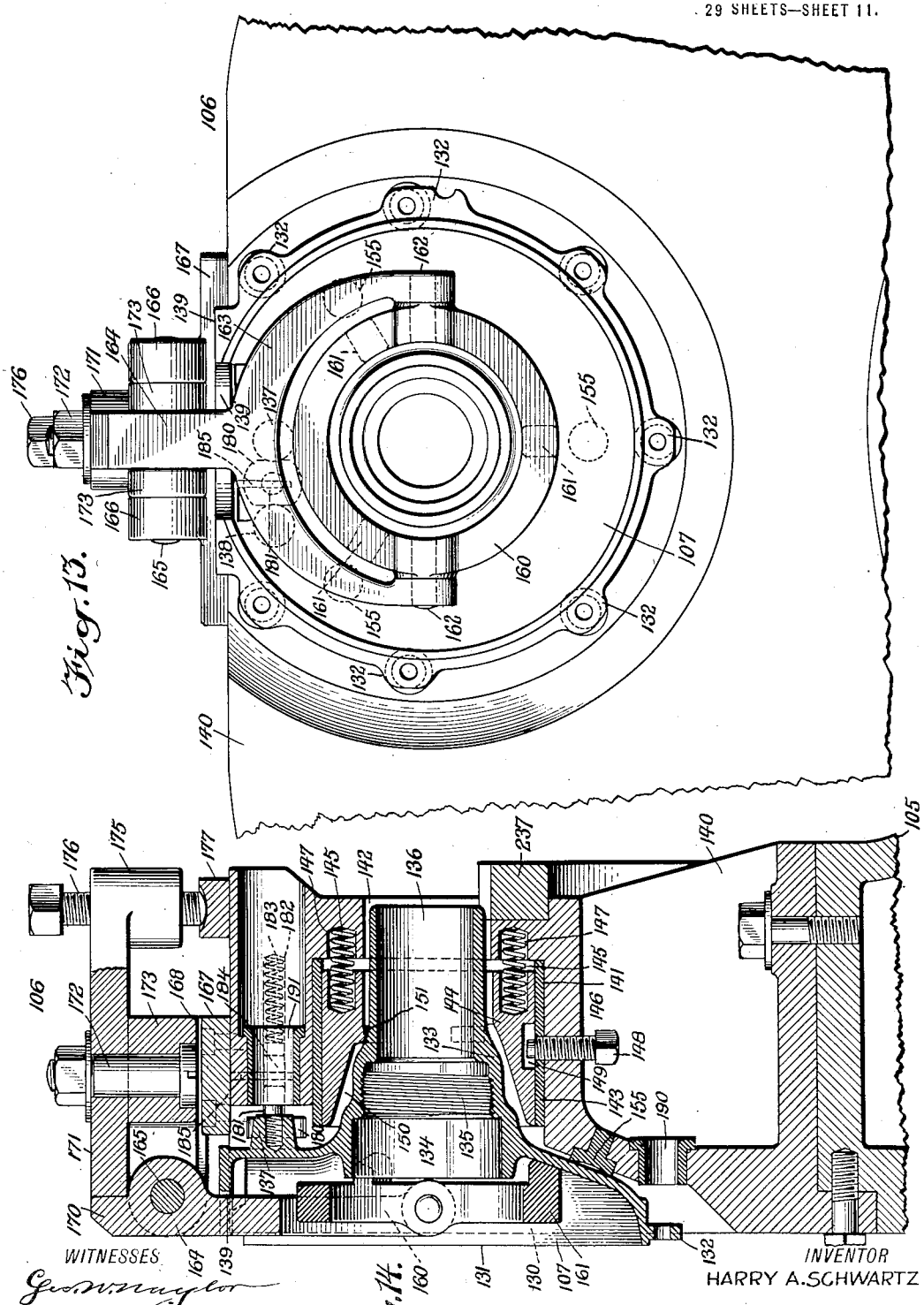

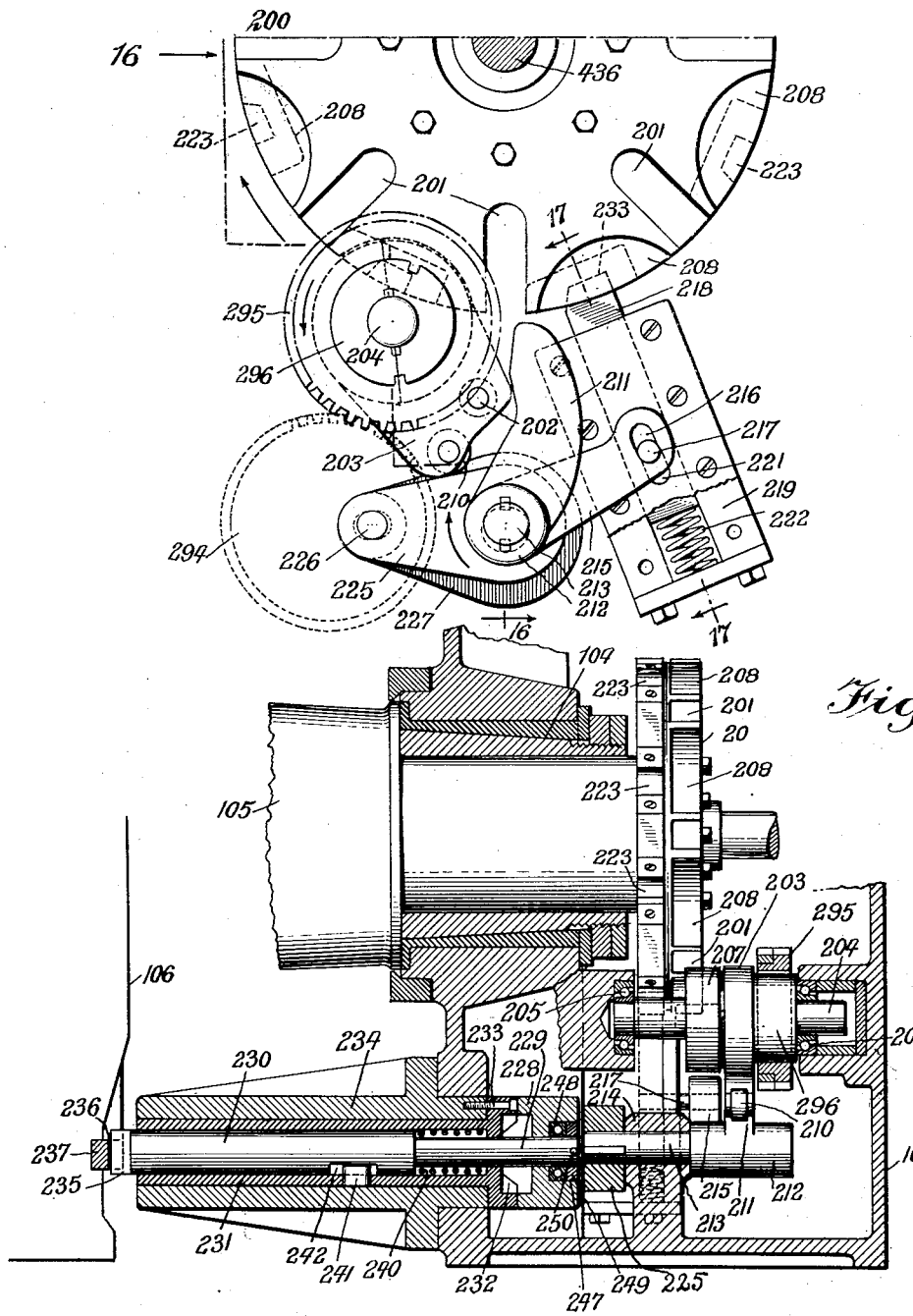

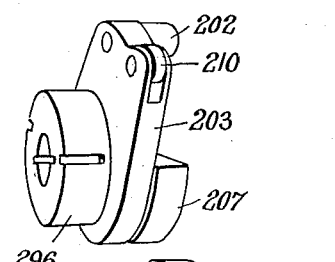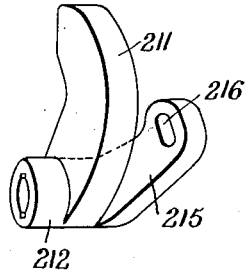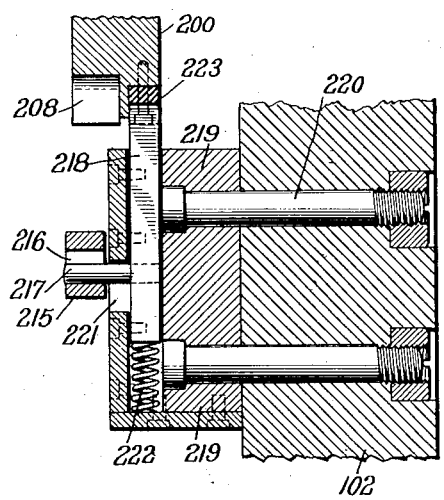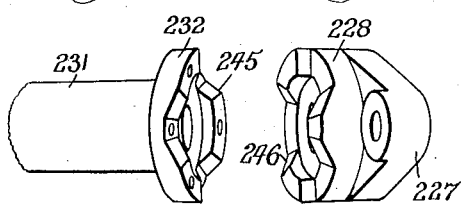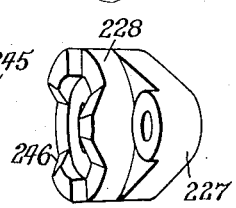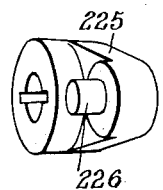

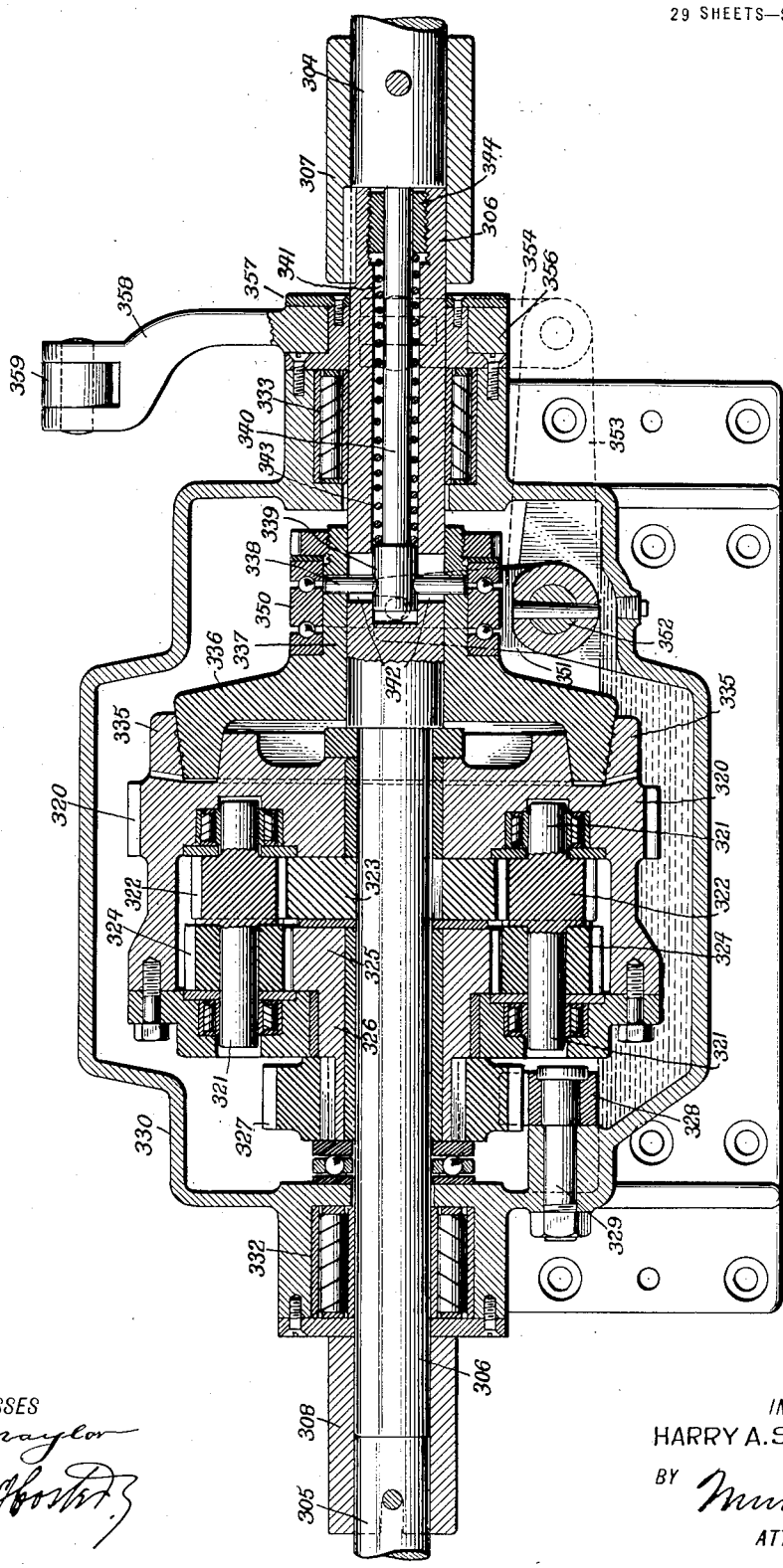

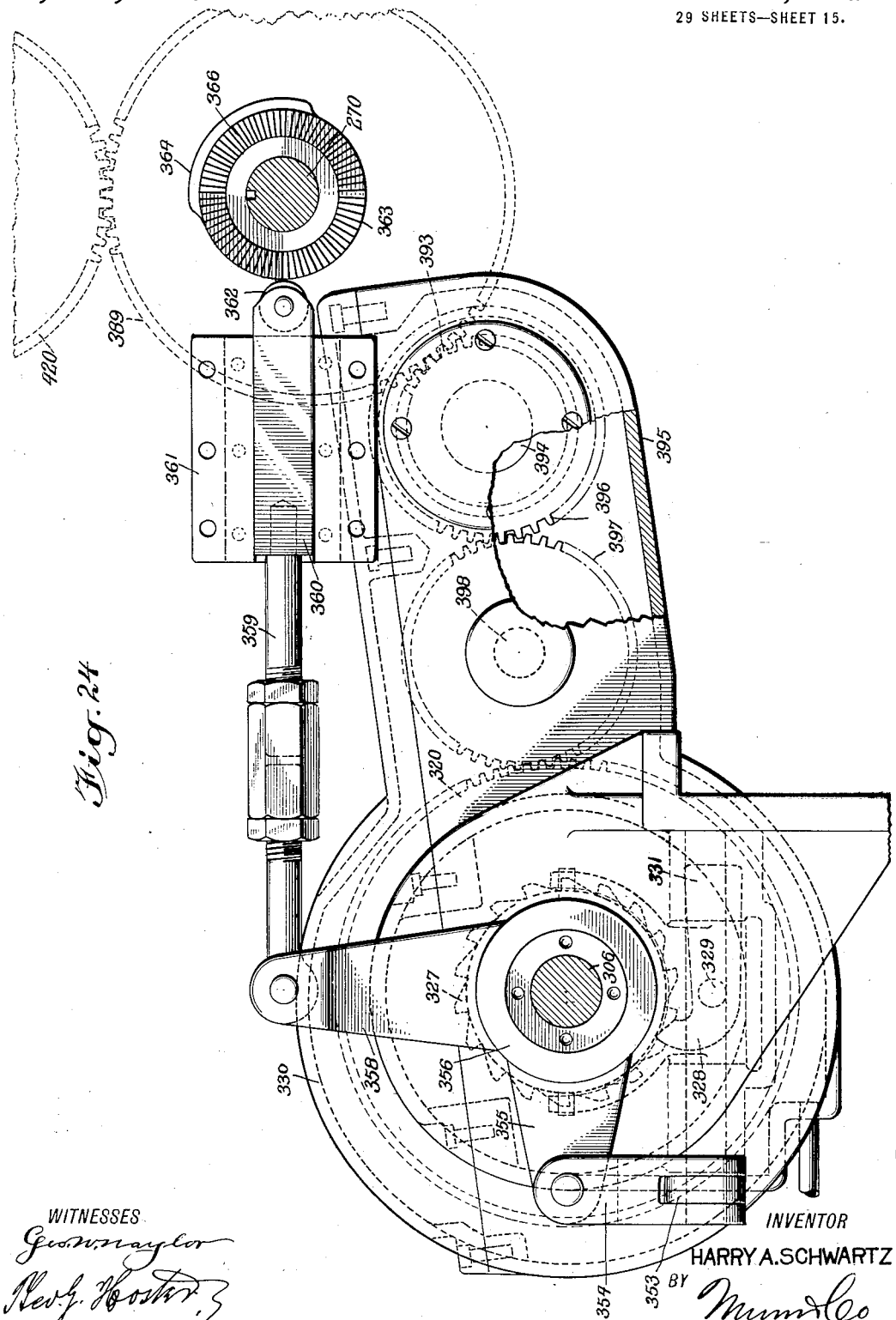

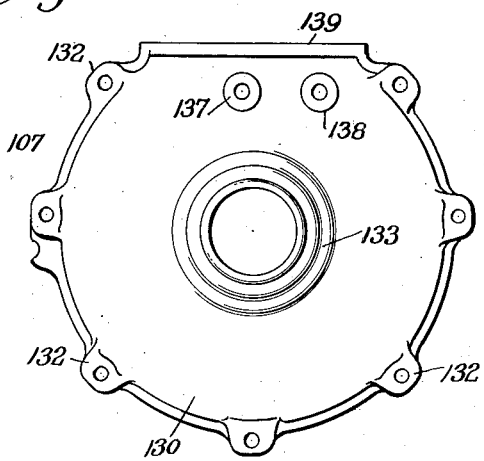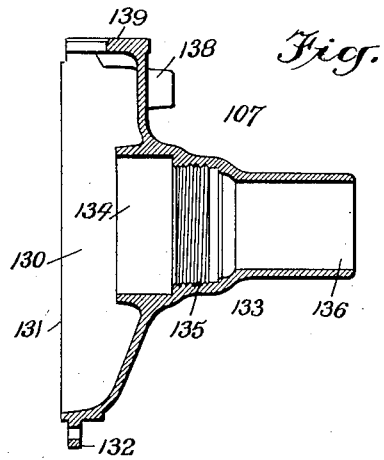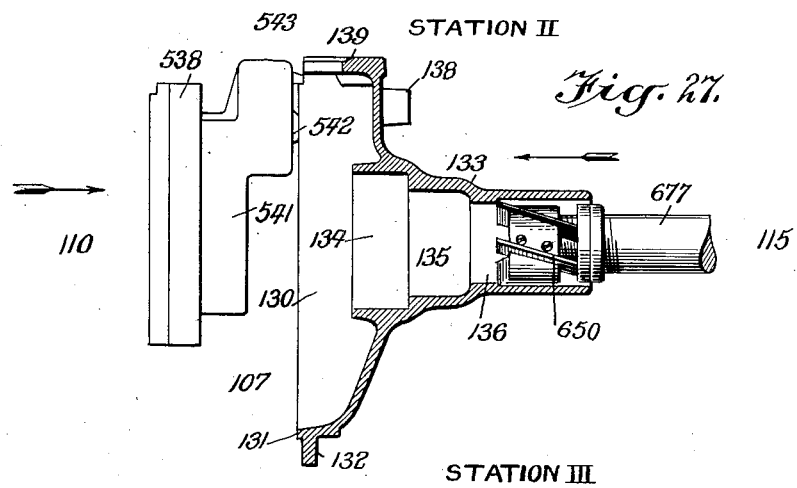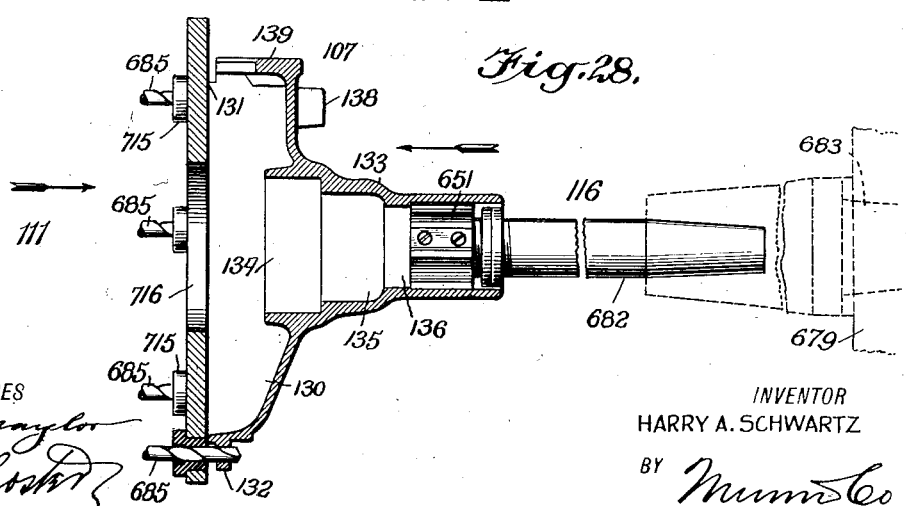

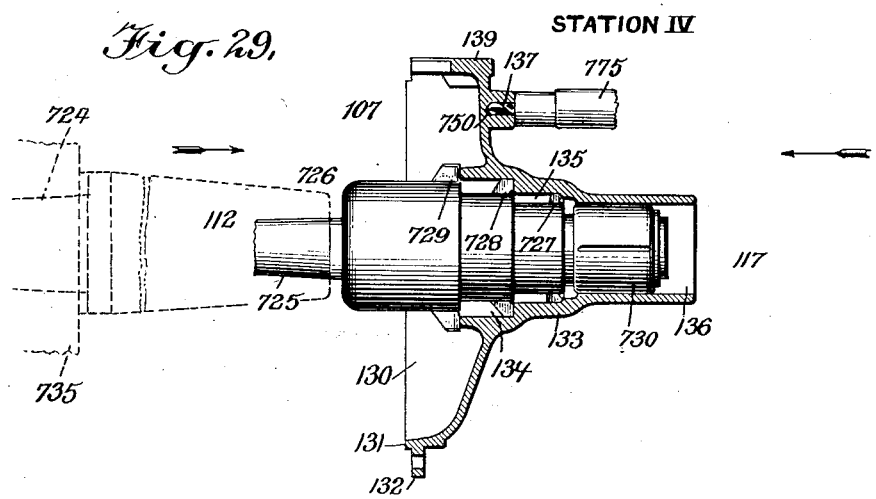
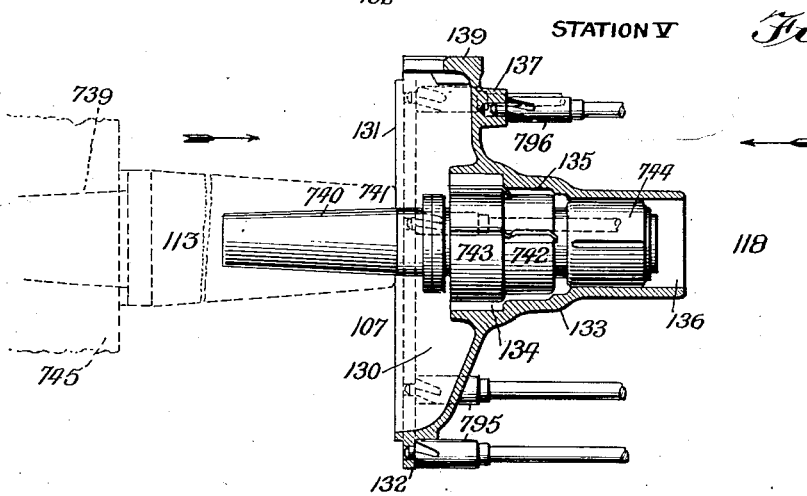
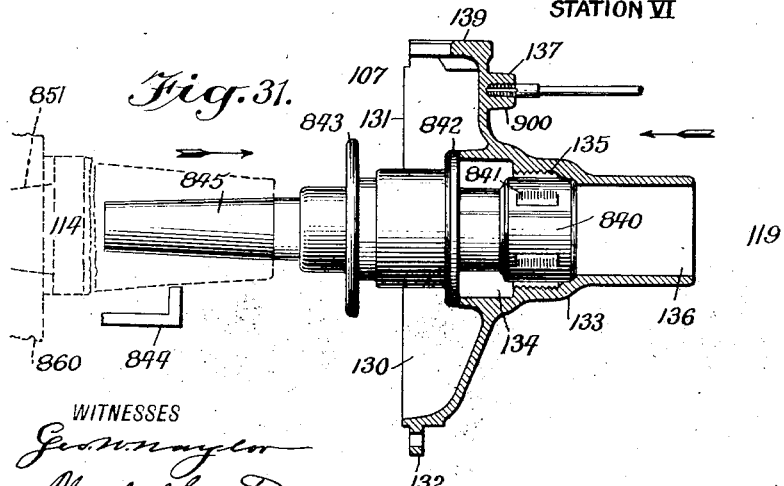

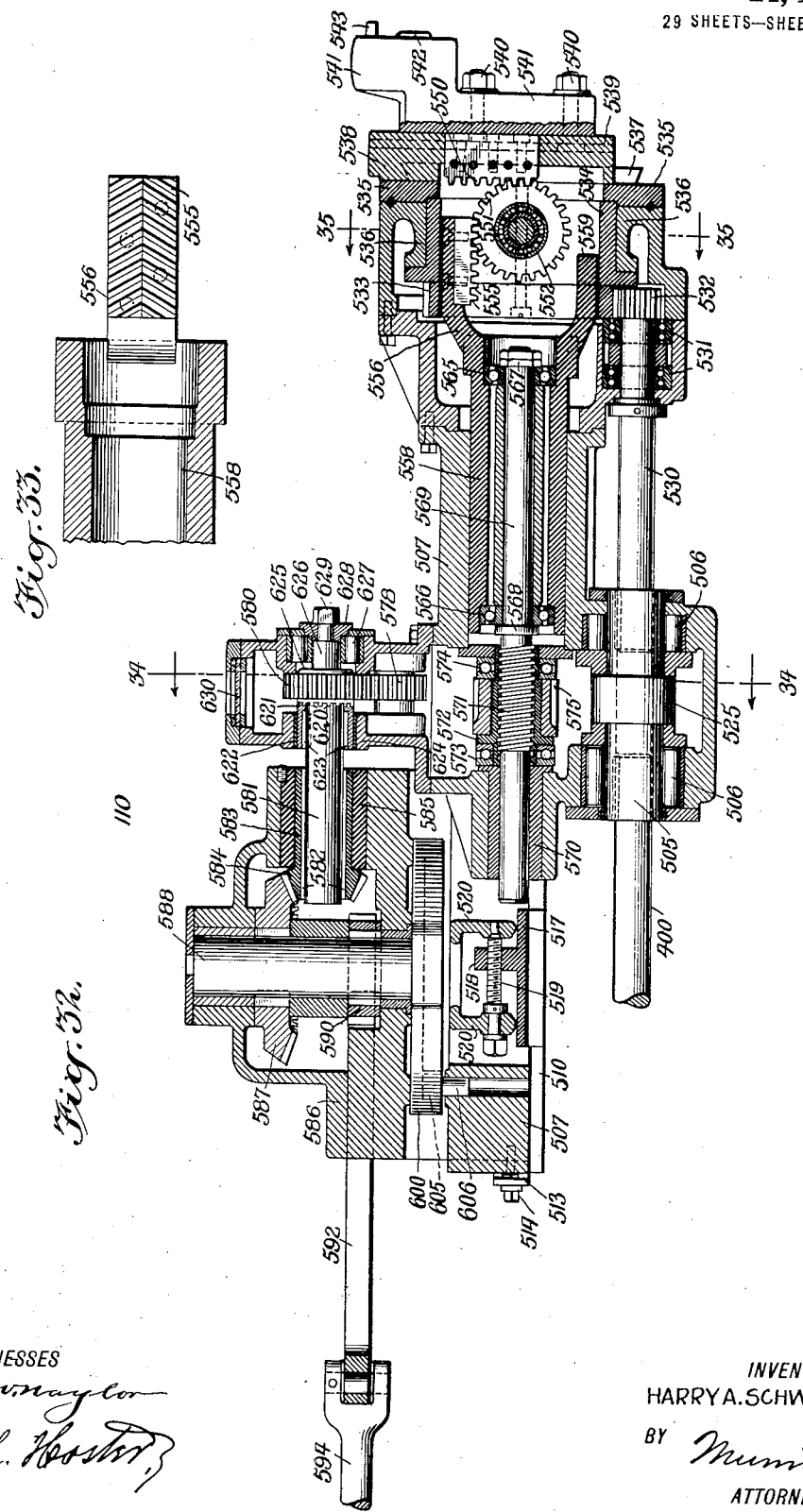

H. A. SCHWARTZ.
AUTOMATIC CHUCKING MACHINE.
APPLICATION FILED JUNE 17, 1920.
1,404,658.
Patented Jan. 24, 1922.
29 SHEETS—SHEET 19.
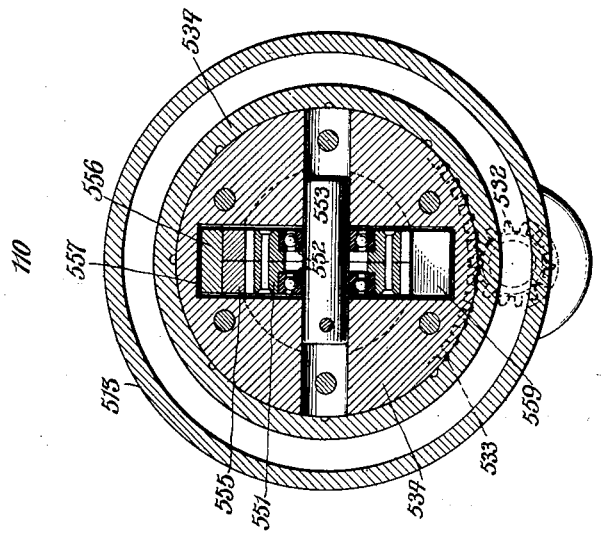
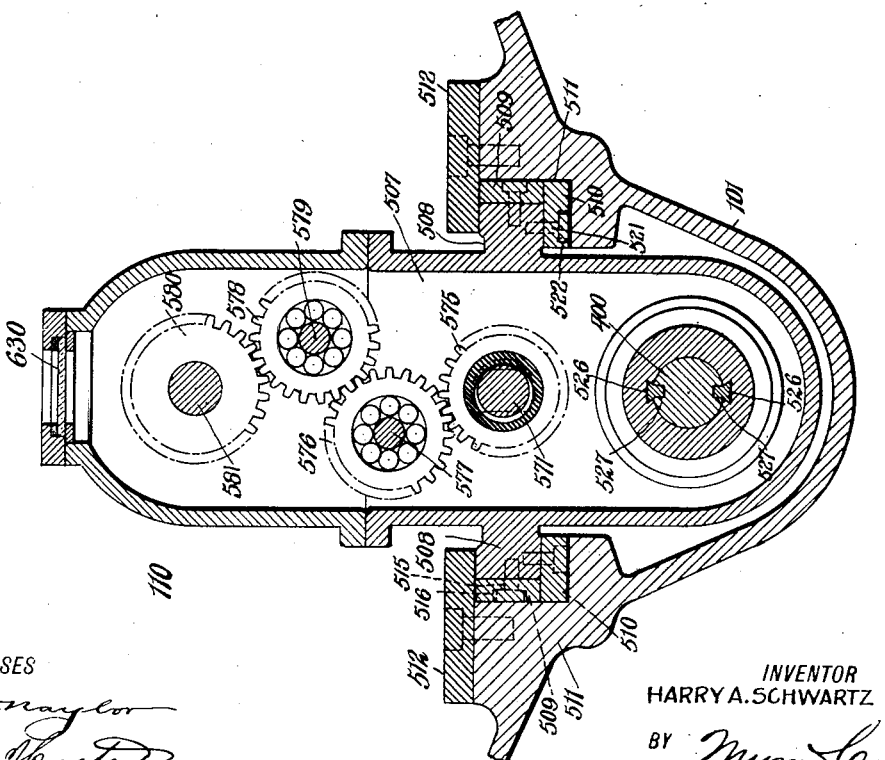
WITNESSES
INVENTOR
HARRY A. SCHWARTZ
BY
ATTORNEYS

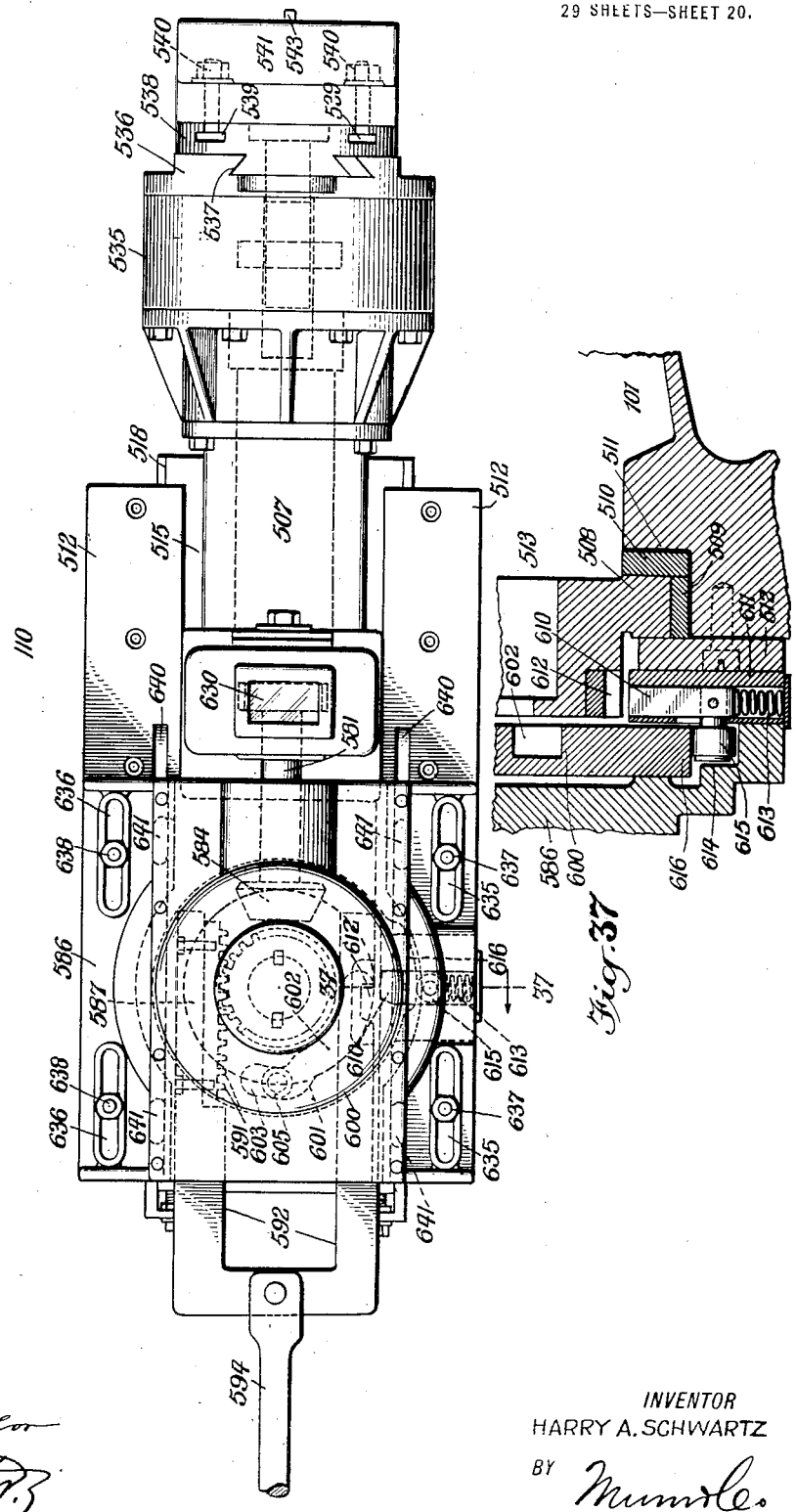

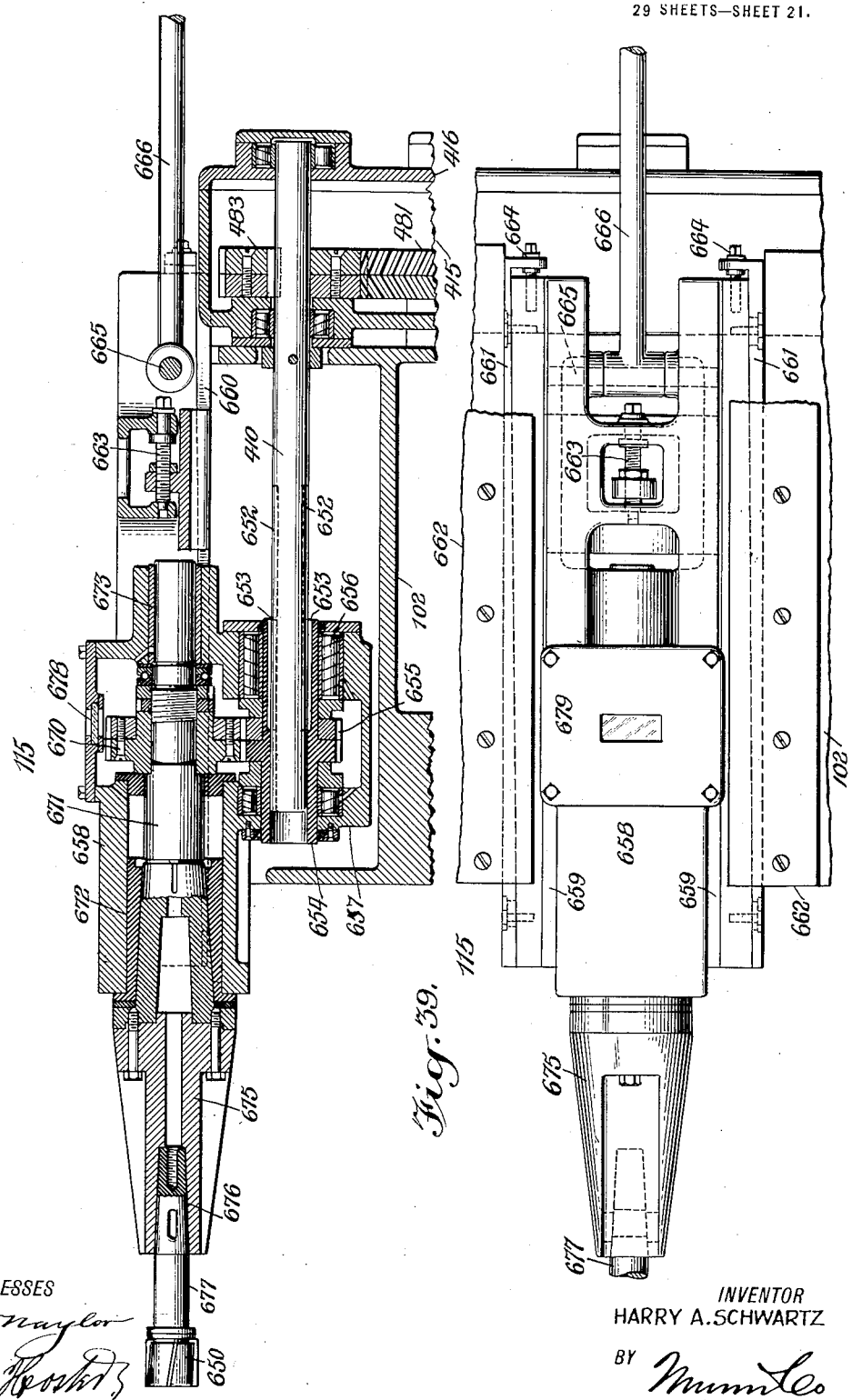

H. A. SCHWARTZ.
AUTOMATIC CHUCKING MACHINE.
APPLICATION FILED JUNE 17, 1920.
1,404,658.
Patented Jan. 24, 1922.
29 SHEETS—SHEET 22.
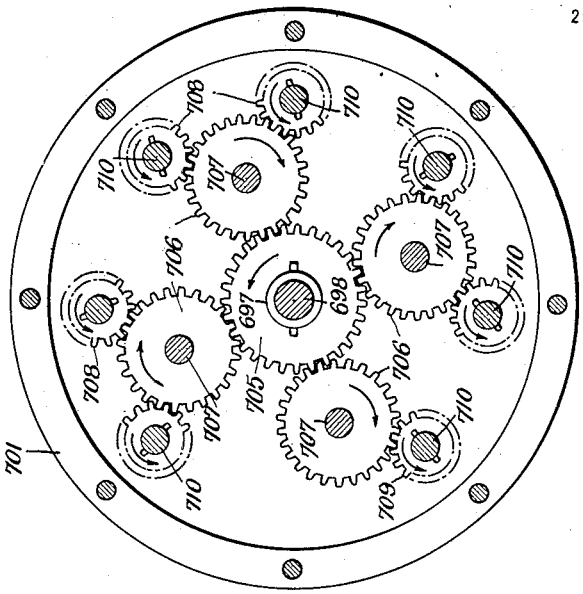
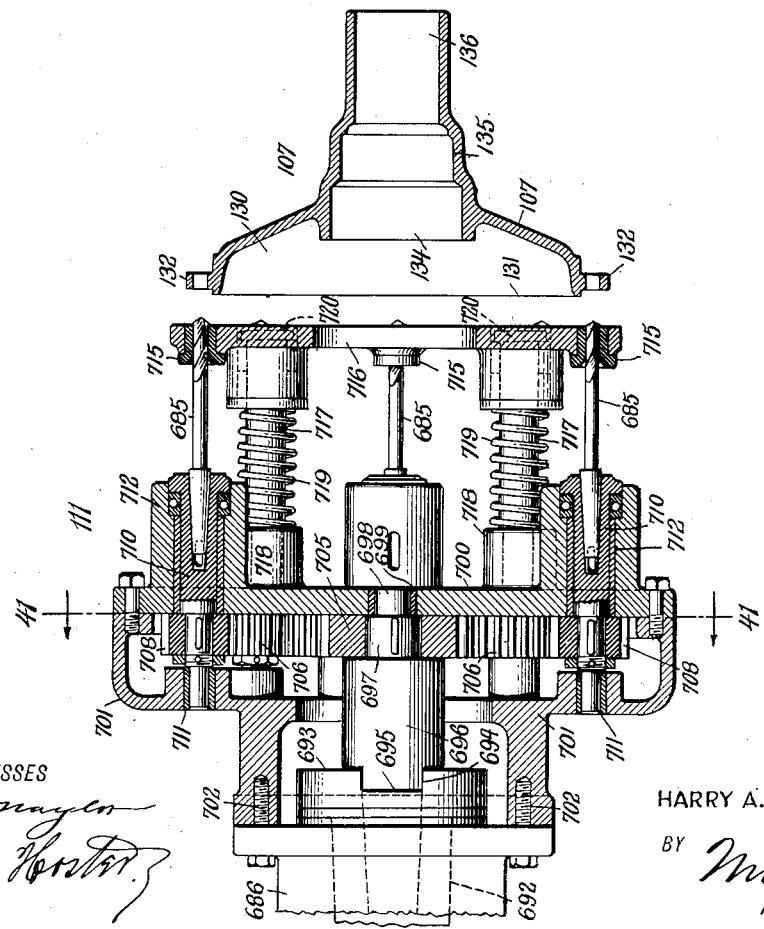
WITNESSES
INVENTOR
HARRY A. SCHWARTZ
BY
ATTORNEYS

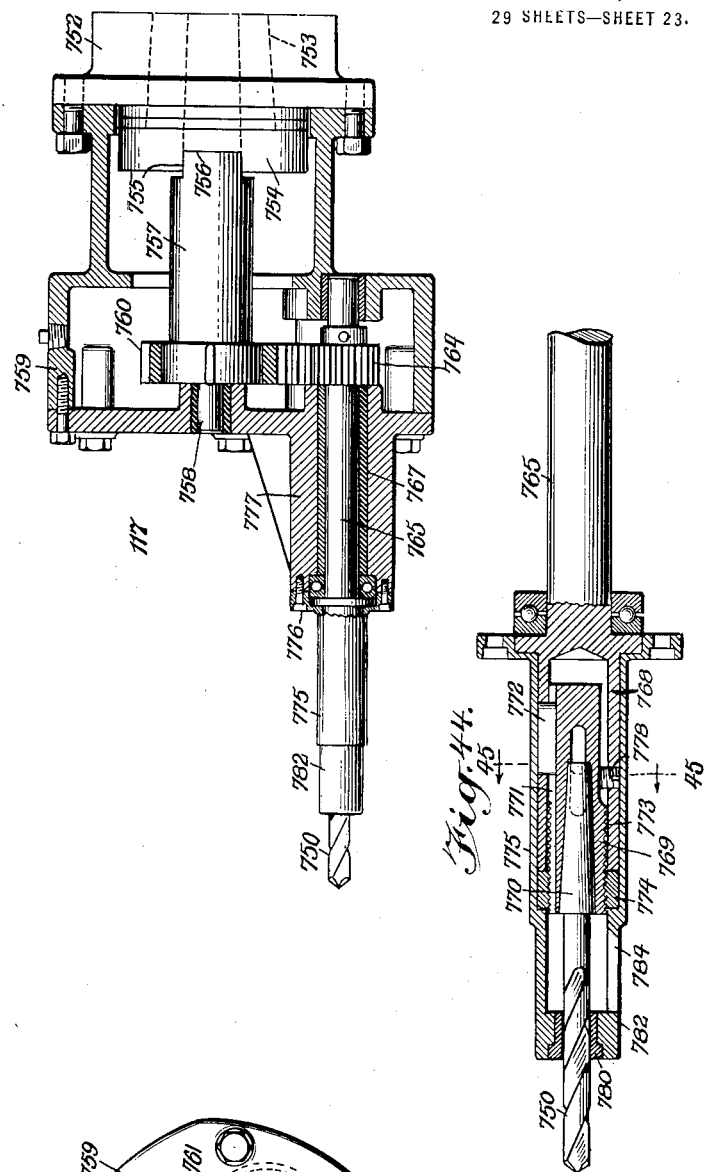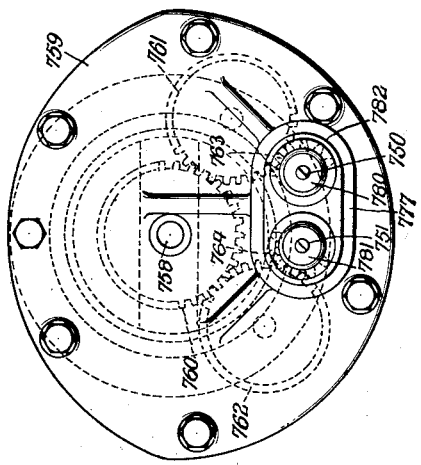

H. A. SCHWARTZ.
AUTOMATIC CHUCKING MACHINE.
APPLICATION FILED JUNE 17, 1920.

1,404,658. Patented Jan. 24, 1922.
29 SHEETS—SHEET 24.

WITNESSES

INVENTOR
HARRY A. SCHWARTZ
BY
ATTORNEYS

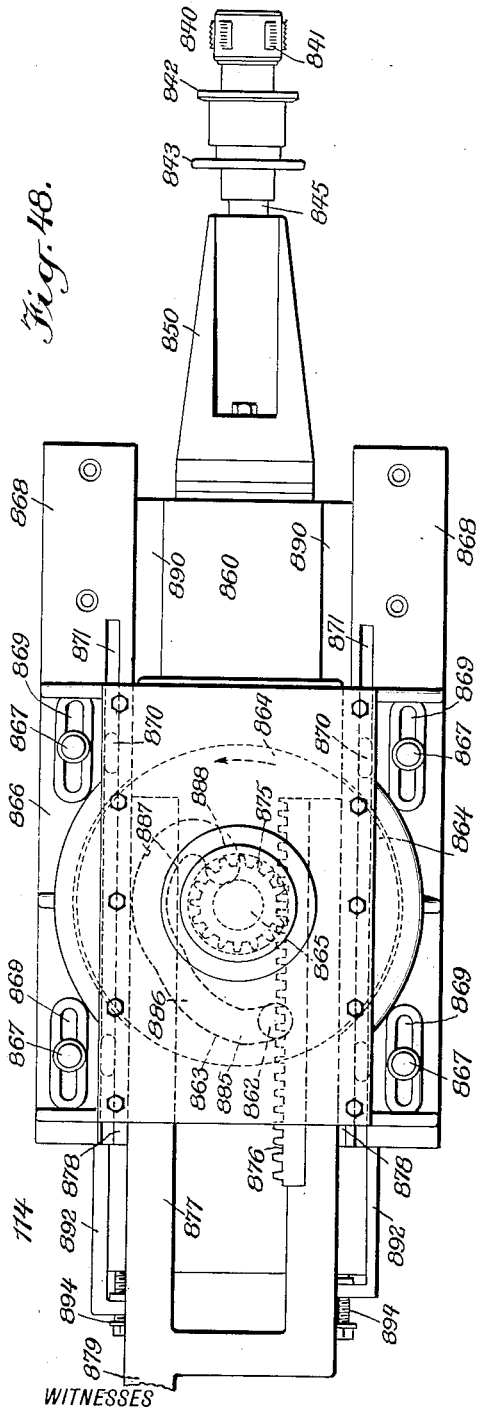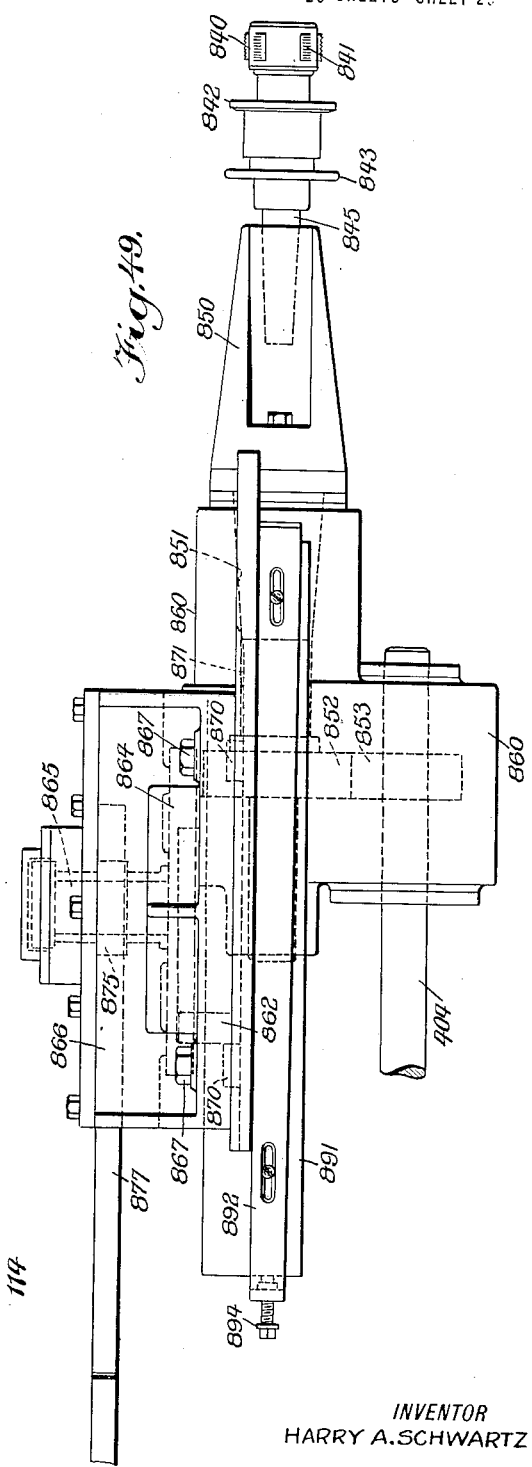

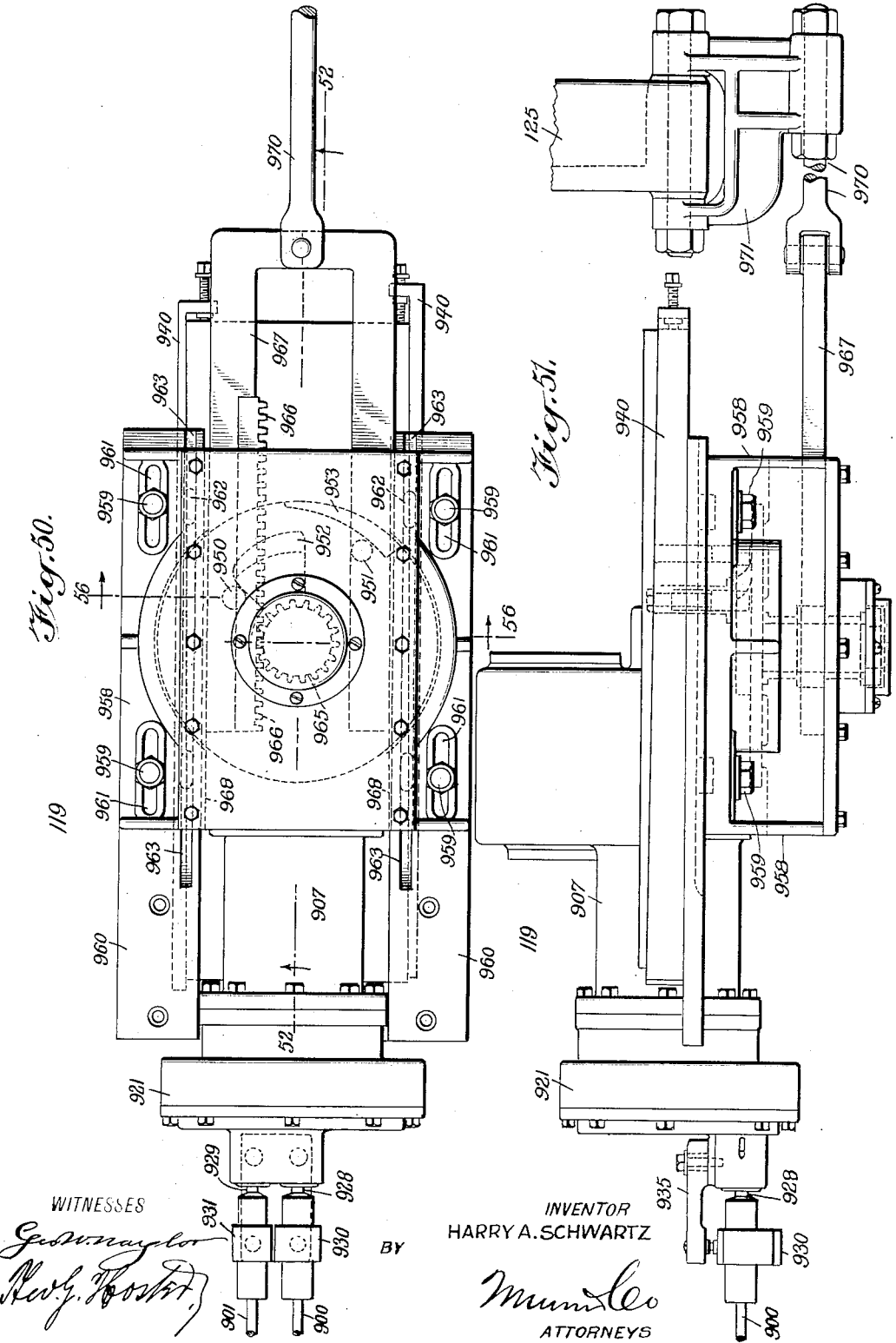

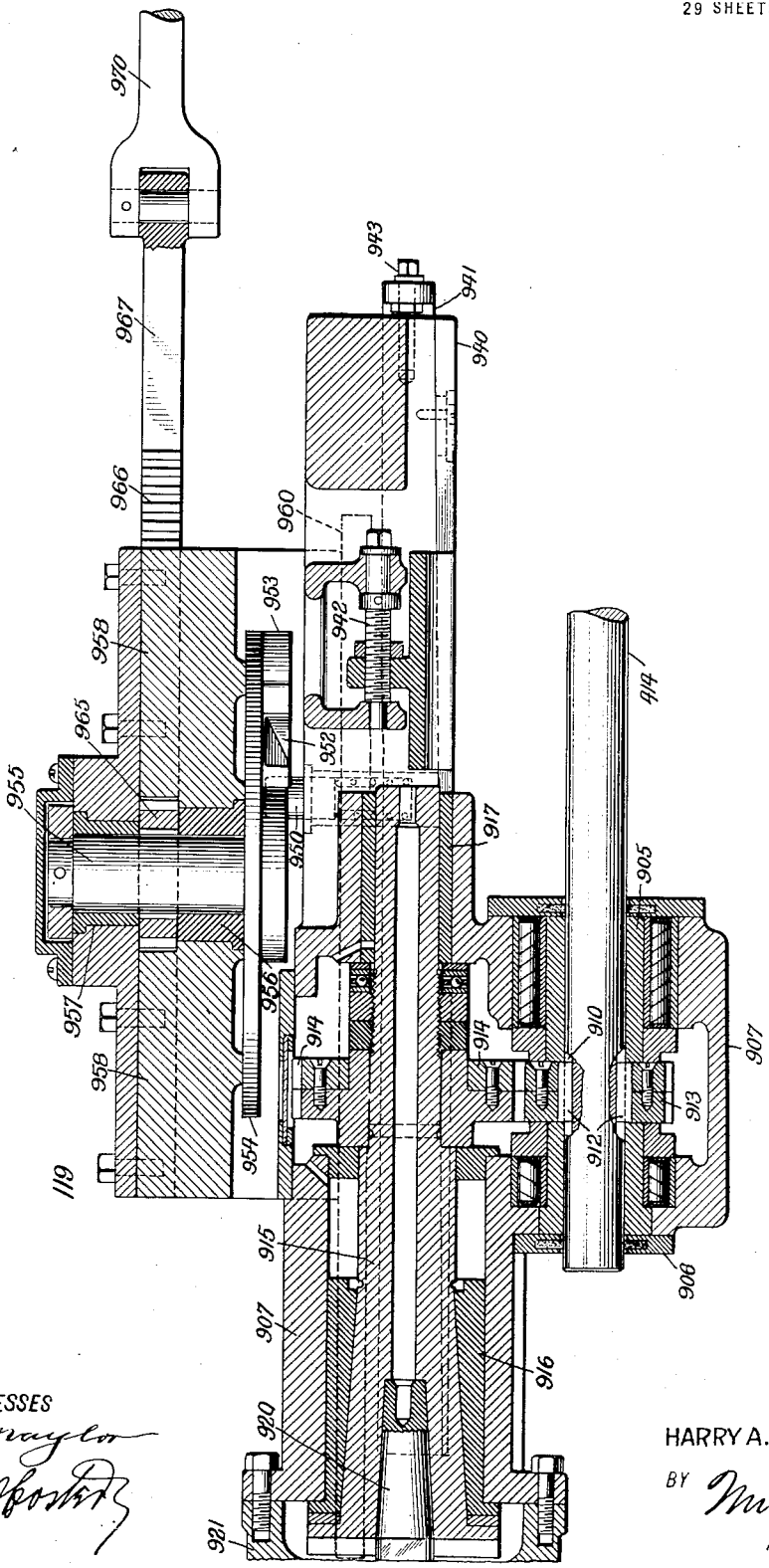

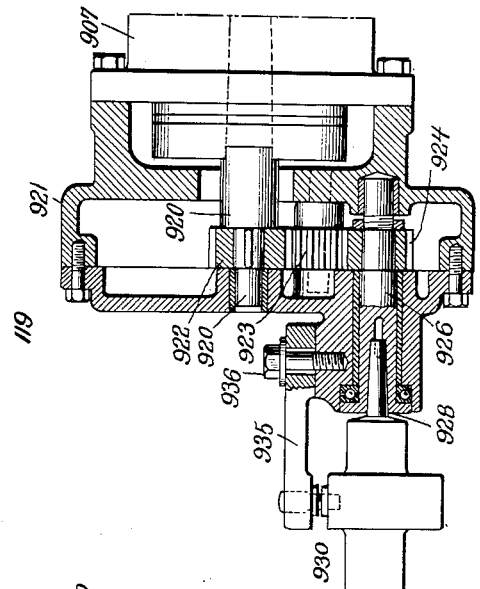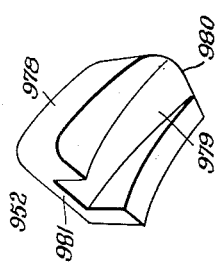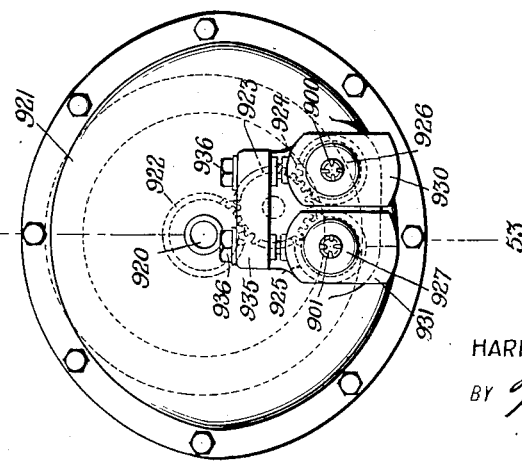

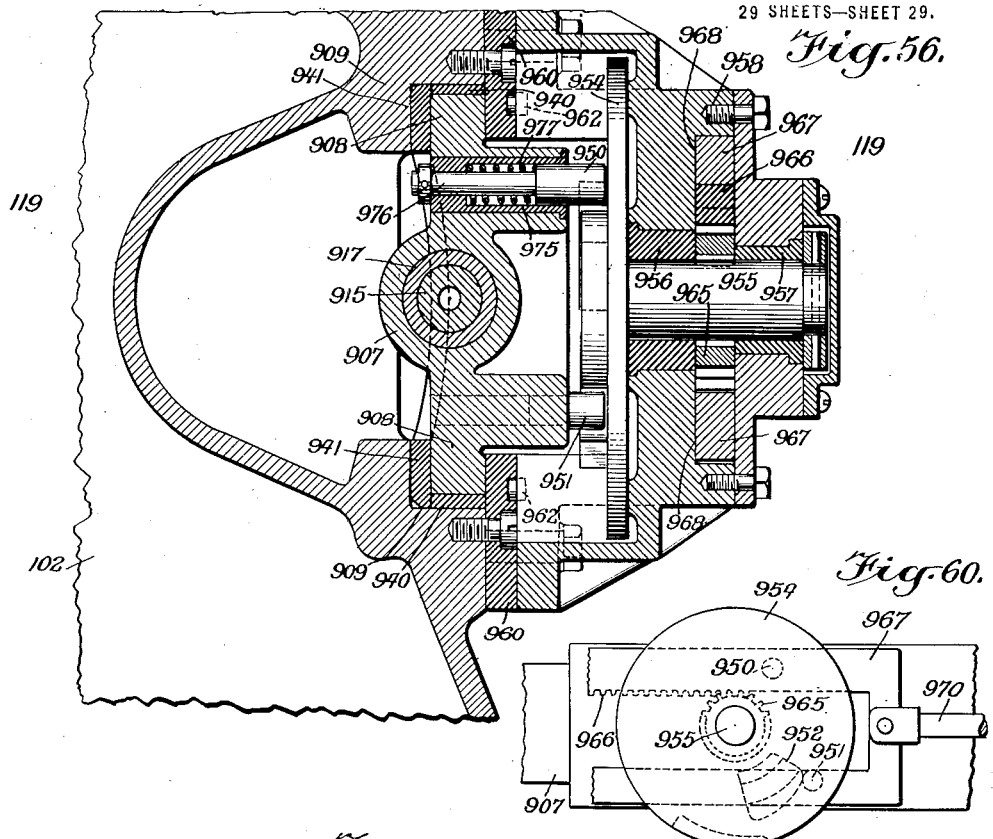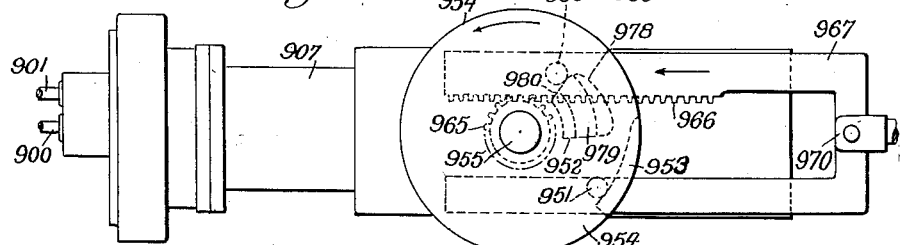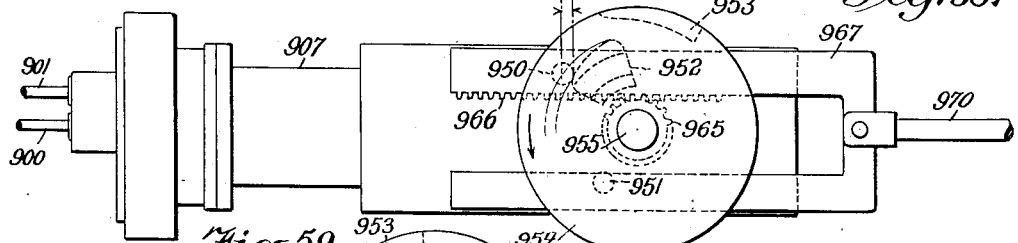

UNITED STATES PATENT OFFICE.

HARRY A. SCHWARTZ, OF DEFIANCE, OHIO, ASSIGNOR TO THE DEFIANCE MACHINE WORKS, OF DEFIANCE, OHIO, A CORPORATION OF OHIO.

AUTOMATIC CHUCKING MACHINE.

1,404,658. Specification of Letters Patent. Patented Jan. 24, 1922.

Application filed June 17, 1920. Serial No. 389,731.

*To all whom it may concern:*

Be it known that I, HARRY A. SCHWARTZ, a citizen of the United States, and a resident of Defiance, in the county of Defiance and State of Ohio, have invented a new and Improved Automatic Chucking Machine, of which the following is a full, clear, and exact description.

The invention relates to metal working machines of the high speed production type, and its object is to provide a new and improved automatic chucking machine arranged to automatically and successively carry out on a single casting or other piece of work a plurality of different operations, such as drilling, facing, tapping, reaming, milling, countersinking and the like, according to requirements, and without requiring changing of the position of the work in the work holder.

Another object is to permit of operating on a plurality of castings at the same time at both ends and in a predetermined sequence and without requiring readjustment or handling of the castings.

Another object is to enable a single, practically unskilled attendant to run the machine and take care of the work.

Another object is to turn out a large number of finished articles in a comparatively short time.

The improved automatic chucking machine in the embodiment shown in the drawings and hereinafter described in detail is designed for performing ten different tooling operations on a gear case for a differential gearing such as used in automobiles, but I do not limit myself to this particular arrangement of the machine as the latter can be used with the same or with different tools for performing other tooling operations besides the ones shown and hereinafter described without deviating from the spirit of the invention, it being understood that I reserve the right to resort to embodiments other than the one actually illustrated herein to the full extent indicated by the general meaning of the terms in which the claims are expressed and by variations in the phrasing of the same.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a front elevation of the improved automatic chucking machine;

Figure 2 is an enlarged elevation of the left-hand end of the same with the motor shown in broken lines and the motor shaft shown in section;

Figure 3 is a similar view of the right-hand end of the improved automatic chucking machine;

Figure 4 is a perspective view of the gearing for the several operating mechanisms;

Figure 5 is an enlarged longitudinal central section of the left-hand portion of the improved automatic chucking machine;

Figure 6 is a similar view of the right-hand portion of the same;

Figure 7 is an enlarged face view of the left-hand gearset;

Figure 8 is a longitudinal section of the same on the line 8—8 of Figure 7;

Figure 9 is an enlarged face view of the right-hand gearset;

Figure 10 is a longitudinal section of the same on the line 10—10 of Figure 9;

Figure 11 is an enlarged longitudinal central section of the turret;

Figure 12 is a cross section of the same on the line 12—12 of Figure 11;

Figure 13 is an enlarged face view of one of the work holders of the turret looking from the left to the right;

Figure 14 is a longitudinal central section of the same;

Figure 15 is an enlarged face view of the indexing mechanism looking from the right to the left, part being shown broken out;

Figure 16 is a longitudinal section of the same on the line 16—16 of Figure 15;

Figure 17 is a sectional side elevation of the locking device of the same, the section being on the line 17—17 of Figure 15;

Figure 18 is a perspective view of the indexing arm;

Figure 19 is a similar view of the trip arm of the indexing mechanism;

Figures 20, 21 and 22 are similar views of the members forming the cam device for the indexing mechanism;

Figure 23 is an enlarged longitudinal vertical section of the differential gearing;

Figure 24 is an end view of the same with part broken out and the shafts shown in section;

Figure 25 is a face view of the right-hand end of a piece of work finished by the automatic chucking machine, the work being in the form of a housing for the differential gear mechanism of an automobile or other machine;

Figure 26 is a longitudinal central section of the same;

Figure 27 is a similar view of an unfinished piece of work with the tools of the automatic chucking machine in position for facing two surfaces of the left-hand end and rough boring the hub on the right-hand end during the second stage of the operations;

Figure 28 is a similar view of the same illustrating the third stage of the operations, that is, drilling seven holes from the left to the right in the previously faced seven lugs of the work, and reaming the previously rough bored bore on the right-hand end of the work;

Figure 29 is a similar view of the same illustrating the fourth stage of operations, that is, rough boring two concentric bores and facing the hub on the left-hand end and drilling two holes in the bosses on the right-hand end of the work;

Figure 30 is a similar view of the same illustrating the fifth stage of operations, that is, reaming and chamfering the two previously rough bored holes on the left-hand end and spot facing all previously drilled nine holes in the right-hand end of the work;

Figure 31 is a similar view of the same illustrating the sixth stage of the operations, that is, tapping the previously bored and reamed small bore on the left-hand end and the previously bored bosses on the right-hand end of the work;

Figure 32 is an enlarged longitudinal central section of the facing head for carrying out the second stage operation on the left-hand end of the work;

Figure 33 is an enlarged inverted plan view of part of the rack mechanism shown in Figure 32;

Figure 34 is an enlarged cross section of the facing head, the section being on the line 34—34 of Figure 32;

Figure 35 is a similar view of the same on the line 35—35 of Figure 32;

Figure 36 is a plan view of the same;

Figure 37 is an enlarged cross section of the same on the line 37—37 of Figure 36;

Figures 46, 47:
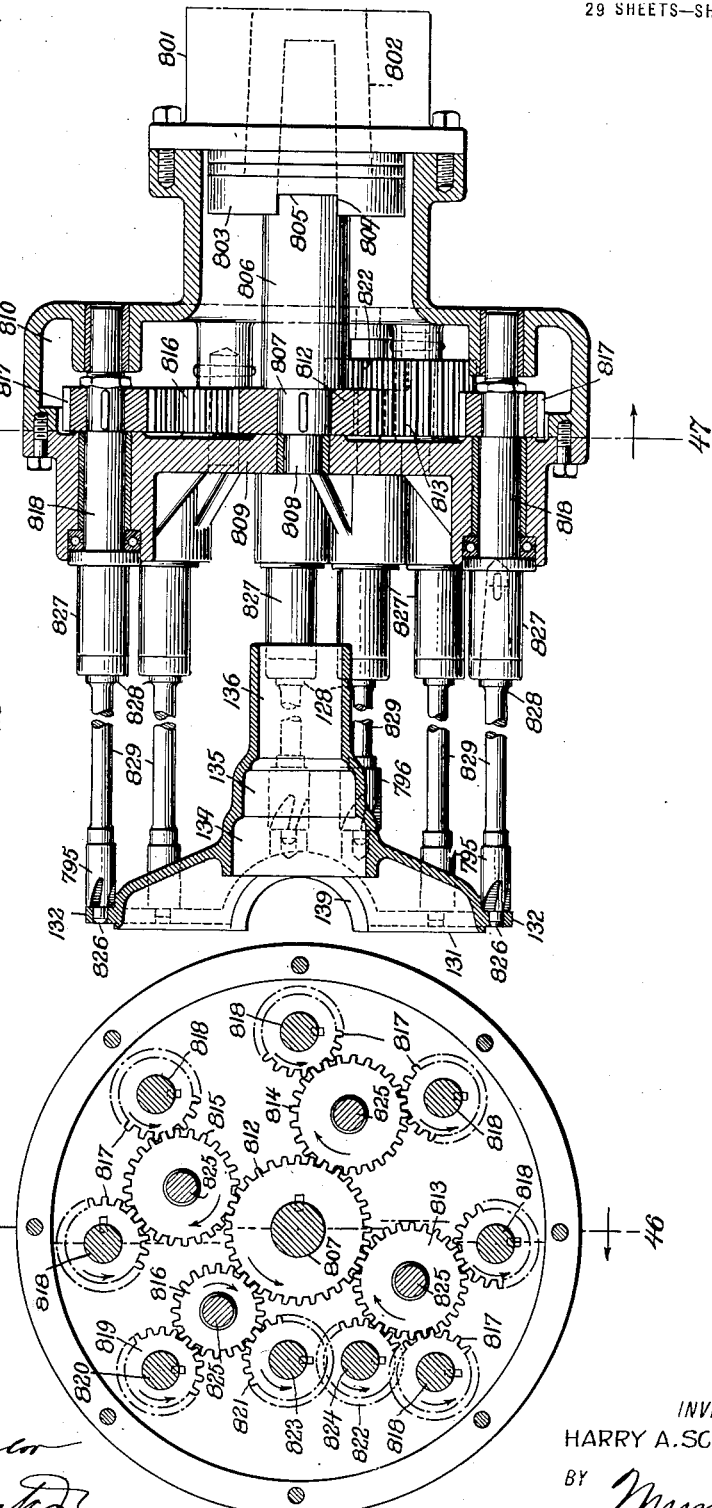

Figure 38 is an enlarged longitudinal central section of the rough boring mechanism for the right-hand end of the work during the second stage of the operations, a similar device being also used for the third stage of the operations on the right-hand end with the use of a differently shaped reamer, a similar device being also used for the fourth stage of the operations at the left-hand end of the work and with the use of a different boring and facing tool, and a similar mechanism being also used for the fifth stage of the operations at the left-hand end of the work with the use of a double reamer;

Figure 39 is a plan view of the same;

Figure 40 is an enlarged longitudinal central section of the drill mechanism for drilling simultaneously seven holes from the left to the right in seven lugs on the work during the third stage of the operations;

Figure 41 is a cross section of the same on the line 41—41 of Figure 40;

Figure 42 is an enlarged longitudinal central section of the drilling mechanism for drilling two holes in the bosses at the right-hand end of the work during the fourth stage of the operations;

Figure 43 is a face view of the same;

Figure 44 is an enlarged longitudinal section of the drilling chuck for the same;

Figure 45 is a cross section of the same on the line 45—45 of Figure 44;

Figure 46 is an enlarged longitudinal central section of the spot facing mechanism for the right-hand end of the work during the fifth stage of the operations, the section being on the line 46—46 of Figure 47;

Figure 47 is a cross section of the same on the line 47—47 of Figure 46;

Figure 48 is a plan view of the tapping head for tapping the inner portion on the left-hand end of the work during the sixth stage of the operations;

Figure 49 is a side elevation of the same;

Figure 50 is an enlarged sectional plan view of the tapping mechanism for tapping two boss holes on the right-hand end of the working during the sixth stage of the operations;

Figure 51 is a side elevation of the same;

Figure 52 is an enlarged sectional side elevation of the same on the line 52—52 of Figure 50;

Figure 53 is a longitudinal central section of the tapping head showing a tap in position on entering the work, the section being on the line 53—53 of Figure 54;

Figure 54 is a face view of the same;

Figure 55 is a perspective view of a cam of the tapping mechanism;

Figure 56 is an enlarged cross section of the tapping mechanism on the line 56—56 of Figure 50; and Figures 57 to 60 are diagrammatic plan views of the different positions of the cam control for the carriage of the tapping mechanism.

General construction.

The improved automatic chucking machine is mounted on a suitably constructed base 100 on which are secured in spaced relation the supports 101, 102 provided with bearings 103, 104 (see Figure 11) in which are journaled the ends of the horizontal hub 105 of a work holding turret 106 of polygonal shape and rotating intermittently between the supports 101, 102. The turret 106 is adapted to support at one time a plurality of identical pieces of work 107, such, for instance, as gear cases for automobiles and other machines (see mainly Figures 13, 14, 25, 26, 27, 28, 29, 30 and 31). On the support 101 are mounted to slide longitudinally tooling heads 110, 111, 112, 113 and 114 (see Figures 1 and 2), and tooling heads 115, 116, 117, 118 and 119 are mounted to slide longitudinally on the support 102 (see Figures 1 and 3). The tooling heads 110, 111, 112, 113 and 114 are connected with a cross head 120 mounted to slide on a longitudinal guideway 121 arranged on top of a support or standard 122 attached to the base 100 at the left-hand end thereof, and the tooling heads 115, 116, 117, 118 and 119 are connected with a crosshead 125 mounted to slide on a longitudinal guideway 126 arranged on the top of a support or standard 127 attached to the base 100 at the right-hand end thereof, as plainly shown in Figure 1. The crossheads 120 and 123 move simultaneously toward and from each other, that is, toward and from the corresponding supports 101 and 102, and thus the two sets of tooling heads 110, 111, 112, 113, 114 and 115, 116, 117, 118, 119 are simultaneously fed inward toward the opposite faces of the turret 106 to engage their tools endwise with the several pieces of work 107 held at the time in the turret while the latter is at rest, and after the tooling operations are completed the crossheads 120 and 125 move the said sets of tooling heads outward out of engagement with the pieces of work 107 and away from the turret 106 to allow of giving a partial turning movement to the turret. The initial movement and the return movement of the crossheads 120, 125 and the corresponding tooling heads is quick in comparison to the slow feeding movement, that is, during the time the tools are in engagement with the work.

The work.

The particular piece of work 107 to be finished in this machine is shown in Figures 13, 14, 25, 26, 27, 28, 29, 30 and 31, and is in the form of a half member of a casing or housing having a body 130 provided with an edge 131 to be faced, attaching lugs 132 to be faced on the left-hand face (Figure 27), drilled (Figure 28), and spot faced (Figure 30) on the right-hand face; a hub 133 having three concentric bores 134, 135 and 136, of which the bore 134 is to be bored (Figure 29) and reamed (Figure 30), the bore 135 is to be bored (Figure 29), reamed (Figure 30), and tapped (Figure 31), and the bore 136 is to be bored (Figure 27) and reamed (Figure 28); and two bosses 137, 138 to be drilled (Figure 29), spot faced (Figure 30), and tapped (Figure 31). The body 130 is provided on its rim with a flattened rim portion 139.

Work holding turret.

The body 140 of the work holding turret 106, shown in detail in Figures 11, 12, 13 and 14, is of octagon shape and is given intermittently one-eighth of a revolution after each tooling operation is completed, and the crossheads 120, 125 move into outermost position. Adjacent the eight sides of the turret 106 are arranged eight work holders alike in construction so that it suffices to describe but one in detail, it being understood that each work holder is arranged to hold one of the pieces of work 107 during the time the tooling operations are performed thereon and the turret is in its period of rest. When the turret is at rest, one of the work holders is at the front to permit the attendant to remove a finished piece of work and to place an unfinished piece of work in position in this tool holder, it being understood that by this arrangement an unloading and loading station is provided at the front of the machine. The work is next successively carried by the turret to four tooling stations arranged upwardly and rearwardly from the loading and unloading station, and another tooling station is next below the unloading and loading station, while during two periods of rest the work is not subjected to any action, that is, during the time the work passes to lowermost position. The body 140 is provided adjacent each side with two concentric bores 141, 142 having their common axis parallel with the turret axis, and the several axes of the concentric bores 141, 142 are spaced equal distances apart and are arranged in a circle, the center of which coincides with the turret axis, as will be readily understood by reference to the figures above referred to, particularly Figure 12. The large bore 141 extends from the left-hand face of the turret body and the small bore 142 extends from the right-hand face of the turret body, as plainly shown in Figures 11 and 14, and into the bore 141 fits a bushing 143 in which is mounted to slide a sleeve or thimble 144 pressed toward the left by springs 145 each arranged in registering recesses 146 and 147 formed in the right-hand end of the sleeve 144 and the turret body 140. By the arrangement described the sleeve 144 is free to yield longitudinally and its sliding movement is limited by a stop screw 148 screwing in the turret body 140 and extending into a groove 149 formed in the peripheral face of the sleeve 144. The sleeve 144 is provided on the left-hand end with a flaring mouth 150 through which extends the hub 133, the smaller right-hand end portion of which extends through the sleeve into the bore 142 of the turret body 140. The sleeve 144 is provided interiorly adjacent the inner end of the flaring mouth 150 with integral centering lugs 151 for seating and centering the hub 133 in the sleeve 144. The right-hand face of the body 130 of the piece of work 107 is adapted to abut against stop and centering lugs 155 attached to the left-hand face of the turret body 140, thus limiting the movement of the piece of work 107 when inserted by the attendant into the turret from the left to the right.

In order to clamp the piece of work 107 in position on the lugs 151, 155, use is made of a clamping ring 160 provided at its inner face with lugs 161 adapted to engage the work casing body 130 at the left-hand face thereof, and the said ring 160 is mounted to turn on trunnions 162 held in a fork 163 provided with an arm 164 mounted to swing outward and inward on a pivot 165 held in eyes 166 formed in a plate 167 fastened by bolts or other fastening means 168 to the corresponding side of the turret body 140. The arm 164 is provided at its pivotal end with a heel 170 adapted to be engaged by one end of an arm 171 mounted to swing on a radially disposed pivot 172 held on an arm 173 mounted to swing on the pivot 165 as a fulcrum. The right-hand end of the arm 171 is provided with a boss 175 in which screws a set screw 176 engaging a step or seat 177 attached to the corresponding side of the turret body 140. By the arrangement described the arm 171 is free to swing on the pivot 172 to engage or disengage the heel 170, and the arm 171 swings bodily up or down with the arm 173 mounted on the pivot 165 carried by the lugs 166 forming part of the fixed plate 167. Thus when the several parts are in the position shown in Figures 11, 13 and 14 and the screw 176 is screwed up against the seat 177 by the attendant of the machine then the arm 173 carrying the arm 171 is caused to swing outward and in doing so the arm 171 bearing against the heel 170 swings the fork 163 from the left to the right thus causing the ring 160 to press against the casing body 130 from the left to the right to firmly seat the casing body on the sets of lugs 151 and 155. By the arrangement described the casing body 130 is firmly clamped in position in the work holder and at the same time is accurately centered in the sleeve 144.

After the tooling operations have been completed and the finished piece of work reaches the front of the machine at the loading and unloading station, then the attendant unscrews the screw 176 from the step 177 and imparts a swinging movement to the arm 171 to disengage the latter from the heel 170 thereby unlocking the fork 163 to permit the attendant to swing the fork sidewise to the left and with it the clamping ring 160 to clear the casing body 130 to allow the workman to remove the finished casing sidewise to the left from the work holder. An unfinished casing is now placed in position on this work holder at the loading station and then the fork 163 with its ring 160 is swung back into clamping position, after which the arm 171 is returned to normal position and the screw 176 is screwed against its step 177 to center and lock the casing in position in the work holder. It is understood that the tighter the attendant screws the screw 176 against the step 177 the firmer the ring 160 engages with its lugs 161 the casing body 130 to firmly clamp the latter in place in the work holder. By reference to Figures 13 and 14 it will be noticed that the arm 164 of the clamping device extends through the recess of the flattened rim portion 139 of the piece of work 107 thus spacing the clamping ring 160 and the arm 164 inward from the edge 131 of the work to allow proper facing of the edge 131 and the left faces of the lugs 132 as hereinafter more fully described. The opening of the clamping ring 160 is concentric with the bores 134, 135 and 136 and is larger in diameter than the largest bore 134 to allow boring, reaming and tapping tools to pass through the ring 160 for boring and reaming the bores 134 and 135 and tapping the bore 135, as hereinafter more fully explained.

In order to enable the attendant to place the work 107 with the flat portion 139 parallel with the corresponding side of the turret body 140 use is made of a positioning button 180 adapted to pass between the two bosses 137, 138 (see Figures 13 and 14). The button 180 is provided with a stem 181 mounted to slide in a recess 182 formed in the turret body 140, and in the bottom of this recess 182 is held a spring 183 pressing the stem 181 and its button 180 outward from the right to the left, thus allowing the button 180 to yield longitudinally. The stem 181 is provided with a slot 184 through which extends a pin 185 held on the turret body 140 to limit the yielding movement of the stem 181 and its button 180. The turret body 140 is provided at each work holder with a series of (seven) tubular guides 190 in alinement longitudinally with the corresponding (seven) lugs 132 of the casing body 130, and two similar guides 191 and 192 are arranged on the turret body 140 in alinement with the bosses 137, 138 of the casing body 130. It is understood that the guides 190, 191 and 192 permit the passage of the tools for tooling the lugs 132 and the bosses 137, 138, as hereinafter more fully explained.

*Indexing mechanism.*

In order to intermittently rotate the work holding turret 106 use is made of a Geneva indexing mechanism, shown in detail in Figures 11, 15, 16, 17, 18, 19, 20, 21 and 22. On the right-hand end of the hub 105 of the work holding turret 106 is secured an index or star wheel 200 provided with eight radial slots 201, of which the one in lowermost position at the time is adapted to be engaged by a friction roller 202 mounted on an arm 203 keyed or otherwise secured to a short shaft 204 journaled in suitable bearings 205, 206 arranged on the support 102. The axis of the shaft 204 is parallel to the axis of the work holding turret 106. The arm 203 is provided with a semicircular detent 207 engaging similarly shaped recesses 208 formed in the peripheral face of the star wheel 200 intermediate adjacent slots 201. The detent 207 periodically locks the star wheel 200 against turning. On the arm 203 is journaled a roller 210 adapted to engage a cam arm 211 having its hub 212 secured on a shaft 213 parallel to the shaft 204 and journaled in a bearing 214 arranged on the support 102. On the hub 212 is secured or formed an arm 215 provided at its free end with a slot 216 through which extends a pin 217 attached to a bolt 218 mounted to slide in a bolt casing 219 fastened by bolts 220 or other fastening means to the support 102. The casing 219 is provided with a slot 221 through which projects the pin 217 to limit the sliding movement of the bolt 218. A spring 222 is held in the bolt casing 219 and presses against the lower end of the bolt 218 to shoot the upper free end thereof into engagement with one of eight keepers 223 arranged on the peripheral face of the star wheel 200 to the left of the recesses 208. It will be noticed that the bolt 218 normally locks the star wheel 200 and consequently the work holding turret 106 against accidental rotation. The friction roller 210 during each revolution of the shaft 204 engages the cam arm 211 and imparts a swinging motion to the same and to the arm 215 whereby the latter withdraws the bolt 218 from the corresponding keeper 223 at the time the friction roller 202 enters the lowermost slot 201. The star wheel 200 is now unlocked and on the further rotation of the shaft 204, the friction roller 202 imparts a turning motion to the star wheel 200 and consequently to the work holding turret 106 until the latter has made one eighth of a revolution, and at this time the friction roller 202 passes out of the slot 201. During the time the friction roller 202 is in engagement with the slot 201, the friction roller 210 drops off the end of the cam arm 211, that is, at the time the corresponding keeper 223 has passed the outer end of the bolt 218, and the bolt 218 is now pressed by its spring 222 in engagement with the peripheral face of the star wheel 200, and the bolt snaps into the next following keeper 223 at the time the friction roller 202 leaves the slot 201. Thus the star wheel 200 and the work holding turret 106 are locked against rotation after one-eighth of a revolution has been made.

A supplementary locking device is provided for the work holding turret 106, and this locking device is controlled from the shaft 213 and is arranged as follows: On the shaft 213 is secured a crank arm 225 having its crank pin 226 engaging a crank arm 227 having its hub 228 mounted to turn loosely on the reduced end 229 of a locking bolt 230 mounted to slide longitudinally in a sleeve 231 provided with a cam head 232 fastened by bolts 233 or other fastening devices to a sleeve 234 attached to the support 102. The left-hand end 235 of the bolt 230 is adapted to engage one of a series of eight notches or keepers 236 formed in a keeper ring 237 secured to the right-hand face of the work holding turret 106, as plainly shown in Figures 11, 12 and 16. The bolt 230 is pressed from the right to the left by a spring 240 arranged in the sleeve 231 and coiled around a part of the reduced portion 229 of the bolt 230. The sliding movement of the bolt 230 is limited by a stop pin 241 held on the sleeve 231 and engaging a slot 242 formed in the peripheral face of the bolt 230 (see Figure 16). The head 232 of the sleeve 231 is provided with a cam 245 engaged by a cam 246 formed on the adjacent face of the hub 228 of the crank arm 227. The hub 228 is provided with a recess 247 in which is arranged a thrust bearing 248 engaged by a collar 249 fastened by a pin 250 to the reduced end 229 of the bolt 230. At the time the bolt 218 is in engagement with a keeper 223 then the end 235 of the bolt 230 is in engagement with the keeper 236 on the ring 237, and when the bolt 218 is withdrawn from its keeper 223 by the rocking action given to the arms 211, 215, as above explained, then the rotation given to the shaft 213 causes the crank arm 225 to rock the crank arm 227 whereby the latter's cam face 246 is caused to turn on the stationary cam face 245 of the fixed sleeve 231 whereby the crank arm 227 is moved from the left to the right thus moving the bolt 230 in the same direction, that is, withdrawing it from the corresponding keeper 236 in the keeper ring 237. Thus the bolt 230 is withdrawn from its keeper practically at the same time that the bolt 218 moves out of engagement with its keeper 223.

It is understood that when the bolt 230 is withdrawn from the keeper 236 by the action of the crank arm 227, the spring 240 is compressed and as soon as the friction roller 210 drops off the cam arm 211 then the spring 240 returns the bolt 230 and the free end 235 thereof now travels on the face of the keeper ring 237 until the next keeper 236 is reached and engaged by the end 235 of the bolt 230. It is understood that the shaft 213 is returned to normal position by the action of the spring 222 shooting the bolt 218 outward at the time the latter registers with the next following keeper 223. It will be noticed that the keeper ring 238 is comparatively large relative to the star wheel 200 and hence an accurate and strong locking of the work holding turret 106 is had by the bolt 230 engaging one of the keepers 236 of the keeper ring 237 in addition to the locking bolt 208 engaging a corresponding keeper 223.

*Feeding mechanism.*

The crossheads 120 and 125 form part of feeding mechanisms for feeding the sets of tooling heads 110, 111, 112, 113, 114 and 115, 116, 117, 118, 119 slowly while the tools thereof are in engagement with the work for returning the said heads and giving the same an initial movement at a higher rate of speed. The crossheads 120 and 125 are actuated in unison by the actuating mechanisms shown in Figures 5 and 6, and the actuating mechanism for the crosshead 125 also controls the rotation of the shaft 204 of the indexing device above described. The crossheads 120, 125 are provided with vertically disposed bearings 260, 261 in which are journaled the stems 262, 263 of friction rollers 264, 265 engaging cam grooves 266, 267 formed in the peripheral faces of the cams 268, 269 mounted on shafts 270, 271 journaled in suitable bearings 272, 273 arranged on the end supports 122, 127. On the shafts 270, 271 are secured worm wheels 274, 275 in mesh with worms 276, 277 secured or formed on transverse worm shafts 278, 279 journaled in suitable bearings arranged in the end supports or standards 122 and 127. The shafts 278 and 279 may be turned by hand and for this purpose the forward ends of the said shafts terminate at the front of the machine in polygonal portions 280, 281 (see Figures 1 and 4) to permit the application of a crank or other suitable tool for turning the shafts 278, 279 with a view to rotate the shafts 270, 271 and their cams 268, 269 to move the cross-heads 120 and 125 simultaneously towards or from each other. A gear wheel 285 (see Figures 4 and 6), preferably of the herringbone type, rotates with the cam 269 and is in mesh with a similar intermediate gear wheel 286 having its shaft 287 journaled in the support 127. The intermediate gear wheel 286 is in mesh with a similar gear wheel 290 secured on the right-hand end of a shaft 291 journaled in suitable bearings 292, 293, of which the bearing 292 is arranged on the support 127, and the bearing 293 is arranged on the support 102 (see Figure 1). On the left-hand end of the shaft 291 is secured a gear wheel 294 in mesh with a gear wheel 295 secured on a hub 296 (see Figures 15 and 16) secured on the shaft 204. Thus when the cam 269 is rotated, a rotary motion is transmitted by the gearing just described to the shaft 204 of the indexing mechanism to actuate the latter as above explained.

*Differential gearing.*

The shafts 278 and 279 of the feeding mechanisms are normally driven in unison by power and alternately at high and low speeds, and for this purpose the following arrangement is made, special reference being had to Figures 4, 5, 23 and 24. The rear ends of the shafts 278, 279 are provided with bevel gear wheels 300, 301 in mesh with bevel gear wheels 302, 303, secured on shafts 304, 305 coupled to the ends of a differential gearing shaft 306 by the use of couplings 307, 308 (see Figures 4 and 23) it being understood that the said shafts 304, 305, 306 have a common axis, and this sectional shaft is arranged on the rear of the machine and is journaled in suitable bearings 309, 310, and 311, of which the bearings 309 and 310 form housings for the bevel gear wheels 300, 302 and 301, 303 and are attached to the base 100, and the bearings 311 are located intermediate the bearings 309, 310 and are likewise attached to the base 100.

On the differential gearing shaft 306 is mounted to rotate loosely a gear wheel 320 on which are journaled a plurality of shafts 321 arranged parallel to the shaft 306 and located in a circle, the center of which coincides with the axis of the shaft 306. On each of the shafts 321 is secured a pinion 322 in mesh with a central gear wheel 323 keyed or otherwise secured to the shaft 306. On each shaft 321 is mounted to rotate loosely a pinion 324 in mesh with a gear wheel 325 mounted to rotate loosely on the shaft 306, and on the hub 326 of the gear wheel 325 is keyed or otherwise secured a ratchet wheel 327 engaged by a gravity pawl 328 fulcrumed on a stud 329 attached to the gear casing 330 of the differential gearing and attached to the base 100. The pawl 328 is provided with a counterweight 331 to normally hold the pawl in engagement with the ratchet wheel 327 to hold the latter against return movement. It is understood that the device described is a planetary gearing. The ends of the casing 330 are provided with bearings 332, 333 for the shaft 306 to rotate in.

On the right-hand face of the gear wheel 320 is formed a friction clutch member 335 adapted to be engaged by a friction clutch member 336 mounted to turn loosely and to slide lengthwise on the shaft 306. The hub 337 of the clutch member 336 is engaged by a pin 338 held on the head 339 of a rod 340 extending centrally in a bore 341 formed in the right-hand end of the shaft 306. The pin 338 extends through slots 342 formed in the shaft 306 to allow the pin to move lengthwise on the shaft with a view to move the clutch member 336 into and out of the clutch member 335 of the gear wheel 320. A spring 343 is coiled on the rod 340 and presses with one end against the head 339 and abuts with its other end on a bearing 344 screwed or otherwise secured in the right-hand end of the shaft 306. Thus the spring 343 tends to move the clutch member 336 into frictional engagement with the clutch member 335. The gear wheel 320 is driven at a high speed and when the clutch member 336 is in engagement with the clutch member 335 then the gear wheel 320 rotates the shaft 306 at the same high speed owing to the connection of the clutch member 336 with the shaft 306 by the pin 338. When the clutch member 336 is thrown out of engagement with the clutch member 335 then the rotary movement of the gear wheel 320 is transmitted by the planetary gearing described to the shaft 306 at a low rate of speed. It is understood that the gear wheel 325 is held stationary by the ratchet wheel 327 and its pawl 328, and as the shafts 321 are carried around by the gear wheel 320, the pinions 324 are rotated by being in mesh with the stationary gear wheel, and this rotary motion of the pinions 324 causes the smaller pinions 322 to rotate while being carried around with the shafts 321, thus imparting a slow rotary motion to the gear wheel 323 keyed to the shaft 306.

In order to move the friction clutch member 336 periodically out of engagement with the clutch member 335 the following arrangement is made: On the hub 337 of the friction clutch member 336 is mounted a shifting ring 350 engaged by a shifting fork 351 secured on a transverse shaft 352 journaled in the gear casing 330. One end of the shaft 352 extends to the outside of the casing 330 and on this outer end is secured an arm 353 pivotally connected by a link 354 with an arm 355 projecting from a hub 356 mounted to turn on a bearing 357 attached to the end of the gear casing 330 adjacent the bearing 333. From the hub 356 extends upwardly an arm 358 connected by an adjustable rod 359 with a slide 360 mounted to slide in a guideway 361 attached to the support 101. On the slide 360 is mounted a friction roller 362 traveling on the peripheral face of a revoluble speed controlling cam 363 provided with a raised portion 364 to impart a sliding movement to the slide 306 with a view to cause the rod 359 to impart a swinging motion to the arms 358, 355 and by the link 354 to the arm 353 and the fork 351 to move the clutch member 336 out of engagement with the clutch member 335. The cam 363 is adjustably secured to a disk 365 keyed or otherwise fastened to the right-hand end of the shaft 270 of the cam 268 (see Fig. 5). The adjustable connection between the cam 363 and the disk 365 is preferably by the use of intermeshing radial teeth 366 and 367 formed on the adjacent faces of the cam 363 and the disk 365, as will be readily understood by reference to Figures 5 and 24. The cam 363 is held in place by a washer 368 engaged by a bolt 369 screwing in the right-hand end of the shaft 270 (see Figure 5). It is understood that during the major portion of a revolution of the shaft 270 and its cam disk 268 the clutch member 336 is in engagement with the clutch member 335 to rotate the shaft 306 at a high speed, and during the remaining minor portion of a revolution of the shaft 270 the shaft 306 is rotated at a low speed from the gear wheel 320 by the planetary gearing above described. It is understood that the length of the raised cam portion 364 of the cam 363 is preferably less than one-half of the circumference of the cam 363 so that the shaft 306 is rotated at a low speed at the time the tools are in engagement with the work. During the time the friction roller 362 is in engagement with the peripheral face of the cam 363 intermediate the ends of the raised portion, the shaft 306 is rotated at a high rate of speed, that is, during the time the tools return and again move up to the work. From the foregoing it will be seen that the cam 363 on the shaft 270 of the crosshead cam 268 controls the differential gearing and hence the speeds of the shafts 278 and 279 of the feeding mechanism for the crossheads 120 and 125 to move the latter inward toward each other, first at a high initial speed and then at a low speed while the return or outward movement of the crossheads is also at a high speed.

*Driving mechanism.*

The gear wheel 320 of the differential gearing is driven at a high speed from a motor 380, preferably of the electric type, and mounted on a bracket 381 bolted or otherwise fastened to the left-hand end of the base 100. The right-hand end of the motor shaft 382 extends into a gear housing 383 mounted on the base 100 and on this end of the shaft 382 is secured a sprocket wheel 384 (see Figure 4) connected by a sprocket chain 385 with a sprocket wheel 386 secured on a longitudinally extending shaft 387 journaled in the housing 383 and projecting with its right-hand end into the lower portion of the support 101. On this end of the shaft 387 is secured a pinion 388 (see Figure 4) in mesh with a gear wheel 389 mounted to turn loosely on a bearing 390 mounted on a stud shaft 391 held on the support 101 (see Figure 5.) The gear wheel 389 is preferably of the herringbone type, and in mesh with a pinion 393 (see Figure 24) secured on the right-hand end of a shaft 394 extending from the support 101 into a housing 395 forming an extension or part of the housing 330 of the differential gearing. On the shaft 394 within the housing 395 is secured a gear wheel 396 in mesh with an intermediate gear wheel 397 mounted on a shaft 398 journaled in the housing 395. The intermediate gear wheel 397 is in mesh with the gear wheel 320 of the differential gearing shown in Figures 23 and 24, to rotate the said gear wheel 320 continually from the motor 380 at a high speed, as previously mentioned.

Gearsets.

The tooling heads 110, 111, 112, 113 and 114 on the support 101 are provided with longitudinal spindles 400, 401, 402, 403, 404 (see Figure 4) forming part of a gearset 405 mounted in a housing 406 attached to the support 101 (see Figures 1, 5, 7 and 8), and the tooling heads 115, 116, 117, 118 and 119 are provided with longitudinal spindles 410, 411, 412, 413, 414 (see Figure 4) forming part of a gearset 415 mounted in a housing 416 attached to the support 102 (see Figures 1, 9 and 10). The gearsets 405 and 415 are driven from the motor driven gear wheel 389 previously mentioned, and for this purpose the following arrangement is made, special reference being had to Figures 4, 5, 7, 8, 9, 10 and 11: The gear wheel 389 is in mesh with a master gear wheel 420 secured on a longitudinally extending shaft 421 journaled at its left in bearings 422 and 423 arranged on the housing 406 of the gearset 405. The shaft 421 extends centrally through the left-hand portion of the hub 105 of the work holding turret 106, and this portion of the shaft 421 is journaled in suitable bearings 424 and 425 arranged in this portion of the hub 195. The right-hand end of the shaft 421 is provided with a bevel gear wheel 430 in mesh with an intermediate bevel gear wheel 431 secured on a stud 432 journaled in a suitable bearing 433 (see Figure 12) arranged on the work holding turret 106. The intermediate bevel gear wheel 431 is in mesh with a bevel gear wheel 435 secured on the left hand end of a shaft 436 extending centrally through the right hand portion of the hub 105 and journaled in suitable bearings 437, 438 arranged in this portion of the hub 105 of the work holding turret 106. When the machine is running a continuous rotary motion is given to the shaft 421 from the motor 380 and this rotary motion given to the shaft 421 is transmitted to the shaft 436 by the bevel gear wheels 430, 431 and 435 to rotate the shaft 436 in the reverse direction in which the shaft 421 is rotated.

In order to drive the spindles 400, 401, 402, 403 and 404 of the tooling heads 110, 111, 112, 113 and 114 from the shaft 421, the following arrangement is made, special reference being had to Figures 4, 5, 7 and 8: On the shaft 421 within the housing 406 of the gearset 405 is keyed or otherwise secured a gear wheel 440 in mesh with a larger gear wheel 441 secured on a shaft 442 journaled in the housing 406. The gear wheel 441 is in mesh with a smaller gear wheel 443 secured on a shaft 444 journaled in the housing 406, and the gear wheel 443 is in mesh with a gear wheel 445 secured on a shaft 446 journaled in the housing 406. On the shaft 446 is secured a small gear wheel 447 in mesh with a larger gear wheel 448 secured on the spindle 400. When the machine is running, the rotary motion given to the shaft 421, as previously explained, is transmitted by the train of gear wheels 440, 441, 443, 445, 447 and 448 to the spindle 400 to rotate the latter. In order to rotate the spindle 401 from the shaft 421 the latter is provided with a small gear wheel 450 in mesh with a larger gear wheel 451 secured on a shaft 452 journaled in the housing 406. The gear wheel 451 is in mesh with a small gear wheel 453 secured on a shaft 454 journaled in the housing 406 and on this shaft 454 is secured a gear wheel 455 in mesh with a small gear wheel 456 secured on a shaft 457 journaled in the housing 406. On the shaft 457 is secured a gear wheel 458 in mesh with a small gear wheel 459 secured on the spindle 401 and hence when the machine is running and the shaft 421 is rotated then a rotary motion is transmitted to the spindle 401 by the train of gear wheels just described.

The spindle 402 is driven from the gear wheel 451 and for this purpose the spindle 402 is provided with a gear wheel 460 in mesh with the gear wheel 451. The spindle 403 is provided with a gear wheel 461 in mesh with a gear wheel 462 secured on the shaft 452 previously mentioned, and when the latter is rotated a rotary motion is given by the gear wheels 462, 461 to the spindle 403. The spindle 404 is driven from the shaft 442 and for this purpose the spindle 404 is provided with a gear wheel 463 in mesh with a gear wheel 464 secured on the shaft 442, and hence the rotary motion of the latter is transmitted by the gear wheels 464, 463 to the spindle 404. From the foregoing it will be seen that by the arrangement described the several spindles 400, 401, 402, 403 and 404 are driven simultaneously from the shaft 421 but at different speeds according to the work to be done by the corresponding tooling heads 110, 111, 112, 113 and 114. Within the housing 406 at the bottom thereof is mounted a rotary pump 470 for supplying the bearings of the several shafts with the necessary lubricant, and this rotary pump 470 is driven from the gear wheel 441. For this purpose the gear wheel 444 meshes with a gear wheel 471 secured on a shaft 472 journaled in the housing 406, and on the shaft 472 is secured a gear wheel 473 in mesh with a gear wheel 474 secured on the shaft 475 of the rotary pump 470 to drive the latter. The several gear wheels of the gearset 405 are preferably of the herringbone type, as indicated in Figures 5 and 8, to reduce lost motion to a minimum.

In order to rotate the spindles 410, 411, 412, 413 and 414 from the shaft 436, the following arrangement is made, special reference being had to Figures 4, 9, 10 and 11. On the shaft 436 within the housing 416 is keyed or otherwise secured a gear wheel 480 in mesh with a gear wheel 481 secured on a shaft 482 journaled in the housing 416. The gear wheel 481 is in mesh with a gear wheel 483 secured on the spindle 410 so that the latter is rotated by the gear wheels 480, 481 and 483 from the shaft 436. In order to rotate the spindle 411 from the shaft 436, the latter is provided with a gear wheel 485 in mesh with a gear wheel 486 secured on a shaft 487 journaled in the housing 416, and on this shaft 487 is secured a gear wheel 488 in mesh with a gear wheel 489 secured to the spindle 411. The train of gear wheels just described rotates the spindle 411 from the shaft 436. The gear wheel 485 is also in mesh with a gear wheel 490 attached to a shaft 491 journaled in the housing 416, and the gear wheel 490 is in mesh with a smaller gear wheel 492 secured on the spindle 412 so that the latter is driven from the shaft 436. The gear wheel 480, previously mentioned, is in mesh with a gear wheel 493 secured on the shaft 494 journaled in the housing 416, and the gear wheel 493 is in mesh with a gear wheel 495 secured on the spindle 413 to rotate the latter from the shaft 436. The gear wheel 480 is also in mesh with a gear wheel 496 secured on a shaft 497 journaled in the housing 416, and the gear wheel 496 is in mesh with a gear wheel 498 secured on the spindle 414 to rotate the latter from the shaft 436. From the foregoing it will be seen that the several spindles 410, 411, 412, 413 and 414 are driven simultaneously but at different speeds from the shaft 436. In the housing 416 at the bottom thereof is mounted a rotary oil pump for supplying the bearings of the several shafts within the housing 416 with a lubricant, and the pump 500 is driven from the gear wheel 496 by the latter meshing with a gear wheel 501 secured on the shaft 502 of the rotary pump 500. The several gear wheels within the housing 416 are preferably of the herringbone type, to reduce lost motion to a minimum.

Tooling head 110.

The tooling head 110, located at the second station to the left of the work holding turret 106, is used for facing the edge 131 and the left faces of the lugs 132 of the piece of work 107 (see Figure 27) and is constructed in detail as follows, special reference being had to Figures 1, 2, 32, 33, 34, 35, 36 and 37. The right-hand end of the spindle 400 of the tooling head 110 is slidingly engaged by a coupling sleeve 505 journaled in bearings 506 arranged on a reciprocating carriage 507 provided with integral sliding members 508 (see Figure 34) on which are adjustably mounted sets of side gibs 509 and bottom gibs 510 mounted to slide in longitudinal bearings 511 formed on the support 101. The bearings 511 are provided with the usual retaining plates 512. The side gibs 509 are in the form of wedges and each is provided at the left-hand end (see Figures 32 and 36) with a lug 513 in which is mounted to turn a screw 514 screwing in the sliding member 508 to allow of moving the gibs 509 lengthwise to adjust the carriage sidewise and to take up wear. The side gibs 509 are held in place on the sliding members 508 by screws 515 (see Figure 34) screwing in the sliding members 508 and extending through slots 516 formed lengthwise in the side gibs 509. The bottom gibs 510 are also in the form of wedges and are rigidly connected with each other by an integral bridge 517 (see Figure 32) extending under the carriage 507. The bridge 517 is provided with a lug 518 in which screws a screw rod 519 mounted to turn in bearings 520 arranged on the carriage 507. On turning the screw rod 519 with a wrench or other tool the bottom gibs 510 are adjusted lengthwise to properly adjust the carriage 507 up or down and take up wear. The bottom gibs 510 are held in place on the sliding members 508 by screws 521 screwing in the sliding members and extending through slots 522 formed in the bottom gibs 510.

The coupling sleeve 505 is provided with an enlarged portion 525 extending between the bearings 506 to move with the carriage 507, and the coupling sleeve 505 is provided with keys 526 engaging keyways 527 (see Figure 34) formed in the spindle 400 whereby the rotary motion of the spindle 400 is transmitted to the coupling sleeve 505 and the latter is free to slide lengthwise on the spindle 400. The right-hand end of the coupling sleeve 505 is attached to a shaft 530 journaled in bearings 531 arranged in the carriage 507 and on the terminal of the shaft 530 is secured a pinion 532 in mesh with a gear wheel 533 attached to or formed on the hub 534 of a face plate 535, the said hub being mounted to rotate in a bearing 536 arranged on the right-hand end of the carriage 507. The face plate 535 fits against the right-hand end of the bearing 536 and is provided with a diametrical guideway 537 in which is mounted to slide a slide 538 having at its face T-slots 539 engaged by bolts 540 for adjustably fastening the tool carrier or holder 541 to the slide 538. The tool carrier 541 carries two tools 542 and 543, of which the tool 542 is a facing tool for facing the edge 131 while the tool 543 is a facing tool for facing the left-hand faces of the lugs 132 of the work 107. By the arrangement described the face plate 535 and the parts carried thereby, that is, the slide 538 and the tool holder 541 are rotated from the spindle 400.

On the slide 538 is secured a rack 550 in mesh with a gear wheel 551 mounted to rotate loosely on a ball bearing 552 mounted on a stud shaft 553 attached to the hub 534 to rotate with the latter. The gear wheel 551 is in mesh with a rack 555 bolted or otherwise fastened to an arm 556 mounted to slide in a diametrical guideway 557 formed on the hub 534. The gear wheel 551 is arranged in the middle portion of the guideway 557, as plainly shown in Figures 33 and 35. The arm 556 projects integrally from a feed sleeve 558 mounted to slide lengthwise in the carriage 507. The sleeve 558 is provided with a second arm 559 engaging the guideway 557, diametrically opposite the arm 556. On moving the feed sleeve 558 from the left to the right the rack 555 turns the gear wheel 551 and the latter imparts a traveling motion to the rack 550 whereby the slide 538 and with it the tool carrier 541 is fed diametrically on the guideways 537 to move the tools 542 and 543 radially inward across the edge 131 and the lugs 132 to face the same. On moving the feed sleeve 558 from the right to the left the tool holder 541 is moved radially outward to move the tools 542 and 543 into outermost position, that is, beyond the edge 131 and the lugs 132, to be in position for engagement with the next following work moved into facing position for the tooling head 110 on the next movement of the work holding turret 106. The racks 550 and 555 and the gear 551 are preferably of the herringbone type, as indicated in Figure 33, to reduce lost motion to a minimum.

In order to impart a reciprocating movement to the feed sleeve 558, the following arrangement is made: The sleeve 558 is provided with bearings 565, 566, of which the bearing 565 is engaged by a nut 567 and the bearing 566 is engaged by a collar 568, the nut 567 and the collar 568 being held on a screw rod 569 extending centrally through the feed sleeve 558. The left-hand end of the screw rod 569 is mounted in a bearing 570 arranged on the carriage 507, and the screw rod is provided with a screw thread 571 engaged by a nut 572 held between the two bearings 573, 574 arranged on the carriage 507. On the nut 572 is secured or formed a gear wheel 575 in mesh with a gear wheel 576 (see Figure 34) journaled on a shaft 577 held in the carriage 507, and the gear wheel 576 is in mesh with a gear wheel 578 mounted on a shaft 579 arranged on the carriage 507. The gear wheel 578 is in mesh with a gear wheel 580 rotating with a shaft 581 slidingly and rotatably connected by keys 582 with the hub 583 of a bevel gear wheel 584. The hub 583 of the bevel gear wheel 584 is mounted to turn in a bearing 585 held on a housing 586 bolted or otherwise attached to the support 101, as plainly shown in Figures 1 and 2. The bevel gear wheel 584 is in mesh with a bevel gear wheel 587 keyed or otherwise attached to a vertically disposed shaft 588 journaled in suitable bearings arranged in the housing 586. On this shaft 588 is keyed or otherwise secured a gear wheel 590 in mesh with a rack 591 (see Figure 36) bolted or otherwise fastened to a slide 592 mounted to slide longitudinally in a suitable guideway 593 arranged on the housing 586. The left-hand end of the slide 592 is pivotally connected with a rod 594 adjustably secured by nuts 595, 596 to a bracket 597 fastened by bolts 598 or other means to the crosshead 120, to reciprocate with the latter. When the crosshead 120 moves from the left to the right then the rack 591 of the slide 592 rotates the gear wheel 590 and hence the shaft 588, and the rotary motion of the latter is now transmitted by the bevel gear wheels 587 and 584 to the shaft 581, and the latter's rotary motion is transmitted by the train of gear wheels 580, 578, 576 and 575 to the nut 572 screwing on the screw thread 571 of the rod 569 whereby the feed sleeve 558 is moved from the left to the right thus causing the tool holder 541 to slide radially inward thereby feeding the tools 542, 543 in engagement with the edge 131 and the faces of the lugs 132 to face the same. When the crosshead 120 moves from the right to the left then a reverse or outward movement is given to the tool holder 541 to cause the tools 542 and 543 to again travel over the previously rough-faced surfaces, thus finishing the same.

A slight reciprocating movement is given to the carriage 507 to move the tools 542, 543 the proper distance to the right for the depth of the facing cuts to be made, and to move the tools from the right to the left out of the path of the work to allow rotation of the work-holding turret 106 without interference by the tooling head 110. In order to impart this reciprocating movement to the carriage 507 the following arrangement is made: On the lower end of the shaft 588 is secured a cam 600 provided on its under face with a cam groove 601 having two concentric portions 602, 603, and this cam groove 601 is engaged by a friction roller 605 held on a stud 606 attached to the carriage 507 (see Figure 32). When the crosshead 120 is in its outermost position to the left then the friction roller 605 is in engagement with the portion 603 of the cam groove 601 and hence the carriage 507 is held in retracted position, and when the crosshead 120 moves from the left to the right and the cam 600 is rotated in the direction of the arrow shown in Figure 36 then the friction roller 605 travels from the cam groove portion 603 into the cam groove portion 602 whereby the carriage 507 is moved from the left to the right shortly after the tool holder 541 is moved inward to engage the tools 542, 543 with the work, as previously explained. It will be noticed that during the time the friction roller 605 travels in the cam groove portion 603, the carriage 513 is in a left-hand position, and when the friction roller 605 is in the cam groove portion 602 then the carriage 507 is in a right-hand position. The carriage when in this right-hand position is locked therein by a bolt 610 mounted to slide in a bearing 611 mounted on the housing 586. The bolt 610 is adapted to engage a keeper 612 arranged on the carriage 507 to hold the latter locked against movement while in a right-hand end position. The bolt 610 is pressed on by a spring 613 mounted in a bearing 611 and the bolt 610 is provided with a stud 614 on which is journaled a friction roller 615 traveling on the peripheral face of the cam 600 and adapted to be engaged by a raised cam portion 616 formed on the peripheral face of the cam 600 (see Figures 36 and 37). Shortly after the crosshead 120 begins to move from the left to the right the cam portion 616 engages the friction roller 615 thus moving the bolt 610 outward. The carriage 507 is now moved from the left to the right by the action of the friction roller 605 traveling from the cam groove portion 603 into the cam groove portion 602. Shortly after the friction roller 605 has moved into the cam groove portion 602 the cam portion 616 moves out of engagement with the friction roller 615 to allow the spring 613 to push the bolt 610 into engagement with the keeper 612 to lock the carriage 507 when in forward right-hand end position. Now when the crosshead 120 moves from the right to the left the rotary motion of the cam 600 is reversed and hence the friction roller 605 travels from the cam groove portion 602 into the cam groove portion 603 whereby the carriage 507 is moved from the right to the left. Immediately prior to this movement of the carriage 507 the cam portion 616 engages the friction roller 615 thus moving the bolt 610 outward out of engagement with the keeper 612 thus unlocking the carriage 507 prior to the return movement thereof. It is understood that the reciprocating movement given to the carriage 507 causes the sleeve 505 to slide on the spindle 400 and the shaft 581 slides in the hub 583 of the bevel gear wheel 584 without, however, stopping the rotary motion of the parts.

The gear wheel 580 rotates with the shaft 581 and for this purpose the gear wheel 580 is loosely mounted on the shaft 581 and is provided on its left-hand face with teeth 620 engaging corresponding teeth 621 on a bushing 622 fastened by keys 623 or other means to the shaft 581. The bushing 622 is journaled in a bearing 624 arranged on the carriage 507. The right-hand face of the gear wheel 580 is engaged by a flange 625 formed on a hub 626 journaled in a bearing 627 arranged on the carriage 507, and the said hub is engaged by a retaining plate 628 held in place by a screw 629 screwing in the right-hand end of the shaft 581. The construction described facilitates the assembling of the corresponding parts. The carriage 507 is provided above the gear wheel 580 with a sight window 630 to permit the attendant to view the lubricating conditions in the carriage.

In order to insure the desired accuracy in building the machine, the housing 586 is adjustably mounted on the support 101 and for this purpose the housing 586 is provided with longitudinally extending slots 635, 636 engaged by bolts 637, 638 (see Figure 36) held on the retaining plates 512 of the bearings 511, previously mentioned. The upper faces of the retaining plates 512 are provided with longitudinally extending machined grooves 640 into which fit lugs 641 formed on the under side of the housing 586. It will be noticed that by the arrangement described the housing 586 can be longitudinally adjusted on loosening the bolts 637, 638, and this longitudinal adjustment is accurate owing to the lugs 641 fitting into the grooves 640. When the desired adjustment has been made the bolts 637, 638 are screwed up to securely fasten the housing 586 in position on the support 101.

Tooling heads 115 and 116.

The tooling head 115 is located at the second station to the right of the work-holding turret 106 and the tooling head 116 is located at the third station to the right of the work holding turret 106. The tooling heads 115 and 116 are alike in construction except that the tooling head 115 carries a boring tool 650 for rough boring the bore 136 (see Figure 27), and the tooling head 116 is provided with a reamer 651 for reaming the rough bored bore 136, as shown in Figure 28. The construction of the tooling head 115 is as follows, special reference being had to Figures 1, 38 and 39: On the driven spindle 410 are formed keyways 652 slidingly engaged by keys 653 held on the hub 654 of a gear wheel 655 preferably of the herringbone type. The hub 654 is mounted to turn in suitable bearings 656, 657 arranged on a carriage 658 provided at the sides with longitudinal sliding members 659 having adjustable bottom gibs 660 and side gibs 661 slidingly engaging guideways 662 arranged on the support 102, and the said gibs 660 and 661 are similar to the gibs 509 and 510 and are provided with adjusting screws 663, 664 for adjusting the gibs lengthwise with a view to adjust the carriage 658 vertically and sidewise the same as the carriage 507. The screws 663, 664 are similar to the adjusting screws 519, 514, above described. The carriage 658 is provided at the right-hand end with a transversely extending pivot 665 engaged by a rod 666 fastened by nuts 667, 668 to the crosshead 125, and hence reciprocating movement of the crosshead is transmitted to the carriage 658 to feed the boring tool 650 into the bore 136 and to return the same to outermost position.

The gear wheel 655 is in mesh with a gear wheel 670 secured on a boring spindle 671 mounted to rotate in suitable bearings 672 and 673 arranged in the carriage 658. On the left-hand end of the boring spindle 671 is secured a tool holder 675 provided with the usual socket 676 for receiving the shank 677 of the boring tool 650. When the machine is running and the spindle 410 is rotating then the rotary motion is transmitted by the gear wheels 655, 670 to the boring spindle 671 carrying the boring tool 650 to rotate the same and at the same time a reciprocating movement is given to the carriage 658 by the crosshead 125, to feed the boring tool 650 into engagement with the bore 136 of the piece of work 107 at the second station of the work holding turret 106. The feeding movement given to the carriage 658 is somewhat in excess to the length of the bore 136 so that the latter is bored and reamed throughout its length, and during the return movement of the carriage 658 the boring tool 650 is moved out of the bore clear of the piece of work 107. The top of the carriage 658 is provided with a sighting window 678 to permit of viewing the condition of the lubricant with which the carriage 658 is filled.

The tooling head 116 is provided with a carriage 679 mounted to reciprocate in a guideway 680 (see Figure 3) arranged on the support 102, and the carriage 679 is connected by a rod 681 with the crosshead 125 (see Figure 3) to transmit the reciprocating movement of the latter to the carriage 679. The reamer 651 has its shank 682 attached to a boring spindle 683 similar to the boring spindle 671 and driven from the driven spindle 411 by gear wheels (not shown) but similar to the gear wheels 655 and 670, otherwise the construction and operation of the tooling head 116 is the same as above described relative to the tooling head 115.

Tooling head 111.

The tooling head 111 is located at the third station to the left of the work holding turret 106, and is in longitudinal alinement with the tooling head 116 above described. The tooling head 111 in its general construction is the same as the tooling heads 115 and 116 above described except that instead of a single boring tool 650 or 651 it carries seven drilling tools 685 for drilling holes into the corresponding lugs 132 of the piece of work 107 (see Figure 28). The carriage 686 of the tooling head 111 corresponds to the carriage 658 and is mounted to reciprocate in a guideway 687 (see Figure 2) arranged on the support 101 and connected by a rod 688 with the crosshead 120 to reciprocate the carriage 686 from the crosshead 120. A spindle 692 is mounted in the carriage 686 and corresponds to the spindle 671, and is driven from the spindle 401 by gear wheels (not shown) but the same as the gear wheels 655 and 670 so that a description of this driving mechanism is not deemed necessary. The head 693 of the spindle 692 is provided with a diametrical face slot 694 into which fits a projection 695 of a shaft 696 rotating with the spindle 692. The shaft 696 has two reduced portions 697, 698 of which the latter is journaled in a bearing 699 arranged on a covering plate 700 on a housing 701 fastened by bolts 702 or other fastening means to the carriage 686 thereby reciprocating with the latter. On the reduced portion 697 of the shaft 696 is keyed or otherwise secured a central gear wheel 705 in mesh with a plurality of intermediate gear wheels 706 having their shafts 707 journaled in the housing 701. Three of the gear wheels 706 are in mesh with pairs of gear wheels 708 while the fourth gear wheel 706 is in mesh with a single gear wheel 709 (see Figure 41) and the said gear wheels 708 and 709 are keyed or otherwise secured to spindles 710 carrying the drilling tools 685. The spindles 710 are journaled in suitable bearings 711, 712 (see Figure 40), of which the bearings 711 are mounted in the housing 701 and the bearings 712 are mounted in the covering plate 700 of the housing 701.

In order to guide the outer ends of the drilling tools 685, the latter pass through guides 715 attached to a yielding guide plate 716 mounted to slide on rods 717 attached to bosses 718 projecting from the face of the covering plate 700. Springs 719 are coiled on the rods 717 and normally hold the guide plates 716 in outermost position with the pointed ends of the drilling tools 685 projecting at the faces of the guides 715, as plainly shown in Figure 40. The guide plate 716 is adapted to be seated on the faced edge 131 of the piece of work 107 at the time the carriage 686 is moved from the left to the right by the action of the crosshead 120 (see Figure 28). On the further movement of the housing 686 from the left to the right the guide plate slides from the right to the left on the rods 717 against the tension of the springs 719. It will be noticed that by this arrangement the drilling tools 685 are firmly guided at their outer ends to insure accurate drilling of the holes in the lugs 132 of the piece of work 107. It is understood that the drilling tools 685 are rotated in unison from the spindle 401 and the drilling tools are fed from the left to the right in engagement with the lugs 132 during the movement of the crosshead 120 from the left to the right, and after the lugs 132 are drilled and the crosshead 120 recedes and with it the carriage 686 and its housing 701 then the drilling tools 685 are withdrawn from the lugs 132 and with the guide plate 716 move away from the work to the position shown in Figure 40. During this return movement the guide plate 716 is returned to outermost position by the action of the springs 719, it being understood that this outward movement of the plate 716 is limited by stop collars 720 on the outer ends of the rods 717.

*Tooling heads 112 and 113.*

The tooling head 112 is located at the fourth station at the left of the work holding turret 106 and is similar to the tooling head 115 except that the tool holder 675 is mounted on a carriage spindle 724 and receives a shank 725 of a boring tool 726 (see Figure 29) having cutters 727, 728 and 729, of which the cutter 727 is for rough boring the bore 135, the cutter 728 is for rough boring the bore 134, and the cutter 729 is for facing the outer end of the wall of the bore 134. The boring tool 726 is provided at its right-hand end with a guiding and steadying member 730 adapted to pass into the bore 136 previously bored and reamed by the boring and reaming tool 650 and 651. The carriage spindle 724 is driven from the spindle 402 by gear wheels similar to the gear wheels 655 and 670 shown in Figure 38, and the said spindle 402 extends into a carriage 735 (see Figure 2) arranged on the support 101, and the carriage 735 is connected by a rod 737 with the crosshead 120. When the machine is running, the boring tool 726 is rotated from the spindle 402 and is fed from the left to the right by the crosshead 120 to rough bore the bores 136 and 134 and to face the outer end of the wall of the bore 134, after which the boring tool 726 is moved from the right to the left during the return movement of the crosshead 120, until the member 730 is completely clear of the left-hand end of the work at the fourth station.

The tooling head 113 is located at the fifth station at the left of the work holding turret 106 and is similar to the tooling head 115 except that the work holder is mounted on a carriage spindle 739 and receives the shank 740 of a reaming tool 741 having two reamers 742 and 743 for reaming the previously rough bored bores 135 and 134. The boring tool 741 is also provided with a guiding and steadying member 744 adapted to pass into the bore 136, previously bored and reamed by the tools 650 and 651, as previously explained. The spindle 739 is driven from the spindle 403 which extends into a carriage 745 (see Figure 2) reciprocating in a guideway 746 arranged on the support 101, and the said carriage 745 is connected by a rod 747 with the crosshead 120 to impart a reciprocating motion to the carriage 745 with a view to feed the reamers 742 and 743 into the bores 135 and 134 while the reaming tool 741 is rotating to insure reaming of the bores 135 and 134. During the return movement of the cross head 120 the reaming tool 741 is withdrawn from the piece of work 107 and moves clear of the same at the time the crosshead 120 reaches the end of its return stroke.

*Tooling head 117.*

The tooling head 117 is located at the fourth station at the right of the work holding turret 106 and is similar to the tooling head 115 except that two drilling tools 750 and 751 are provided for simultaneously drilling holes in the bosses 137 and 138 of the piece of work 107 (see Figures 29, 42, 43, 44 and 45). The spindle 412 of the tooling head 117 extends into a carriage 752 similar to the carriage 658, and this spindle 412 rotates a spindle 753 provided with a head 754 on the face of which is arranged a diametrical slot 755 engaged by the lug 756 formed on one end of a shaft 757 terminating in a reduced end 758 journaled in a housing 759 bolted or otherwise secured to the carriage 752 thus forming an extension thereof. On the shaft 757 is keyed or otherwise secured a gear wheel 760 in mesh with intermediate gear wheels 761 and 762 in mesh with pinions 763 and 764 secured on spindles 765 and 766 journaled in suitable bearings 767 arranged on the housing 759. Each of the spindles 765 and 766 is provided with a tubular extension 768 in which is held longitudinally adjustable a tool holder 769 engaged by the shank 770 of the corresponding drilling tool 750 or 751. The tool holder 769 is provided with a key slot 771 engaged by a key 772 attached to the tubular extension 768 to rotate the tool holder 769 with the spindle 765. The outer end of the tool holder 769 is provided with a screw thread 773 on which screws a nut 774 held in a sleeve 775 enclosing the tubular extension 768 and being fastened by bolts 776 to a boss 777 forming part of the housing 759 and containing the bearings 767 previously mentioned. On turning the nut 774 the tool holder 769 can be moved lengthwise in the tubular extension 768 to adjust the corresponding drilling tool 750 or 751 with a view to locate the point thereof the same distance from the bosses 137 and 138 at the time this tooling head 117 is in its extreme position to the right. It is understood that by the arrangement described the corresponding drilling tools 750 and 751 after being sharpened and consequently reduced in length can be readily moved to the proper position by correspondingly adjusting the tool holder 769 lengthwise from the right to the left in the tubular extension 768. After the desired adjustment has been made the tool holder 769 is fastened in position against accidental movement in the tubular extension 768 by a set screw 778 screwing in the tubular extension 768 and engaging the tool holder 769 as plainly shown in Figure 44. The twisted or outer portions of the drilling tools 750 and 751 extend through guides 780 and 781 arranged in tubular extensions 782, 783 formed on the sleeve 775 to guide and steady the drilling tools 750 and 751 during the time they drill the bosses 137 and 138. The extensions 782 and 783 are provided with openings 784 (see Figure 44) to permit cuttings to drop out of the extensions 782 and 783, that is, cuttings carried by the twists of the drilling tools into the extensions. It is understood that the spindle 412 imparts a rotary motion to the spindle 753 by gear wheels (not shown) but similar to the gear wheels 655 and 670 (see Figure 38), and the rotary motion of the spindle 753 is transmitted to the shaft 757 which by the gear wheels 760, 761, 762 and the pinions 763, 764 rotates the spindles 765, 766 whereby a rotary motion is given to the holders 769 carrying the shanks 770 of the two drilling tools 750 and 751.

The carriage 752 is mounted to slide in a longitudinal guideway 790 arranged on the support 102 and the said carriage 752 is connected by a rod 791 with the crosshead 125 (see Figures 1 and 3). When the crosshead 125 moves from the right to the left a similar movement is given to the carriage 752 whereby the two drilling tools 750 and 751 are moved into drilling engagement with the bosses 137 and 138 to drill holes in the same. It is understood that the drilling tools 750 and 751 engage the bosses 137 and 138 during the last portion of the inward stroke of the crosshead 125 to bore the holes in the bosses to the desired depth. As previously stated, the holders 769 of the drilling tools 750 and 751 are adjustable lengthwise to insure drilling of the holes in the bosses at the same depth in the several pieces of work especially after sharpening of the tools 750 and 751 is made necessary.

Tooling head 118.

The tooling head 118 (see Figures 3, 46 and 47) is located at the fifth station to the right of the work holding turret 106 and is provided with two sets of facing tools 795 and 796, of which the set of facing tools 795 contains seven facing tools arranged in a circle for simultaneously facing the right end faces of the lugs 132, and the set of facing tools 796 contains two facing tools for facing the bosses 137, 138 at the same time that the lugs 132 are faced by the facing tools 795. The facing tools 795, 796 are simultaneouly driven from the spindle 413 which projects into a carriage 801 similar to the carriage 658, in which is mounted a spindle 802 driven from the spindle 413 by gear wheels (not shown) but similar to the gear wheels 655 and 670 in the carriage 658 (see Figure 38). The spindle 802 is provided with a head 803 having on its face a diametrical slot 804 engaged by a projection 805 formed on the right-hand end of a shaft 806 rotating with the spindle 802. The shaft 806 is provided with two reduced portions 807, 808, of which the latter is journaled in a covering plate 809 bolted or otherwise fastened to a housing 810 attached to the carriage 801. On the reduced portion 807 is keyed or otherwise secured a centrally disposed gear wheel 812 in mesh with a plurality of gear wheels 813, 814, 815, 816, of which the intermediate gear wheels 813, 814, 815 are each in mesh with gear wheels 817 secured on shafts 818 carrying six of the facing tools 795 while the gear wheel 816 is in mesh with a gear wheel 819 secured on a shaft 820 carrying the seventh facing tool 795. The gear wheel 816 is also in mesh with a gear wheel 821 and the gear wheel 813 is also in mesh with the gear wheel 822, and the two gear wheels 821 and 822 are secured on shafts 823, 824 carrying the two facing tools 796 for the bosses 137 and 138. It is understood that the several shafts 818, 820, 823, 824 are journaled in suitable bearings in the housing 810, and the shafts 825 of the intermediate gear wheels 813, 814, 815 and 816 are likewise journaled in the said housing 810. By reference to Figure 46 it will be noticed that the intermediate gear wheel 813 is of sufficient width to accommodate its mating gear wheels 817, 822. The facing tools 795, 796 are provided with centering and steadying pins 826 adapted to pass into the corresponding holes previously drilled in the lugs 132 and the bosses 137, 138. It is further understood that the outer ends of the shafts 818, 820, 823 and 824 are provided with sockets 827 for receiving conical heads 828 on the shanks 829 of the facing tools 795 and 796. By reference to Figures 30 and 46 it will be noticed that the shanks 829 of the facing tools 796 are shorter than the shanks of the facing tools 795, corresponding to the distance between the two vertical planes in which the lugs 132 and the bosses 137 and 138 are located.

The carriage 801 is mounted to reciprocate in a guideway 830 arranged longitudinally on the support 102 and this carriage 801 is connected by a rod 831 with the crosshead 125 and hence when the crosshead 125 moves from the right to the left then the carriage 801 and its housing 810 are moved in the same direction, and when the crosshead 125 nears the end of its inward stroke then the facing tools 795 and 796 move into engagement with the lugs 132 and the bosses 137, 138 to face the same during the final feeding movement of the crosshead 125 from the right to the left. It is understood that comparatively little material is cut off from the lugs 132 and the bosses 137, 138 to face the same. When the crosshead 125 moves from the left to the right then the facing tools 795, 796 move out of engagement with the lugs 132 and the bosses 137, 138 and away from the piece of work completely clear of the latter. It is understood that the facing tools 795 prior to moving into engagement with the lugs 132 engage the guides 190, and the facing tools 796 engage the guides 191, the guides 190 and 191 being arranged on the work-holding chuck 106, as previously described and shown in Figures 11 and 12. By the arrangement described the facing tools 795, 796 are steadied by their centering pins 826 and by the guides 190, 191 to insure accurate facing of the lugs 132 and the bosses 137, 138.

*Tooling head 114.*

The tooling head 114 (see Figures 1, 2, 31, 48 and 49) is located at the sixth station to the left of the work holding turret 106 and is provided with a tapping tool 840 for tapping the previously bored and reamed bore 135 (see Figure 31). The tapping tool 840 is provided with retractible blades or cutters 841 and is preferably similar to the tapping tool shown and described in the Letters Patent of the United States, No. 1200180, granted to Franklin A. Errington, October 3, 1916, so that further detail description of the same is not deemed necessary. It is understood that the blades 841 are in outermost position during the tapping operation of the bore 135, and after the bore is tapped the blades 841 are withdrawn by a collar 842 engaging the left-hand end of the wall of the bore 134 to permit of withdrawing the tapping tool 840 from the bore 135. The tapping tool 840 is also provided with a flange 843 adapted to be engaged by a fixed rod 844 (see Figures 1 and 31) during the return movement of the crosshead 120 to move the blades 841 outward back into cutting position. The shank 845 of the tapping tool 840 is removably held in a tool holder 850 attached to a spindle 851 connected by gear wheels 852, 853 with the spindle 404 in the same manner as the spindle 410 is connected with the spindle 671 by the gear wheels 655 and 670, as previously explained and shown in Figure 38, so that further description of the same is not deemed necessary. It is understood that the spindle 404 extends into a carriage 860 mounted to slide in guideways 861 arranged longitudinally on the support 101, as plainly shown in Figures 1 and 2. The carriage 860 contains the gear wheels 852, 853 and the spindle 851 and hence turning movement of the spindle 404 is transmitted to the spindle 851 to rotate the tapping tool 840.

In order to feed the tapping tool 840 to the work a reciprocating movement is given to the carriage 860 and for this purpose an arrangement is made similar to the one for reciprocating the carriage 507 of the tooling head 110 from the crosshead 120. On the carriage 860 is mounted a pin 862 engaging a cam groove 863 formed in the under side of a cam 864 secured on the lower end of a shaft 865 journaled in suitable bearings in a housing 866 adjustably fastened by bolts 867 to retaining plates 868 forming part of the bearing 861. The bolts 867 extend through slots 869 to permit longitudinal adjustment of the housing 866. The under side of the housing 866 is provided with lugs 870 engaging machined grooves 871 formed on the plates 868 to allow accurate adjustment of the housing 866 on the support 101.

On the shaft 865 is secured a gear wheel 875 in mesh with a rack 876 secured on a slide 877 mounted to slide longitudinally in suitable guideways 878 arranged on the housing 866. The slide 877 is provided with an extension arm 879 connected with a bracket 880 bolted or otherwise attached to the crosshead 120. When the crosshead 120 moves from the left to the right then the rack 876 is moved in the same direction and a rotary motion is given to the gear wheel 875 and hence to the shaft 865 whereby the cam 864 is rotated in the direction indicated by the arrow in Figure 48. This movement of the cam 864 causes the pin 862 to move from the left to the right thus moving the carriage 860 in the same direction to feed the tapping tool 840 to the work. The cam groove 863 is formed of four portions 885, 886, 887, 888, as indicated in dotted lines in Figure 48. The first portion 885 of the cam groove 863 is concentric and hence during the initial movement of the crosshead 120 from the left to the right the carriage 860 remains at a standstill but during the time the cam groove 863 engages the pin 862 the carriage 860 is moved from the left to the right thus moving the tapping tool 840 to the beginning of the bore 135. The carriage 860 next remains at a standstill, that is, during the time the cam groove portion 887 engages the pin 862, but when the end portion 888 of the cam groove 863 engages the pin 862 then the tapping tool 840 is fed into the bore 135 to cause the blades 841 to tap the said bore. When the tapping tool 840 nears the end of its movement to the right in the bore 135, the collar 842 engages the outer end of the wall of the bore 134 thus causing the blades 841 to be withdrawn, that is, moved inward in the tapping tool. By this arrangement it is not necessary to reverse the turning motion of the tapping tool 840 to withdraw it from the tapped bore 135. The crosshead 120 during the next movement from the left to the right causes the rack 876 to turn the shaft 865 in a reverse direction whereby a similar movement is given to the cam 864. The carriage 860 is now moved from the right to the left and the tapping tool 840 with the retracted blades 841 moves out of the tapped bore 135, that is, during the time the cam groove portion 888 engages the pin 862, and then the carriage 860 remains stationary for a short time, that is, during the passage of the pin 862 through the cam portion 887, after which the carriage 860 is moved to its left-hand position, that is, during the time the pin 862 is engaged by the cam groove portion 886. The tapping tool 840 is thus completely withdrawn from the work 107, that is, completely clear of the same to allow rotating of the work holding chuck 106. It is understood that the spindle 404 slides in the gear wheel 853 and rotates the same. The carriage 860 has its sliding members 890, which engage the guideways 861, provided with bottom and side gibs 891, 892, similar to the gibs 509, 510 previously described. The gibs 891, 892 are lengthwise adjustable by screw rods 893, 894, but as this construction is the same as above described relative to the gibs 509, 510 further description of the same is not deemed necessary. The purpose for this adjustment of the gibs is to permit of adjusting the carriage 860 sidewise and up and down to locate the tapping tool 840 correctly relatively to the bore 135.

*Tooling head 119.*

The tooling head 119 is located at the sixth station at the right-hand side of the work holding turret 106 and is provided with two tapping tools 900 and 901 for tapping the previously bored holes in the bosses 137, 138, it being understood that the tapping tools 900 and 901 are rotated from the spindle 414. The detail construction of the tooling head 119 is as follows, special reference being had to Figures 1, 3, 31 and 50 to 60. The left-hand portion of the spindle 414 slidingly extends through bearings 905, 906 arranged in a carriage 907 provided with sliding members 908 (see Figure 56) mounted to slide in longitudinal guideways 909 arranged on the support 102. The spindle 414 is provided with keyways 910 slidingly engaged by keys 912 held on a gear wheel 913, preferably of the herringbone type, and in mesh with a gear wheel 914 secured to a spindle 915 journaled in suitable bearings 916, 917 arranged in the carriage 907. In the left-hand end of the spindle 915 is secured a shaft 920 extending into a housing 921 bolted or otherwise fastened to the carriage 907. On the shaft 920 is secured a gear wheel 922 in mesh with an intermediate gear wheel 923 journaled in the housing 921 and in mesh with two gear wheels 924, 925 secured on shafts 926 and 927 journaled in the housing 921. In the left-hand ends of the shafts 926, 927 are secured the driving shafts 928 of two tap reversing mechanisms 930 and 931 of any approved construction, preferably such as shown and described in the Letters Patent of the United States, No. 1200180, granted to Franklin A. Errington, on October 3, 1916, so that further showing and description of the same is not deemed necessary, it being understood that the said tap reversing mechanisms 930 and 931 carry the tapping tools 900 and 901 for tapping holes in the bosses 137, 138. The tap reversing mechanisms 930 and 931 are attached to a bracket 935 fastened by bolts or other fastening devices 936 to the housing 921. The guiding members 908 of the carriage 907 are provided with gibs 940, 941 similar to the gibs 509, 510 and likewise adjustable by screw rods 942 and 943 to permit of adjusting the carriage 907 horizontally or vertically, similar to the carriage 507 (see Figure 52. It is understood that the rotary motion of the spindle 414 is transmitted to the spindle 915 which rotates the shaft 920, and the rotary motion of the latter is transmitted by the gear wheels 922, 923, 924, 925 to the shafts 926, 927 to impart the desired forward and return rotary motion to the tapping tools 900 and 901 by the tap reversing mechanisms 930 and 931. It is understood that during the last portion of the travel of the carriage 907 from the right to the left the tapping tools 900 and 901 rotate in one direction and tap the holes in the bosses 137, 138, and when the carriage 907 is moved from the left to the right then the tap reversing mechanisms 930, 931 rotate the tapping tools 900 and 901 in the reverse direction to unscrew the same from the tapped holes in the bosses 137, 138 although the shafts 926, 927 rotate at all times in the same direction.

In order to impart the desired reciprocating motion to the carriage 907 from the crosshead 125, the following arrangement is made: On the carriage 907 are arranged two pins 950 and 951 coacting with two cams 952, 953 arranged on the inner face of a cam disk 954 secured on a shaft 955, journaled in suitable bearings 956, 957 arranged in a housing 958 adjustably secured by bolts 959 to the retaining plates 960 forming parts of the bearings 908 above mentioned. The bolts 959 extend through slots 961 formed in the housing to allow lengthwise adjustment of the carriage on the plates 960. The under side of the housing 958 is provided with lugs 962 engaging machined grooves 963 formed in the upper faces of the plates 960 to insure accurate adjustment of the housing 958. On the shaft 955 is keyed or otherwise secured a gear wheel 965 in mesh with a rack 966 secured or formed on a slide 967 mounted to slide in suitable guideways 968 arranged lengthwise on the housing 958. The slide 967 is connected by a rod 970 with a bracket 971 bolted or otherwise attached to the crosshead 125. When the crosshead 125 moves from the right to the left then the slide 967 moves with it and the latter's rack 966 now imparts a turning motion in one direction to the gear wheel 965 thereby rotating the shaft 955 and the cam disk 954 in the direction of the arrow indicated in Figures 57, 58 and 59, and when the crosshead 125 moves from the left to the right then the cam disk 954 is turned in the inverse direction of the said arrows. The pin 951 is fixed in the carriage 907 while the pin 950 moves with the carriage and is mounted to slide in a bearing 975 (see Figure 56). The pin 950 is provided with a reduced portion 976 around which is coiled a spring 977 seated in the bottom of the bearing 975 and pressing on the pin 950 to normally hold the same in outermost position for engagement by the cams 952 and 953, as hereinafter more fully explained. The cam 952 is provided with a peripheral cam face 978 and with a segmental cam face 979, the forward end 980 of which is adapted to engage the pin 950 (see Figure 57) to push the carriage 907 from the right to the left until the forward end 980 leaves the pin and the latter is engaged by the peripheral cam face 978. This takes place at the time the tapping tools 900 and 901 reach the bosses 137, 138, and during the time the cam face 978 is in engagement with the pin 950 the carriage 907 is fed forward the depth of the holes in the bosses 137, 138 to tap the latter, and when this has been done the peripheral face 978 of the cam 952 leaves the pin 950 and the latter is now engaged by the cam 953 (see Figure 59) to move the carriage 907 from the left to the right and while the crosshead 125 is still moving from the right to the left. The cam 953 by acting on the pin 950 pushes the carriage 907 from the left to the right to back out the tapping tools 900 and 901 from the tapped holes in the bosses 137, 138, thus returning the tapping tools to the outer ends of the said bosses. When this takes place the forward end 980 of the cam 952 moves in contact with the pin 951 whereby the carriage 907 is moved further from the left to the right back to normal position (see Figure 60). On the now following return movement of the crosshead 125 from the left to the right the cam disk 954 is turned in a reverse direction, and in doing so the small end 981 of the segmental cam face 979 engages the pin 950 thus causing the pin to pass through the segmental cam face 979 whereby the pin 950 is pushed inward in its bearing 975 against the tension of the spring 977 until the forward end 980 drops off the pin 950 to allow the latter to return to outermost position by the action of its spring 977. The pin 950 is now again in the path of the forward end 980 of the cam 952, as shown in Figures 50, 57, and on again turning the cam disk 954 in a forward direction during the next inward stroke of the crosshead 125 from the right to the left the above described operation is repeated. From the foregoing it will be seen that by the arrangement described the bosses 137, 138 are tapped by the tapping tools 900, 901 during the movement of the crosshead 125 from the left to the right, and the tapping tools are also backed out of the tapped holes during this movement of the crosshead 125 from the right to the left.

It is understood that the face plate 535 and the spindles 671, 683, 692, 724, 739, 753, 802, 851 and 915 journaled in the several carriages 507, 658, 679, 686, 735, 745, 752, 801, 860 and 907 have their axes coinciding with the axes of the corresponding work holders at the tooling stations of the turret 106 at the time the latter is at rest, and by providing the sets of adjustable gibs 509, 510, 660, 661, 891 and 892 for each of the carriages, the latter can be accurately adjusted to insure the above mentioned relation of the face plate 535 and the several spindles 671, 683, 692, 724, 739, 753, 802, 851 and 915 with the work holders on the turret and hence with the pieces of work held centrally in the work holders to insure accurate tooling of the pieces of work by the two sets of tooling heads.

It will be noticed that the carriages 658, 679, 686, 735, 745, 752 and 801 are directly connected with the cross heads 120 and 125 and hence reciprocate with a stroke corresponding to that of the cross heads, while the carriages 507, 860 and 907 are connected by cam mechanisms with the said cross-heads 120 and 125 and hence their strokes are less and of different length in each case according to the nature of the tooling operations performed by the corresponding tooling heads. It will also be noticed that the distance the tools are fed into engagement with the work varies by carrying on the cutting operations during a predetermined portion of the feed or inward stroke of the corresponding carriages.

General Operation.

The attendant of the machine is standing in front opposite the work holding turret 106, and during the time the latter is at rest the attendant removes a finished piece of work 107 from the work holder at this first station, that is, at the front middle portion of the work holding turret, and then the attendant places an unfinished piece of work 107 in the said holder and positions and locks such piece of work in place, as above explained. This operation is repeated at each work holder on reaching the first or unloading and loading station. When the machine is running then the motor 380 drives the differential gearing above described and shown in Figures 23 and 24, and at the same time the motor drives the gearsets 405, 415 independently of the differential gearing. The differential gearing actuates the feeding mechanisms for the two sets of tooling heads 110, 111, 112, 113, 114 and 115, 116, 117, 118, 119 by causing the cams 268, 269 to intermittently move the crossheads 120 and 125 slowly inward toward each other and hence toward the work holding turret 106 initially at a high speed and then at a low speed, and to move the crossheads 120 and 125 at a high speed outward away from the said turret. The cam grooves 266, 267 of the cams 268, 269 are shaped (see Figures 5 and 6) that the crossheads 120 and 125 remain at rest for a short time when at the end of their outward strokes. The feeding mechanism for the crosshead 125 actuates the indexing mechanism shown in Figures 15 to 20, to intermittently rotate the turret 106 at the time the crossheads 120 and 125 are at their periods of rest. The driven gearsets 405 and 415 cause a continuous rotation of the sets of spindles 400, 401, 402, 403, 404 and 410, 411, 412, 413, 414 of the corresponding tooling heads 110, 111, 112, 113, 114 and 115, 116, 117, 118, 119, at a speed commensurate with the different tooling to be done by the corresponding tooling heads on each piece of work 107. The unfinished piece of work placed in a work holder is carried by the intermittently rotating work holding turret 106 to the several tooling stations, and hence five pieces of work are operated on by ten different tooling heads. The tooling heads operate in pairs on the corresponding five pieces of work, that is, the tooling heads 110, 115 operate on the piece of work held at the second station, the tooling heads 111, 116 operate on another piece of work at the third station, the tooling heads 112, 117 operate on a piece of work at the fourth station, the tooling heads 113, 118 operate on a piece of work at the fifth station, and the pair of tooling heads 114, 119 operates on a piece of work at the sixth station, thus finishing the piece of work, and the latter in the next rotation of the turret 106 again reaches the first or unloading and loading station, to be removed from the machine.

Operation at Station II.

The operation of the tooling head 110 is as follows, special reference being had to Figures 1, 27, 32, 33, 34, 35, 36 and 37. The face plate 535 is continually rotated from the spindle 400, and the carriage 507 is moved but a short distance from the left to the right to move the tools 542 and 543 into cutting position relative to the edge 131 and the left-hand faces of the lugs 132, and then the tool holder 541 is moved diametrically across the face plate 535 by the action of the rack 550 and the gear wheel 552 to cause the tools 542 and 543 to face the edge 131 and the lugs 132 at their left faces. It is understood that during the time the pin 605 travels in the concentric portion 602 of the cam slot 601 the carriage 507 is at a standstill and the tools 542, 543 do the cutting, as previously explained. As soon as the tools 542, 543 have completed the inward cuts the crosshead 120 begins the return or outward stroke and in doing so the sliding motion of the tool holder 541 is reversed and hence the tools 542, 543 move outward on the edge 131 and the left faces of the lugs 132 to make finishing cuts therein. The carriage 507 is next retracted, that is, during the time the pin 605 travels from the cam portion 602 back to the cam portion 603. It is understood that slightly more than a quarter revolution is given to the shaft 588 and its cam 600 during the movement of the crosshead 120 in either direction.

The operation of the tooling head 115 at this station is as follows, special reference being had to Figures 1, 27, 38 and 39. The spindle 671, provided with the tool holder 675 carrying the boring tool 650 is continually rotated from the rotating shaft 410, and the reciprocating movement given by the croshead 125 to the carriage 658 causes the boring tool 650 to pass into the bore 136 of the piece of work 107 to rough bore the same and to return to outermost position clear of the piece of work.

Operation at Station III.

The operation of the tooling head 111 at this station is as follows, special reference being had to Figures 1, 28, 40, 41: The continual rotary motion of the spindle 411 is transmitted to the shaft 696 which by the gearing described and shown in Figures 40 and 41 causes the drilling tools 685 to rotate in unison, and when the crosshead 120 moves from the left to the right then a similar movement is given to the carriage 686 whereby the guide plate 716 moves in engagement with the edge 131 and the seven drills 685 bore seven holes through the corresponding lugs 132, and when the crosshead 120 moves from the right to the left the carriage 686 is moved in the same direction and hence the drilling tools 685 are withdrawn from the drilled holes in the lugs 132, and the guide plate 716 moves out of engagement with the edge 131 of the piece of work 107.

The operation of the tooling head 116 at this station is practically the same as the one above described in reference to the boring tool 650 except that in this case the reamer 651 enters the previously rough-bored bore 136 to ream the same.

Operation at Station IV.

The operation of the tooling head 112 at this station (see Figure 29) is similar to the action of the tooling heads 115, 116 except that the boring tool 726 is driven from the constantly rotating spindle 402 and the carriage 735 is reciprocated by the crosshead 120. During the movement of the crosshead 120 from the left to the right the tools 727, 728 of the boring tool 726 rough-bore the bores 135 and 134, and when this operation is nearly completed the facing tool 729 faces the outer end of the wall of the bore 134 and then the crosshead 120 moves to the left thus withdrawing the boring tool 726 from the work.

The operation of the tooling head 117 at this station is as follows, special reference being had to Figures 29, 42, 43, 44 and 45: The two shafts 765 and 766 are continually rotated from the spindle 412 and a reciprocating motion is given to the carriage 752 by the crosshead 125, and during the last portion of the movement of the crosshead 125 from the right to the left the two drills 750 and 751 drill holes into the bosses 137, 138 to the desired depth, and then the crosshead 125 moves to the right and with it the carriage 752 thus withdrawing the drilling tools 750, 751 from the bosses 137, 138. When the crosshead 125 reaches the end of its outward stroke to the right then the drilling tools 750, 751 are completely clear of the piece of work 107 at this station.

Tooling operation at Station V.

The operation of the tooling head 113 (see Figure 30) at this station is the same as the one for the tooling head 112 except that the reamers 742, 743 are driven from the spindle 403 and the carriage 745 is reciprocated by the crosshead 120. During the movement of the crosshead 120 from the left to the right, the reamers 742, 743 ream the previously rough-bored bores 135 and 134, and when this operation is completed the crosshead 120 moves from the right to the left thus withdrawing the reamers 742 and 743 from the work.

The operation of the tooling head 118 at this station is as follows, special reference being had to Figures 30, 46 and 47: The central shaft 806 of this tooling head 118 is continually driven from the spindle 413 and the rotary motion of the shaft 806 is transmitted to the two sets of facing tools 795, 796. A reciprocating motion is given to the carriage 801 by the crosshead 125. During the movement of the crosshead 125 from the right to the left the carriage 801 is moved in the same direction and the centering and steadying pins 826 enter the corresponding holes in the lugs 132 and the bosses 137, 138, and the facing tools 795, 796 move for a very short time into engagement with the lugs 132 and the bosses 137, 138 to face the same. It is understood that this facing operation takes place at the time the crosshead 125 nears the end of its stroke from the right to the left. When the crosshead 125 moves from the left to the right then the carriage 801 is moved in the same direction and the facing tools 795, 796 move out of engagement with the work and completely clear the work at the time the carriage 125 reaches the end of its outward stroke from the left to the right.

Tooling operation at Station VI.

The operation of the tooling head 114 at this station is as follows, special reference being had to Figures 1, 31, 48 and 49: The spindle 851 for rotating the tapping tool 840 is continually driven from the spindle 404 and a feeding motion is given to the carriage 860 by the slide rack 876 rotating the shaft 865 which carries the cam 864. When the crosshead 120 moves from the left to the right the carriage 860 is moved in the same direction during the time the pin 862 travels in the portion 886 of the cam groove 863 thus moving the tapping tool 840 to the beginning end of the previously bored and reamed bore 135. During the time the pin 862 travels through the end portion 888 of the cam groove 863 the tapping tool 840 is fed into the bore 135 thus tapping the same, and when the tapping operation is nearly completed the collar 842 moves into engagement with the outer end of the wall of the bore 134 thus causing the blades 841 to move inward out of engagement with the thread cut into the wall of the bore 135. The crosshead 120 now moves the carriage 860 outward from the right to the left thus withdrawing the tapping tool 840 from the tapped bore 135, that is, during the time the pin 862 returns in the end portion 888 of the cam groove 863. The carriage 860 is moved into final position to the left during the time the pin 862 travels through the cam portion 886 and during this motion the flange 843 engages the stop rod 844 to again move the blades 841 outward into active position. It is understood that during the stroke of the crosshead 120 in either direction about one half of a revolution is given to the cam 864.

The operation of the tooling head 119 at this station is as follows, special reference being had to Figures 1, 31, 50 to 60: The two tapping tools 900 and 901 are continually driven from the spindle 414 and a reciprocating motion is given to the carriage 907 by the crosshead 125. During the movement of the crosshead 125 from the right to the left, the carriage 907 is moved in the same direction to move the tapping tools 900, 901 into engagement with the holes in the bosses 137, 138, and then the carriage 907 is fed forward a distance corresponding to the depth of the holes to be tapped in the bosses 137, 138, that is, during the time the pin 950 travels on the peripheral cam face 978 of the cam 952, and then the tapping tools 900, 901 are backed out of the tapped holes in the bosses 137, 138 during the time the crosshead 125 is still moving from the right to the left and the pin 950 engages the cam 953. The carriage 907 is next moved farther to the right by the cam 952 engaging the pin 951 to return the carriage 907 to starting position and while the crosshead 125 reaches the end of its stroke from the left to the right (see Figure 60). During the return movement of the crosshead 125 the cam disk 954 is turned in the inverse direction of the arrow indicated in Figures 57 and 58 whereby the cam 952 engages with its cam groove 979 the pin 950 thus pressing the same inward against the tension of its spring 977, and when the forward edge 980 of this cam has passed the pin 950 then the latter is returned to outermost position by the action of its spring 977, the pin 950 thus being in front of the forward end 980 of the cam 952, as shown in Figure 57. It is understood that during the stroke of the crosshead 125 in either direction the cam disk 954 is given about three-quarters of a revolution, that is, from the position shown in Figure 57 to the position shown in Figure 60 or vice versa.

From the foregoing it will be seen that a plurality of tooling operations are carried out on a single piece of work during each revolution of the work holding chuck 106, thus finishing an article after passing the several tooling stations and reaching the first or unloading and loading station. It will further be noticed that the work of loading and unloading the machine can be readily carried out by a practically unskilled workman.

It will further be noticed that the tooling operations are carried on in predetermined sequence particularly as some of the tooling operations depend for accuracy on the accurate work done by previous tooling operations on this machine. Thus, for instance, the edge 131 is faced by the tool 542 (see Figure 27) to provide an accurate seat for the guide plate 716 to correctly guide the drilling tool 685 to the lugs 132 to accurately drill the same (see Figure 28); the bore 136 is first rough-bored by the tool 650 (see Figure 27) to be in proper condition for reaming by the reamer 651 (see Figure 28); the bores 135 and 134 are rough-bored by the tools 727 and 728 (see Figure 29) and are subsequently reamed by the reamers 742 and 473 (see Figure 30) and the outer end of the wall of the bore 134 is faced by the tool 729 (see Figure 29) to form an accurate seat for the collar 842 of the tapping tool 840 (see Figure 39); the holes bored in the lugs 132 and the bosses 137, 138 are subsequently engaged by the centering and steadying pins 826 to insure accurate facing of the said lugs and bosses by the tools 795 and 796; the bore 135, rough-bored by the tool 727 and reamed by the reamer 742, is in proper condition for being subsequently tapped by the tapping tool 840, as shown in Figure 31, and the previously bored holes in the bosses 137, 138 are in proper condition for tapping by the tools 900 and 901 (see Figure 31).

By carrying out the operations in pairs by pairs of tooling heads engaging the opposite ends of each piece of work as shown and described, the pieces of work are not liable to be displaced in their positions in the work holders of the turret 106 and the machine as a whole is properly counterbalanced on opposite faces of the chuck to insure an easy and proper running of the machine. By the use of the adjustable gibs for the several carriages the latter can be accurately adjusted so as to insure proper alinement of the work and tools relative to the parts of the work to be acted on and hence the pieces of work turned out by the machine are accurately tooled without danger of variation thus permitting interchange of the pieces of work when in use in an automobile or other machine.

Having thus described my invention, I claim as new and desire to secure by Letters Patent:—

1. In an automatic chucking machine, a work holding turret mounted to rotate intermittently on a horizontal axis and having holders for holding a plurality of pieces of work in a circle, the center of which coincides with the said turret axis, the said holders being spaced equal distances apart and having their axes parallel to the said turret axis, the said holders and the said turret being arranged to render both ends of the work accessible for tooling operations, one of the said holders being at a loading and unloading station and sundry of the others being at successive tooling stations at the time the turret is at rest, fixed supports adjacent the faces of the said turret and provided with a plurality of longitudinal guideways in register with the said work holders except the two at the bottom and the one at the loading and unloading station at the time the turret is at rest, carriages mounted to slide in the said guideways and adapted to carry tools for endwise tooling the several pieces of work in the turret at the tooling stations, and crossheads mounted to slide toward and from the said supports and connected with the said carriages to move the tools thereof into and out of engagement with the ends of the several pieces of work at the tooling stations at the time the turret is at rest.

2. In an automatic chucking machine, a work holding turret mounted to rotate intermittently on a horizontal axis and having holders for holding a plurality of pieces of work in a circle, the center of which coincides with the said turret axis, the said holders being spaced equal distances apart and having their axes parallel to the said turret axis, the said holders and the said turret being arranged to render both ends of the work accessible for tooling operations, one of the said holders being at a loading and unloading station and sundry of the others being at successive tooling stations at the time the turret is at rest, fixed supports adjacent the faces of the said turret and provided with a plurality of longitudinal guideways in register with the said work holders except the two at the bottom and one at the loading and unloading station at the time the turret is at rest, carriages mounted to slide in the said guideways and adapted to carry tools for endwise tooling the several pieces of work in the turret at the tooling stations, crossheads mounted to slide toward and from the said supports and connected with the said carriages to move the tools thereof into and out of engagement with the ends of the several pieces of work at the tooling stations at the time the turret is at rest, actuating means connected with the said turret to rotate the latter intermittently, actuating means connected with the said crossheads to impart a reciprocating motion to the same, and a driving mechanism common to both the said actuating means.

3. In an automatic chucking machine, a work holding turret mounted to rotate intermittently on a horizontal axis and having holders for holding a plurality of pieces of work in a circle, the center of which coincides with the said turret axis, the said holders being spaced equal distances apart and having their axes parallel to the said turret axis, the said holders and the said turret being arranged to render both ends of the work accessible for tooling operations, one of the said holders being at a loading and unloading station and sundry of the others being at successive tooling stations at the time the turret is at rest, fixed supports adjacent the faces of the said turret and provided with a plurality of longitudinal guideways in register with the said work holders except the two at the bottom and the one at the loading and unloading station at the time the turret is at rest, carriages mounted to slide in the said guideways and adapted to carry tools for endwise tooling the several pieces of work in the turret at the tooling stations, each of the said carriages being provided with a revoluble tool turning spindle, gearsets geared with the said spindles to rotate the latter, and crossheads mounted to slide toward and from the said supports and connected with the said carriages to move the tools thereof into and out of engagement with the ends of the several pieces of work at the tooling stations at the time the turret is at rest.

4. In an automatic chucking machine, a work holding turret mounted to rotate intermittently on a horizontal axis and having holders for holding a plurality of pieces of work in a circle, the center of which coincides with the said turret axis, the said holders being spaced equal distances apart and having their axes parallel to the said turret axis, the said holders and the said turret being arranged to render both ends of the work accessible for tooling operations, one of the said holders being at a loading and unloading station and sundry of the others being at successive tooling stations at the time the turret is at rest, fixed supports adjacent the faces of the said turret and provided with a plurality of longitudinal guideways in register with the said work holders except the two at the bottom and the one at the loading and unloading station at the time the turret is at rest, carriages mounted to slide in the said guideways and adapted to carry tools for endwise tooling the several pieces of work in the turret at the tooling stations, said carriages being provided with each of the revoluble tool turning spindles, gearsets centrally disposed relative to the axis of the turret and geared with the said spindles of the tooling heads on the corresponding supports, the spindles of the carriages on one support being driven in one direction and the spindles of the carriages on the other support being driven in a reverse direction from the corresponding gearset, and crossheads mounted to slide toward and from the said supports and connected with the said carriages to move the tools thereof into and out of engagement with the ends of the several pieces of work at the tooling stations at the time the turret is at rest.

5. In an automatic chucking machine, a turret having a plurality of holders for holding a plurality of pieces of work, supports adjacent the faces of the turret and on which the turret is mounted to turn intermittently, carriages mounted to slide on the said supports and having revoluble means adapted to carry tools engaging the pieces of work endwise, gearsets held on the said supports and connected with the corresponding revoluble means to rotate the tools, and crossheads mounted to reciprocate simultaneously toward and from the corresponding support and connected with the said carriages to move the latter to and from the pieces of work.

6. In an automatic chucking machine, a turret having a plurality of holders for holding a plurality of pieces of work, supports adjacent the faces of the turret and on which the turret is mounted to turn intermittently, carriages mounted to slide on the said supports and having revoluble means adapted to carry tools engaging the pieces of work endwise, gearsets held on the said supports and connected with the corresponding revoluble means to rotate the tools, crossheads mounted to reciprocate simultaneously toward and from the corresponding supports and connected with the carriages to move the latter to and from the pieces of work, a main power drive, a driving mechanism connecting the main power drive with the said turret to rotate the latter intermittently, a driving mechanism connecting the said main drive with the said gearsets, and a driving mechanism connecting the said main drive with the said crossheads to reciprocate the latter.

7. In an automatic chucking machine, a turret having a plurality of holders for holding a plurality of pieces of work, supports adjacent the faces of the turret and on which the turret is mounted to turn intermittently, carriages mounted to slide on the said supports and having revoluble means adapted to carry tools engaging the pieces of work endwise, gearsets held on the said supports and connected with the corresponding revoluble means to rotate the tools, crossheads mounted to reciprocate simultaneously toward and from the corresponding supports and connected with the carriages to move the latter to and from the pieces of work, a main power drive, a differential gearing driven from the said main drive, a feeding mechanism connecting the said differential gearing with the said crossheads to reciprocate the latter toward each other at an initial high speed, then at a slow speed and at a high speed from each other, an indexing mechanism connecting one of the said feed mechanisms with the said turret to rotate the latter intermittently, and driving mechanism connecting the said main drive with the said gear sets to actuate the latter.

8. In an automatic chucking machine, a turret having a plurality of holders each for holding a piece of work in position with its axis parallel to the axis of the turret, two sets of carriages located opposite the faces of the turret and mounted to slide simultaneously toward and from the said turret, revoluble tool rotating means mounted to turn in the carriages for rotating the tools, feed mechanisms connected with the said carriages to feed the latter toward and from the turret, a main drive, a differential gearing driven from the said main drive and driving the said feed mechanisms, the said differential gearing controlled from one of the said feed mechanisms, an indexing mechanism rotating the said turret intermittently and driven from the other feed mechanism, and gearsets driven from the said main drive and connected with the said tool rotating means to rotate the same.

9. In an automatic chucking machine, a turret provided with a plurality of work holders, each for holding a piece of work with the latter's axis parallel to the axis of the turret, two sets of tooling heads located opposite the faces of the turret and adapted to carry tools for tooling the work, each tooling head having a slidable member for carrying the tools toward and from the work and having a revoluble member for rotating the tools, feed mechanisms connected with the said slidable members of the tooling heads to move the same bodily and intermittently toward and from the work, a main drive, a differential gearing driven from the said main drive and connected with the said feed mechanisms to actuate the same, one of the said feed mechanisms controlling the said differential gearing, an indexing mechanism intermittently rotating the said turret and driven from the other feed mechanism, and gearsets driven from the said main drive and continually driving the said revoluble members of the tooling heads.

10. In an automatic chucking machine, an intermittently rotating turret provided with a plurality of work holders each adapted to carry a piece of work, supports located opposite the faces of the said turret and provided with guideways, carriages mounted to slide in the said guideways toward and from the said turret and adapted to carry tools for tooling the work at the time the turret is at rest, gearsets mounted on the said support for rotating the tools, feed mechanisms reciprocating the said carriages, and an indexing mechanism intermittently rotating the said turret and driven from one of the said feed mechanisms.

11. In an automatic chucking machine, an intermittently rotating turret provided with a plurality of work holders each adapted to carry a piece of work, a pair of tooling heads of which one carries tooling means adapted to tool the work from one end and the other carries tooling means adapted to tool the work from the other end and while the turret is at rest, feed mechanisms connected with the said tooling heads to move the same simultaneously toward and from the ends of the work at the time the turret is at rest, an indexing mechanism intermittently rotating the said turret and driven from one of the said feed mechanisms, and means for revolving the said tooling means carried by the tooling heads.

12. In an automatic chucking machine, an intermittently rotating turret provided with a plurality of work holders each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, feed mechanisms connected with the said tooling heads to move the same bodily and simultaneously toward and from the ends of the work at the time the turret is at rest, rotary driving means for the said revoluble tooling means to continually rotate the same, an indexing mechanism connected with the said turret to intermittently rotate the same, and a driving means connected with the said feed mechanism, the said rotary driving means and the said indexing mechanism.

13. In an automatic chucking machine, an intermittently rotating turret provided with a plurality of work holders each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, feed mechanisms connected with the said tooling heads to move the same bodily and simultaneously toward and from the ends of the work at the time the turret is at rest, a differential gearing common to both feed mechanisms to move the latter toward each other at an initial high speed and then at a slow speed and finally away from each other at a high speed, rotary driving means for the said revoluble tooling means to continually rotate the same, an indexing mechanism connected with the said turret to intermittently rotate the same, and a driving means connected with the said differential gearing, the said rotary driving means and the said indexing mechanism.

14. In an automatic chucking machine, an intermittently rotating turret provided with a plurality of work holders, each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, feed mechanisms connected with the said tooling heads to move the same bodily and simultaneously toward and from the ends of the work at the time the turret is at rest, a differential gearing common to both feed mechanisms to move the latter toward each other first at an initial high speed and then at a slow speed and finally away from each other at a high speed, a shifting mechanism for the said differential gearing and connected with one of the said feed mechanisms, rotary driving means for the said revoluble tooling means to intermittently rotate the same, an indexing mechanism connected with the said turret to intermittently rotate the same and a driving means connected with the said differential gearing, the said rotary driving means and the said indexing mechanism.

15. In an automatic chucking machine, an intermittently rotating turret provided with a plurality of work holders each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, feed mechanisms connected with the said tooling heads to move the same bodily and simultaneously toward and from the ends of the work at the time the turret is at rest, a differential gearing common to both feed mechanisms to move the latter toward each other at an initial high speed and then at a slow speed and finally away from each other at a high speed, rotary driving means for the said revoluble tooling means to continually rotate the same, an indexing mechanism connected with the said turret to intermittently rotate the same, the said indexing mechanism being actuated from one of the said feed mechanisms, and a driving means connected with the said differential gearing, the said rotary driving means and the said indexing mechanism.

16. In an automatic chucking machine, an intermittently rotating turret provided with a plurality of work holders each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, feed mechanisms connected with the said tooling heads to move the same bodily and simultaneously toward and from the ends of the work at a time the turret is at rest, rotary driving means for the said revoluble tooling means to continually rotate the same, an indexing mechanism connected with the said turret to intermittently rotate the same, a driving means connected with the said feed mechanism, the said rotary driving means and the said indexing mechanism, and a locking mechanism for the said indexing mechanism and controlled by the same.

17. In an automatic chucking machine, an intermittently rotating turret provided with a plurality of work holders, each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, mechanisms connected with the said tooling heads to move the same bodily and simultaneously toward and from the ends of the work at the time the turret is at rest, rotary driving means for the said revoluble tooling means to continually rotate the same, an indexing mechanism connected with the said turret to intermittently rotate the same, a driving means connected with the said feed mechanism, the said rotary driving means and the said indexing mechanism, and a locking mechanism for the said turret and controlled from the said indexing mechanism to lock the turret against movement during its period of rest.

18. In an automatic chucking machine, an intermittently rotating turret provided with a plurality of work holders each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, mechanisms connected with the said tooling heads to move the same bodily and simultaneously toward and from the ends of the work at the time the turret is at rest, rotary driving means for the said revoluble tooling means to continually rotate the same, an indexing mechanism connected with the said turret to intermittently rotate the same, a driving means connected with the said feed mechanism, the said rotary driving means and the said indexing mechanism, and two locking mechanisms, one for the said turret and the other for the said indexing mechanism to lock the turret against movement during its period of rest.

19. In an automatic chucking machine, an intermittently rotating turret provided with a plurality of work holders each adapted to carry a piece of work with the latter's axis parallel to the horizontal axis of the turret, a pair of tooling heads of which one carries revoluble tooling means adapted to engage the work from one end and the other carrying revoluble tooling means adapted to engage the work from the other end, feed mechanisms connected with the said tooling heads to move the same bodily and simultaneously toward and from the ends of the work at the time the turret is at rest, rotary driving means for the said revoluble tooling means to continually rotate the same, an indexing mechanism connected with the said turret to intermittently rotate the same, a driving means connected with the said feed mechanism, the said rotary driving means and the said indexing mechanism, and two locking mechanisms, one for the said turret and the other for the said indexing mechanism to lock the turret against movement during its period of rest, both locking devices being controlled by the indexing mechanism.

20. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feeding mechanism connected with the said tooling heads to intermittently move the same bodily toward and from the pieces of work at a time the turret is at rest, rotary driving means for the said tooling means to drive the same, and an indexing mechanism connected with the said turret to intermittently rotate the same, the said indexing mechanism being driven by the said feed mechanism.

21. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feeding mechanism connected with the said tooling heads to intermittently move the same bodily toward and from the pieces of work at a time the turret is at rest, a differential gearing for driving the said feed mechanism at an initial high speed during the time the feed mechanism moves the several tooling heads to the work, at a slow speed during the tooling operation, and at a high speed during the return movement of the tooling heads, rotary driving means for the said tooling means to drive the same, and an indexing mechanism connected with the said turret to intermittently rotate the same.

22. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feeding mechanism connected with the said tooling heads to intermittently move the same bodily toward and from the pieces of work at a time the turret is at rest, rotary driving means for the said tooling means to drive the same, an indexing mechanism connected with the said turret to intermittently rotate the same, and a main driving mechanism connected with the said feed mechanism, the said rotary driving means and the said indexing mechanism.

23. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feeding mechanism connected with the said tooling heads to intermittently move the same bodily toward and from the pieces of work at a time the turret is at rest, a gearset having a plurality of spindles driven at different speeds, driving means connecting the said spindles with the said revoluble tooling means of the said tooling heads, and an indexing mechanism connected with the said turret to rotate the latter intermittently.

24. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feeding mechanism connected with the said tooling heads to intermittently move the same bodily toward and from the pieces of work at a time the turret is at rest, a gear set having a plurality of spindles driven at different speeds, driving means connecting the said spindles with the said revoluble tooling means of the said tooling heads, and an indexing mechanism connected with the said turret to rotate the latter intermittently, the said indexing mechanism being connected with and driven from the said feeding mechanism.

25. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feeding mechanism connected with the said tooling heads to intermittently move the same bodily toward and from the pieces of work at a time the turret is at rest, a differential gearing for driving the said feed mechanism at an initial high speed during the time the feed mechanism moves the tooling heads to the work at a slow speed during the tooling operation and at a high speed during the return movement of the tooling heads, a gearset having a plurality of spindles driven at speeds commensurate with the tooling operation carried out by the corresponding tooling head, driving means connecting the said spindles with the revoluble tooling means of the said tooling heads, and an indexing mechanism connected with the said turret to rotate the latter intermittently at the time the tooling heads are at rest in outermost position.

26. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feeding mechanism connected with the said tooling heads to intermittently move the same bodily toward and from the pieces of work at a time the turret is at rest, a differential gearing for driving the said feed mechanism at an initial high speed during the time the feed mechanism moves the tooling heads to the work, at a slow speed during the tooling operation and at a high speed during the return movement of the tooling heads, a gearset having a plurality of spindles driven at speeds commensurate with the tooling operation carried out by the corresponding tooling head, driving means connecting the said spindles with the revoluble tooling means of the said tooling heads, an indexing mechanism connected with the said turret to rotate the latter intermittently at the time the tooling heads are at rest in outermost position, and a main driving means connected independently with the said differential gearing and the said gearset.

27. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feed mechanism connected with the said tooling heads to intermittently move the same bodily toward and from the pieces of work at a time the turret is at rest, a differential gearing for driving the said feed mechanism at an initial high speed during the time the feed mechanism moves the tooling heads to the work at a low speed during the tooling operation and at a high speed during the return movement of the tooling heads, a gearset having a plurality of spindles driven at speeds commensurate with the tooling operation carried out by the corresponding tooling head, driving means connecting the said spindles with the revoluble tooling means of the said tooling heads, an indexing mechanism connected with the said turret to rotate the latter intermittently at the time the tooling heads are at rest in outermost position, and actuating means connecting the said feed mechanism with the said indexing mechanism to actuate the latter.

28. In an automatic chucking machine, an intermittently rotating turret provided with a plurality of work holders adapted to carry pieces of work of like construction, a plurality of tooling heads each having revoluble tooling means for carrying out different tooling operations on the pieces of work, a feed mechanism connected with the said tooling heads to intermittently move the same bodily toward and from the pieces of work at a time the turret is at rest, a gearset having a driven master wheel and a plurality of spindles driven from the said master wheel at different speeds, driving means connecting the said spindles with the revoluble tooling means of the said tooling heads, and an indexing mechanism connected with the said turret head to intermittently rotate the same at the time the tooling heads are at rest in outermost position.

29. In an automatic chucking machine, an intermittently rotating turret provided with a plurality of work holders adapted to carry pieces of work of like construction, a plurality of tooling heads for carrying out different tooling operations on the pieces of work, each tooling head having a reciprocating carriage, a feeding mechanism connected with the several carriages to reciprocate the same, and a gearset having a driven master wheel and a series of spindles connected with the corresponding tooling means and driven from the said master wheel at different speeds commensurate with the tooling operations carried out by the said tooling means.

30. In an automatic chucking machine, an intermittently rotating turret provided with a plurality of work holders adapted to carry pieces of work of like construction, a plurality of tooling heads for carrying out different tooling operations on the pieces of work, each tooling head having a reciprocating carriage and a revoluble tooling means mounted on the carriage, a feeding mechanism connected with the several carriages to reciprocate the same, a gearset having a driven master wheel and a series of spindles connected with the corresponding tooling means and driven from the said master wheel at speeds commensurate with the tooling operations carried out by the said tooling means, and a main driving mechanism connected with the said feed mechanism and the master wheel of the said gearset.

31. In an automatic chucking machine, an intermittently rotating turret provided with a plurality of work holders adapted to carry pieces of work of like construction, a plurality of tooling heads for carrying out different tooling operations on the pieces of work, each tooling head having a reciprocating carriage and a revoluble tooling means mounted on the carriage, a feeding mechanism connected with the several carriages to reciprocate the same, a differential gearing connected with the said feed mechanism to move the carriages at an initial high speed toward the work, at a slow speed during the tooling operation, and a high speed from the work, a gearset having a master wheel and a series of spindles connected with the corresponding tooling means and driven from the said master wheel at speeds commensurate with the tooling operations carried out by the said tooling means, and a main driving mechanism connected with the said differential gearing and the master wheel of the said gearset.

32. In an automatic chucking machine, an intermittently rotating turret provided with a plurality of work holders adapted to carry pieces of work of like construction, a plurality of tooling heads for carrying out different tooling operations on the pieces of work, each tooling head having a reciprocating carriage and a revoluble tooling means mounted on the carriage, a feed mechanism connected with the several carriages to reciprocate the same, a differential gearing connected with the said feed mechanism to move the carriages at an initial high speed toward the work, at a slow speed during the tooling operation, and at a high speed from the work, a shifting mechanism for the said differential gearing and controlled from the said feeding mechanism, a gearset having a master wheel and a series of spindles connected with the corresponding tooling means and driven from the said master wheel at speeds commensurate with the tooling operations carried out by the said tooling means, and a main driving mechanism connected with the said differential gearing and the master wheel of the said gearset.

33. In an automatic chucking machine, a plurality of tooling heads for carrying out different tooling operations successively on a single piece of work, each tooling head having a carriage and a revoluble tooling means, a feeding mechanism connected with the carriages of the several tooling heads to reciprocate the carriages, a gearset having driven spindles slidably connected with the said carriages, and driving means connecting the said spindles with the said revoluble tooling means to rotate the latter at speeds commensurate with the different tooling operations done by the tooling heads on the work.

34. In an automatic chucking machine, a plurality of tooling heads for carrying out different tooling operations successively on a single piece of work, each tooling head having a carriage and a revoluble tooling means, a feed mechanism connected with the carriages of the several tooling heads to reciprocate the carriages, a gearset having driven spindles slidably connected with the said carriages, driving means connecting the said spindles with the said revoluble tooling means to rotate the latter at speeds commensurate with the different tooling operations done by the tooling heads on the work, and a main driving means independently connected with the said feeding mechanism and the said gearset.

35. In an automatic chucking machine, a plurality of tooling heads for carrying out different tooling operations successively on a single piece of work, each tooling head having a carriage and a revoluble tooling means, a feed mechanism connected with the carriages of the several tooling heads to reciprocate the carriages, a gearset having driven spindles slidably connected with the said carriages and driving means connecting the said spindles with the said revoluble tooling means to rotate the latter at speeds commensurate with the different tooling operations done by the tooling heads on the work, a differential gearing connected with the said feed mechanism to drive the latter at an initial high speed while moving the carriages of the tooling heads toward the work, at a low speed during the tooling operation, and at a high speed during the return movement of the carriages, the said differential gearing being controlled by the feed mechanism, and a main driving means independently connected with the said differential gearing and the said gearset.

36. In an automatic chucking machine, an intermittently rotating turret provided with a plurality of work holders arranged in a circle, the center of which coincides with the axis of the turret, a tooling head having a reciprocating carriage and a revoluble tooling means adapted to carry a tool and having its axis coinciding with the axis of a work holder at the time the said turret is at rest, a feeding mechanism connected with the said carriage to move the latter and its tooling means bodily toward and from a piece of work at the time the turret is at rest, a gearset having a driven spindle slidingly engaging the said carriage, and driving means mounted on the said carriage and connecting the said spindle with the said tooling means to rotate the same.

37. In an automatic chucking machine, an intermittently rotating turret provided with a plurality of work holders arranged in a circle, the center of which coincides with the axis of the turret, a tooling head having a reciprocating carriage and a revoluble tooling means adapted to carry a tool and having its axis coinciding with the axis of a work holder at the time the said turret is at rest, a feeding mechanism connected with the said carriage to move the latter and its tooling means bodily toward and from a piece of work at the time the turret is at rest, a gearset having a driven spindle slidingly engaging the said carriage, driving means mounted on the said carriage and connecting the said spindle with the said tooling means to rotate the same, a differential gearing connected with the said feeding mechanism and controlled by the latter, and a main driving mechanism connected with the said differential gearing and the said gearset to drive the same independently one of the other.

38. In an automatic chucking machine, an intermittently rotating turret provided with a plurality of work holders arranged in a circle, the center of which coincides with the axis of the turret, a tooling head having a reciprocating carriage and a revoluble tooling means adapted to carry a tool and having its axis coinciding with the axis of a work holder at the time the said turret is at rest, a feeding mechanism connected with the said carriage to move the latter and its tooling means bodily toward and from a piece of work at the time the turret is at rest, a gearset having a driven spindle slidingly engaging the said carriage, driving means mounted on the said carriage and connecting the said spindle with the said tooling means to rotate the same, a differential gearing connected with the said feeding mechanism and controlled by the latter, a main driving mechanism connected with the said differential gearing and the said gearset to drive the same independently one of the other, and an indexing mechanism connected with the said turret to intermittently rotate the same.

39. In an automatic chucking machine, an intermittently rotating turret provided with a plurality of work holders arranged in a circle, the center of which coincides with the axis of the turret, a tooling head having a reciprocating carriage and a revoluble tooling means adapted to carry a tool and having its axis coinciding with the axis of a work holder at the time the said turret is at rest, a feeding mechanism connected with the said carriage to move the latter and its tooling means bodily toward and from a piece of work at the time the turret is at rest, a gearset having a driven spindle slidingly engaging the said carriage, driving means mounted on the said carriage and connecting the said spindle with the said tooling means to rotate the same, a differential gearing connected with the said feed mechanism and controlled by the latter, a main driving mechanism connected with the said differential gearing and the said gearset to drive the same independently one of the other, an indexing mechanism connected with the said turret to intermittently rotate the same, and actuaing means for actuating the said indexing mechanism for the said feed mechanism.

40. In an automatic chucking machine, a carriage mounted to reciprocate, a face plate mounted to revolve on the said carriage, a tool holder mounted to slide across the face plate, a carriage feed mechanism connected with the carriage to intermittently reciprocate the same, driving means for continually rotating the said face plate and the said tool holder, and tool holder feed mechanism connected with the said tool holder and with the said carriage feed mechanism to feed the tool holder across the face plate.

41. In an automatic chucking machine, an intermittently rotating turret provided with a plurality of work holders for holding pieces of work singly and arranged in a circle, the center of which coincides with the turret, a carriage mounted to reciprocate intermittently toward and from the piece of work at the time the turret is at a standstill, a face plate mounted to turn on the said carriage and having its axis coinciding with the axis of a work holder at the time the said turret is at rest, a tool holder slidable on the said face plate, feed mechanism for the said carriage, a driving means for the said face plate, and a feed mechanism for the said tool holder.

42. In an automatic chucking machine, a tooling head, comprising a carriage mounted to slide toward and from the work, a face plate mounted to turn on the said carriage, a tool holder mounted to slide diametrically on the said face plate, a continually driven spindle slidably connected with the said carriage, a gearing connecting the said spindle with the said face plate, a carriage feed mechanism connected with the said carriage to impart an intermittent reciprocating movement to the same, and a tool holder mechanism connected with the said carriage feed mechanism and with the said tool holder to feed the latter across the said face plate.

43. In an automatic chucking machine, a tooling head, comprising a carriage mounted to slide toward and from the work, a face plate mounted to turn on the said carriage, a tool holder mounted to slide diametrically on the said face plate, a continually driven spindle slidably connected with the said carriage, a gearing connecting the said spindle with the said face plate, a cam shaft journaled in fixed bearings and provided with a cam, driving means for rotating the said cam shaft alternately in opposite directions, a pin on the carriage and engaging the said cam to impart an intermittent reciprocating motion to the said carriage, and a feed mechanism connecting the said cam shaft with the said tool holder to feed the latter across the said face plate.

44. In an automatic chucking machine, a tooling head comprising a carriage mounted to slide toward and from the work, a face plate mounted to turn on the said carriage, a tool holder mounted to slide diametrically on the said face plate, a continually driven spindle slidably connected with the said carriage, a gearing connecting the said spindle with the said face plate, a cam shaft journaled in fixed bearings and provided with a cam, driving means for rotating the said cam shaft alternately in opposite directions, a pin on the carriage and engaging the said cam to impart an intermittent reciprocating motion to the said carriage, a feed mechanism connecting the said cam shaft with the said tool holder to feed the latter across the said face plate, the said feed mechanism comprising a sliding shaft journaled on the carriage, a gearing connecting the said cam shaft with the said sliding shaft, a feed sleeve journaled on the carriage and rotating with the said face plate, a screw rod engaging the said feed sleeve, a nut screwing on the said screw rod and geared with the said sliding shaft, and a rack and pinion gearing connecting the said tool holder with the said feed sleeve.

45. In an automatic chucking machine, a tooling head comprising a carriage mounted to slide toward and from the work, a face plate mounted to turn on the said carriage, a tool holder mounted to slide diametrically on the said face plate, a continually driven spindle slidably connected with the said carriage, a gearing connecting the said spindle with the said face plate, a carriage feed mechanism connected with the carriage to intermittently reciprocate the carriage, a rack and pinion mechanism mounted on the said carriage and connected with the said tool holder, a feed sleeve connected with the said rack and pinion mechanism and mounted to slide in the said carriage, and a driving mechanism connecting the said feed sleeve with the said carriage feed mechanism.

46. In an automatic chucking machine, a carriage mounted to reciprocate, a face plate mounted to revolve on the said carriage, a tool holder mounted to slide across the face plate, a carriage feed mechanism connected with the carriage to intermittently reciprocate the same, driving means for continually rotating the said face plate and the said tool holder, tool holder feed mechanism connected with the said tool holder and with the said carriage feed mechanism to feed the tool holder across the face plate, and a locking mechanism actuated from the said carriage feed mechanism and adapted to periodically lock the said carriage against movement.

47. In an automatic chucking machine, a tooling head comprising a carriage mounted to slide toward and from the work, a face plate mounted to turn on the said carriage, a tool holder mounted to slide diametrically on the said face plate, a continually driven spindle slidably connected with the said carriage, a gearing connecting the said spindle with the said face plate, a cam shaft journaled in fixed bearings and provided with a cam, driving means for rotating the said cam shaft alternately in opposite directions, a pin on the carriage and engaging the said cam to impart an intermittent reciprocating motion to the said carriage, a feed mechanism connecting the said cam shaft with the said tool holder to feed the latter across the said face plate, and a locking mechanism controlled by the said cam and adapted to periodically lock the carriage against movement.

48. In an automatic chucking machine, an intermittently rotating turret provided with a plurality of work holders for holding pieces of work singly and arranged in a circle, the center of which coincides with the axis of the said turret, a carriage mounted to reciprocate toward and from a piece of work at the time the turret is at a standstill, a driven spindle having a sliding connection with the said carriage, a carriage spindle journaled in the said carriage and having its axis coinciding with the axis of a work holder at the time the said turret is at rest, meshing gear wheels, of which one is secured on the carriage spindle and the other is mounted to turn with and to slide on the said driven spindle, a housing attached to the said carriage, a pair of drill spindles journaled on the said housing and driven from the said carriage spindle, each drill spindle being hollow, and provided with a key, a drill holder mounted to slide in each of the said drill spindles and having a keyway slidingly engaged by the said key, and a nut screwing on the said drill holder and abutting against one end of the corresponding drill spindle.

49. In an automatic chucking machine, an intermittently rotating turret provided with a plurality of work holders for holding pieces of work singly and arranged in a circle, the center of which coincides with the axis of the said turret, a carriage mounted to reciprocate toward and from a piece of work at the time the turret is at a standstill, a driven spindle having a sliding connection with the said carriage, a carriage spindle journaled in the said carriage and having its axis coinciding with the axis of a work holder at the time the said turret is at rest, meshing gear wheels, of which one is secured on the carriage spindle and the other is mounted to turn with and to slide on the said driven spindle, a housing attached to the said carriage, a pair of drill spindles journaled on the said housing and driven from the said carriage spindle, tool holders adjustably mounted on the said drill spindles and each adapted to carry a drill, and guides held on the said housing and through which extend the said drills to guide the latter.

50. In an automatic chucking machine, an intermittently rotating turret provided with a plurality of work holders for holding pieces of work single and arranged in a circle, the center of which coincides with the axis of the said turret, a carriage mounted to reciprocate toward and from a piece of work at the time the turret is at a standstill, a driven spindle having a sliding connection with the said carriage, a tool spindle journaled in the said carriage and provided with a tool holder, the axis of the tool spindle coinciding with the axis of a work holder at the time the said turret is at rest, a tapping tool mounted on the said holder and provided with a retractible tap mechanism having a collar adapted to engage the work to retract the blades at the time the carriage nears the end of its inward stroke, a fixed arm adapted to engage the said tap mechanism to return the blades to outermost position during the return of the carriage, and gear wheels in mesh with each other, one of the gear wheels being secured on the tool spindle and the other being mounted to turn with and to slide on the said driven spindle.

51. In an automatic chucking machine, an intermittently rotating turret provided with a plurality of work holders for holding pieces of work singly and arranged in a circle, the center of which coincides with the axis of the said turret, a carriage mounted to reciprocate toward and from a piece of work at a time the said turret is at a standstill, a shaft journaled in stationary bearings, means alternately rotating the said shaft in opposite directions, a cam disk secured on the said shaft and provided with spaced cams, spaced pins held on the said carriage and adapted to be engaged by the said cams to reciprocate the carriage inward toward the work and back to outermost position during the time the said shaft turns in one direction, a carriage spindle journaled in the said carriage and having its axis coinciding with the axis of a work holder at the time the said turret is at rest, a tool holder adapted to carry a tapping tool and geared with the said carriage spindle, a driven spindle having a sliding connection with the said carriage, and gear wheels in mesh with each other, one of the said gear wheels being secured on the said carriage spindle and the other being mounted to turn with and to slide on the said driven spindle.

52. In an automatic chucking machine, an intermittently rotating turret provided with a plurality of work holders for holding pieces of work singly and arranged in a circle, the center of which coincides with the axis of the said turret, the axes of the work holders being parallel to the axis of the turret, a fixed support adjacent one face of the said turret and provided with guideways parallel to the axis of the turret, carriages carrying tooling means for operating on the pieces of work, adjustable side gibs and adjustable bottom gibs, the said gibs being interposed between the said carriages and the said guideways to permit of adjusting the carriages.

53. In an automatic chucking machine, an intermittently rotating turret provided with a plurality of work holders for holding pieces of work singly and arranged in a circle, the center of which coincides with the axis of the said turret, the axes of the work holders being parallel to the axis of the turret, a fixed support adjacent one face of the said turret and provided with guideways parallel to the axis of the turret, carriages carrying tooling means for operating on the pieces of work, side gibs and bottom gibs, the said gibs being adjustably mounted on the said carriages and slidingly engage the said guideways.

54. In an automatic chuckng machine, an intermittently rotating turret provided with a plurality of work holders adapted to hold single pieces of work of like construction, the axes of the work holders being arranged in a circle, the center of which coincides with the axis of the turret, the axes of the work holders being spaced equal distances apart and being parallel to the axis of the turret, each work holder having a yielding sleeve slidable on the turret and adapted to be engaged centrally by a part of the piece of work, a clamping ring engaging the piece of work centrally to clamp it in position on the said sleeve, an arm pivoted on the turret and having a fork in which said clamping ring is hung, and a locking lever fulcrumed on the chuck and engaging the said arm to lock the latter against outward swinging movement.

55. In an automatic chucking machine, an intermittently rotating turret provided with a plurality of work holders adapted to hold single pieces of work of like construction, the axes of the work holders being arranged in a circle, the center of which coincides with the axis of the turret, the axes of the work holders being spaced equal distances apart and being parallel to the axis of the turret, each work holder having seats for a piece of work, a clamping member adapted to engage a piece of work to clamp it against the said seats, an arm fulcrumed on the turret and carrying the said clamping member, and a manually controlled locking lever fulcrumed on the turret and adapted to engage the said arm to lock the latter against outward swinging movement.

56. In an automatic chucking machine, an intermittently rotating turret provided with a plurality of work holders, adapted to hold single pieces of work of like construction, the axes of the work holders being arranged in a circle, the center of which coincides with the axis of the turret, the axes of the work holders being spaced equal distances apart and being parallel to the axis of the turret, each work holder having seats for a piece of work, a clamping member adapted to engage a piece of work to clamp it against the said seats, an arm fulcrumed on the turret and carrying the said clamping member, a manually controlled locking lever fulcrumed on the turret and adapted to engage the said arm to lock the latter against outward swinging movement, and positioning means on the said turret and adapted to engage the piece of work to position the latter on the work holder.

57. In an automatic chucking machine, an intermittently rotating turret provided with a plurality of work holders adapted to hold single pieces of work of like construction, the axes of the work holders being arranged in a circle, the center of which coincides with the axis of the turret, the axes of the work holders being spaced equal distances apart and being parallel to the axis of the turret, each work holder having seats for a piece of work, a clamping member adapted to engage a piece of work to clamp it against the said seats, an arm fulcrumed on the turret and carrying the said clamping member, a manually controlled locking lever fulcrumed on the turret and adapted to engage the said arm to lock the latter against outward swinging movement, positioning means on the said turret and adapted to engage the piece of work to position the latter on the work holder, and a yieldingly mounted button on the said turret and adapted to extend between spaced members on the piece of work to position the latter on the work holder.

58. In an automatic chucking machine, an intermittently rotating turret provided with a plurality of work holders adapted to hold single pieces of work of like construction, the axes of the work holders being arranged in a circle, the center of which coincides with the axis of the turret, the axes of the work holders being spaced equal distances apart and being parallel to the axis of the turret, each work holder having a sleeve yieldingly mounted on the turret, centering lugs on the said turret and arranged in a circle concentric with the said sleeve, and clamping means on the said turret and engaging the piece of work to clamp the latter in position in the said sleeve and against the said lugs.

59. In an automatic chucking machine, an intermittently rotating turret provided with a plurality of work holders adapted to hold single pieces of work of like construction, the axes of the work holders being arranged in a circle the center of which coincides with the axis of the turret, the axes of the work holders being spaced equal distances apart and being parallel to the axis of the turret, each work holder having seating means for the piece of work, centering means on the turret for centering the piece of work on the seating means, and clamping means mounted on the turret for clamping the work in position on the said seating and centering means.

60. In an automatic chucking machine, an intermittently rotating turret provided with a plurality of work holders adapted to hold single pieces of work of like construction, the axes of the work holders being arranged in a circle, the center of which coincides with the axis of the turret, the axes of the work holders being spaced equal distances apart and being parallel to the axis of the turret, each work holder having a sleeve yieldingly mounted on the turret, centering lugs on the said turret and arranged in a circle concentric with the said sleeve, clamping means on the said turret and engaging the piece of work to clamp the latter in position in the said sleeve and against the said lugs, and positioning means on the turret for positioning the work on the work holder prior to clamping it in place.

61. In an automatic chucking machine, an intermittently rotating turret provided with a plurality of work holders adapted to hold single pieces of work of like construction, the axes of the work holders being arranged in a circle, the center of which coincides with the axis of the turret, the axes of the work holders being spaced equal distances apart and being parallel to the axis of the turret, each work holder having a clamping ring adapted to engage the piece of work centrally and clamp it in place on the turret, an arm fulcrumed on the turret and having a fork in which the said ring is hung, the arm having a heel, and a locking lever fulcrumed on the turret and adapted to engage the said heel to lock the said arm in place.

62. In an automatic chucking machine, an intermittently rotating turret provided with a plurality of work holders adapted to hold single pieces of work of like construction, the axes of the work holders being arranged in a circle, the center of which coincides with the axis of the turret, the axes of the work holders being spaced equal distances apart and being parallel to the axis of the turret, each work holder having a clamping ring adapted to engage the piece of work centrally and clamp it in place on the turret, an arm fulcrumed on the turret and having a fork in which the said ring is hung, the arm having a heel, a locking lever fulcrumed on the turret and adapted to engage the said heel to lock the said arm in place, and a set screw screwing in the said locking lever and adapted to abut against the turret to lock the locking lever in place.

63. In an automatic chucking machine, a turret provided with a plurality of work holders adapted to hold single pieces of work of like construction, the axes of the work holders being arranged in a circle, the center of which coincides with the axis of the turret, the axes of the work holders being spaced equal distances apart, a star wheel rotating with the said turret and having a number of radial slots corresponding to the number of work holders, a driven shaft having an arm provided with a friction roller adapted to engage the said star wheel slots to intermittently rotate the same and the said turret, and two locking devices controlled by the said arm, one of the locking devices being adapted to lock the said star wheel and the other the said turret.

64. In an automatic chucking machine, a turret provided with a plurality of work holders adapted to hold single pieces of work of like construction, the axes of the work holders being arranged in a circle, the center of which coincides with the axis of the turret, the axes of the work holders being spaced equal distances apart, a star wheel rotating with the said turret and having a number of radial slots corresponding to the number of work holders, a driven shaft having an arm provided with a friction roller adapted to engage the said star wheel slots to intermittently rotate the same and the said turret, two spring-pressed bolts controlled by the said arm, and two sets of keepers adapted to be engaged by the said bolts, one set of keepers being arranged on the star wheel and the other on the said turret.

65. In an automatic chucking machine, a turret provided with a plurality of work holders adapted to hold single pieces of work of like construction, the axes of the work holders being arranged in a circle, the center of which coincides with the axis of the turret, the axes of the work holders being spaced equal distances apart, a star wheel rotating with the said turret and having a number of radial slots corresponding to the number of work holders, a driven shaft having an arm provided with a friction roller adapted to engage the said star wheel slots to intermittently rotate the same and the said turret, a second friction roller on the said arm, a cam arm mounted to swing and adapted to be engaged by the said second friction roller to impart a swinging motion to the said cam arm immediately prior to the first-named friction roller entering a corresponding star wheel slot, a third arm connected with the said cam arm and moving with the same, a spring-pressed bolt controlled by the said third arm, and keepers on the said star wheel and adapted to be engaged by the said bolt.

66. In an automatic chucking machine, a turret provided with a plurality of work holders adapted to hold single pieces of work of like construction, the axes of the work holders being arranged in a circle, the center of which coincides with the axis of the turret, the axes of the work holders being spaced equal distances apart, a star wheel rotating with the said turret and having a number of radial slots corresponding to the number of work holders, a driven shaft having an arm provided with a friction roller adapted to engage the said star wheel slots to intermittently rotate the same and the said turret, a second friction roller on the said arm, a rock shaft provided with a cam arm adapted to be engaged by the said second friction roller to periodically rock the said rock shaft, a crank arm on the said rock shaft, a spring-pressed bolt, a plurality of keepers on the said turret and adapted to be engaged by the said bolt to lock the turret against rotation at the time the star wheel is at a standstill, a crank arm mounted to turn loosely on the said bolt and engaged by the said first-named crank arm, a fixed cam, and a cam on the said second crank arm and engaging the said fixed cam to retract the said bolt at the time the first friction roller enters a star wheel slot.

67. In an automatic chucking machine, spaced supports provided with guideways, a turret arranged between the said supports and provided with a plurality of work holders adapted to hold single pieces of work of like construction, the said turret having a hollow hub journaled in the said supports, tooling heads having carriages mounted to reciprocate in the said guideways toward and from the said work holders at the time the said turret is at rest, the said tooling heads having revoluble tooling means mounted on the said carriages, means to reciprocate the said carriages, gearsets attached to the said supports and having driven spindles slidably engaging the said carriages and geared with the said tooling means, shafts extending through the said hub of the turret and geared with the said spindles, one of the said shafts being continually driven in one direction, and a gearing connecting the inner ends of the said shafts with each other to rotate the other shaft from the driven shaft in a reverse direction.

68. In an automatic chucking machine, two spaced gearsets each having trains of gear wheels and a plurality of spindles driven by the trains of gear wheels, a shaft driven continually in one direction and geared with the trains of gear wheels in one gearset, a second shaft geared with the trains or gear wheels in the other gearset, and a gearing connecting the adjacent ends of the said shafts with each other to drive the said second shaft in a reverse direction.

69. In an automatic chucking machine, two spaced gearsets each having trains of gear wheels and a plurality of spindles driven by the trains of gear wheels, a shaft driven continually in one direction and geared with the trains of gear wheels in one gearset, a second shaft geared with the trains of gear wheels in the other gearset, the said shafts having their axes coinciding, bevel gear wheels on the adjacent ends of the said shafts, and a bevel gear wheel in mesh at opposite sides with the said bevel gear wheels on the said shafts.

70. In an automatic chucking machine, spaced supports provided with guideways, a turret arranged between the said supports and provided with a plurality of work holders adapted to hold single pieces of work of like construction, the said turret having a hollow hub journaled in the said supports, tooling heads having carriages mounted to reciprocate in the said guideways toward and from the said work holders at the time the said turret is at rest, the said tooling heads having revoluble tooling means mounted on the said carriages, means to reciprocate the said carriages, gearsets attached to the said supports and having driven spindles slidably engaging the said carriages and geared with the said tooling means, shafts extending through the said hub of the turret and geared with the said spindles, one of the said shafts being continually driven in one direction, bevel gear wheels secured on the adjacent ends of the said shafts, and another bevel gear wheel journaled on the said turret and in mesh at opposite sides with the said bevel gear wheels on the said shafts.

71. In an automatic chucking machine, a tooling head provided with a carriage and with revoluble tooling means, a crosshead mounted to slide and connected with the said carriage to move the tooling means into and out of engagement with a piece of work, a friction roller carried by the said crosshead, and a crosshead cam having a cam groove engaged by the said friction roller, the cam groove having a straight portion to intermittently reciprocate the said crosshead, the latter being at a standstill when in outermost position at a time the friction roller travels through the straight portion of the said cam groove.

72. In an automatic chucking machine, a tooling head provided with a carriage and with revoluble tooling means, a crosshead mounted to slide and connected with the said carriage to move the tooling means into and out of engagement with a piece of work, a friction roller carried by the said crosshead, a crosshead cam having a cam groove engaged by the said friction roller, the cam groove having a straight portion to intermittently reciprocate the said crosshead, the latter being at a standstill when in outermost position at a time the friction roller travels through the straight portion of the said cam groove, and a differential gearing connected with the said crosshead cam to rotate the latter at a low speed while feeding the carriage to the work and at a high speed during the return movement of the carriage.

73. In an automatic chucking machine, a tooling head provided with a carriage and with revoluble tooling means, a crosshead mounted to slide and connected with the said carriage to move the tooling means into and out of engagement with a piece of work, a friction roller carried by the said crosshead, a crosshead cam having a cam groove engaged by the said friction roller, the cam groove having a straight portion to intermittently reciprocate the said crosshead, the latter being at a standstill when in outermost position at a time the friction roller travels through the straight portion of the said cam groove, a differential gearing having a driven gear wheel, a shaft, a planetary gearing connecting the said driven gear wheel with the said shaft, a friction clutch adapted to connect the said driven gear wheel with the said shaft, a worm drive connecting the said shaft with the said cam, and a shifting mechanism connected with the said friction clutch and controlled by the said cam.

74. In an automatic chucking machine, a tooling head provided with a carriage and with revoluble tooling means, a crosshead mounted to slide and connected with the said carriage to move the tooling means into and out of engagement with a piece of work, a friction roller carried by the said crosshead, a crosshead cam having a cam groove engaged by the said friction roller, the cam groove having a straight portion to intermittently reciprocate the said crosshead, the latter being at a standstill when in outermost position at a time the friction roller travels through the straight portion of the said cam groove, a differential gearing having a driven gear wheel, a shaft, a planetary gearing connecting the said driven gear wheel with the said shaft, a friction clutch adapted to connect the said driven gear wheel with the said shaft, a work drive connecting the said shaft with the said cam, a shifting mechanism connected with the said friction clutch, and a cam rotating with the said crosshead cam and connected with the said shifting mechanism to actuate the latter from the crosshead cam.

75. In an automatic chucking machine, a tooling head, a feed mechanism for the same and a differential gearing connected with the said feed mechanism and controlled thereby, the said differential gearing comprising a shaft, a driven wheel mounted to turn loosely on the said shaft, a planetary gearing indirectly connecting the said driven wheel with the said shaft to rotate the latter at a low speed, a friction clutch adapted to connect the said driven wheel directly with the said shaft to rotate the latter at a high speed, a driving connection between the said shaft and the said feed mechanism, and a cam controlled shifting means connecting the said feed mechanism with the said friction clutch.

76. In an automatic chucking machine, a tooling head, a feed mechanism for the same and a differential gearing connected with the said feed mechanism and controlled thereby, the said differential gearing comprising a shaft, a driven wheel mounted to turn loosely on the said shaft, a planetary gearing indirectly connecting the said driven wheel with the said shaft to rotate the latter at a low speed, a friction clutch adapted to connect the said driven wheel directly with the said shaft to rotate the latter at a high speed, a driving connection between the said shaft and the said feed mechanism, a cam controlled shifting means connecting the said feed mechanism with the said friction clutch, and a gravity pawl and ratchet mechanism connected with the said planetary gearing to hold the latter against return movement.

77. In an automatic chucking machine, a tooling head provided with a carriage and with revoluble tooling means, a reciprocating crosshead, a shaft journaled in stationary bearings, a cam on the said shaft, actuating means on the carriage and engaging the said cam to intermittently reciprocate the said carriage, a gear wheel on the said shaft, and a rack in mesh with the said gear wheel and connected with the said crosshead to rotate the said gear wheel alternately in opposite directions.

78. In an automatic chucking machine, a plurality of tooling heads each provided with a carriage and with revoluble tooling means, a reciprocating crosshead, a rod connecting the said crosshead directly with one of the said carriages to feed the same in unison with the stroke of the crosshead, and an indirect connection between the said crosshead and the other carriage to feed the latter independently of the first-named carriage and with a reduced stroke.

79. In an automatic chucking machine, a plurality of tooling heads each provided with a carriage and with revoluble tooling means, a reciprocating crosshead, a rod connecting the said crosshead directly with one of the said carriages to feed the same in unison with the stroke of the crosshead, a cam shaft journaled in a fixed bearing, a gear wheel on the said cam shaft, a rack connected with the said crosshead and in mesh with the said gear wheel to rotate the cam shaft alternately in opposite directions from the said crosshead, and a friction roller on another carriage and engaging the said cam to reciprocate this carriage independently of the other carriage and with a reduced stroke.

HARRY A. SCHWARTZ.